United States Patent
Tsuruoka

(10) Patent No.: US 8,194,160 B2
(45) Date of Patent: Jun. 5, 2012

(54) IMAGE GRADATION PROCESSING APPARATUS AND RECORDING

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 455 days.

(21) Appl. No.: 12/400,028

(22) Filed: Mar. 9, 2009

(65) Prior Publication Data
US 2009/0219416 A1  Sep. 3, 2009

Related U.S. Application Data

(63) Continuation of application No. PCT/JP2007/067222, filed on Sep. 4, 2007.

(30) Foreign Application Priority Data

Sep. 12, 2006  (JP) ................. 2006-247169

(51) Int. Cl.
  H04N 5/202  (2006.01)
  H04N 5/228  (2006.01)
  H04N 5/208  (2006.01)
  H04N 5/14   (2006.01)
  G06K 9/00   (2006.01)
  G06K 9/36   (2006.01)
  G06K 9/48   (2006.01)

(52) U.S. Cl. ............... 348/254; 348/222.1; 348/252; 348/671; 348/248; 382/169; 382/237; 382/263; 382/264; 382/199

(58) Field of Classification Search .......... 348/254, 348/255, 241–247, 248, 251, 229.1, 671, 348/222.1, 221.1, 252; 382/237, 162–169, 382/254–275, 199, 280, 284
See application file for complete search history.

(56) References Cited

U.S. PATENT DOCUMENTS

| 6,754,398 | B1 | 6/2004 | Yamada | 382/260 |
| 2004/0252907 | A1* | 12/2004 | Ito | 382/260 |

(Continued)

FOREIGN PATENT DOCUMENTS

EP  1 059 811  12/2000

(Continued)

OTHER PUBLICATIONS

International Search Report mailed Dec. 18, 2007 in corresponding PCT International Appln. No. PCT/JP2007/067222.

*Primary Examiner* — Lin Ye
*Assistant Examiner* — Marly Camargo
(74) *Attorney, Agent, or Firm* — Ostrolenk Faber LLP

(57) ABSTRACT

An image processing system includes a frequency decomposition unit adapted to decompose an image signal into a high frequency component and a low frequency component, a high frequency separation unit adapted to separate the high frequency component into an invalid component caused by noise and other valid component, a conversion characteristic calculation unit adapted to calculate a conversion characteristic on the basis of the low frequency component, a gradation processing unit adapted to perform a gradation processing on the low frequency component and the valid component on the basis of the calculated conversion characteristic, and a frequency synthesis unit adapted to generate an image signal on which a gradation conversion has been performed by synthesizing the low frequency component on which the gradation conversion has been performed, the valid component on which a gradation conversion has been performed and the invalid component.

26 Claims, 34 Drawing Sheets

U.S. PATENT DOCUMENTS

| | | | |
|---|---|---|---|
| 2005/0157189 A1 | 7/2005 | Sambongi | 348/241 |
| 2006/0050157 A1* | 3/2006 | Tsuruoka | 348/241 |

FOREIGN PATENT DOCUMENTS

| | | |
|---|---|---|
| EP | 1 555 809 | 7/2005 |
| EP | 1 677 516 | 7/2006 |
| JP | 8-056316 | 2/1996 |
| JP | 10-210323 | 8/1998 |
| JP | 10210323 A * | 8/1998 |
| JP | 2001-118062 | 4/2001 |
| JP | 2001-167264 | 6/2001 |
| JP | 2003-134352 | 5/2003 |
| JP | 2004-128985 | 4/2004 |
| JP | 2004-287794 | 10/2004 |
| JP | 2005-130297 | 5/2005 |
| WO | WO 03/036939 | 5/2003 |
| WO | WO 2004/032486 | 4/2004 |
| WO | WO 2005/041560 | 5/2005 |

* cited by examiner

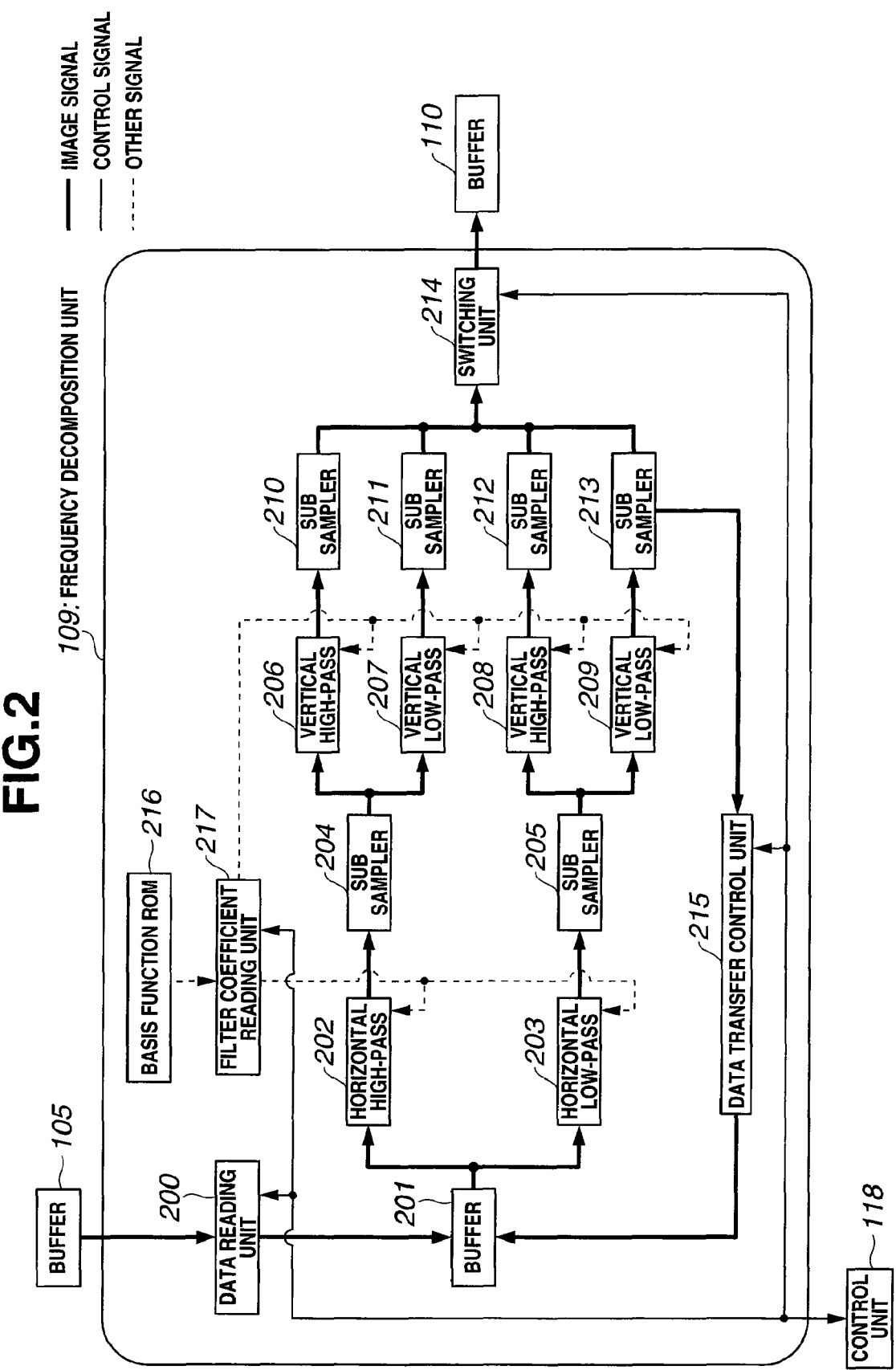

FIG.16

| $R_{00}$ | $G_{10}$ | $R_{20}$ | $G_{30}$ | $R_{40}$ | $G_{50}$ |
|---|---|---|---|---|---|
| $G_{01}$ | $B_{11}$ | $G_{21}$ | $B_{31}$ | $G_{41}$ | $B_{51}$ |
| $R_{02}$ | $G_{12}$ | $R_{22}$ | $G_{32}$ | $R_{42}$ | $G_{52}$ |
| $G_{03}$ | $B_{13}$ | $G_{23}$ | $B_{33}$ | $G_{43}$ | $B_{53}$ |
| $R_{04}$ | $G_{14}$ | $R_{24}$ | $G_{34}$ | $R_{44}$ | $G_{54}$ |
| $G_{05}$ | $B_{15}$ | $G_{25}$ | $B_{35}$ | $G_{45}$ | $B_{55}$ |

FIG.17

| $Cy_{00}$ | $Ye_{10}$ | $Cy_{20}$ | $Ye_{30}$ | $Cy_{40}$ | $Ye_{50}$ |
|---|---|---|---|---|---|
| $G_{01}$ | $Mg_{11}$ | $G_{21}$ | $Mg_{31}$ | $G_{41}$ | $Mg_{51}$ |
| $Cy_{02}$ | $Ye_{12}$ | $Cy_{22}$ | $Ye_{32}$ | $Cy_{42}$ | $Ye_{52}$ |
| $Mg_{03}$ | $G_{13}$ | $Mg_{23}$ | $G_{33}$ | $Mg_{43}$ | $G_{53}$ |
| $Cy_{04}$ | $Ye_{14}$ | $Cy_{24}$ | $Ye_{34}$ | $Cy_{44}$ | $Ye_{54}$ |
| $G_{05}$ | $Mg_{15}$ | $G_{25}$ | $Mg_{35}$ | $G_{45}$ | $Mg_{55}$ |

IMAGE GRADATION PROCESSING APPARATUS AND RECORDING

CROSS REFERENCE TO RELATED APPLICATION

This application is a continuation application of PCT/JP2007/067222 filed on Sep. 4, 2007 and claims benefit of Japanese Application No. 2006-247169 filed in Japan on Sep. 12, 2006, the entire contents of which are incorporated herein by this reference.

BACKGROUND OF THE INVENTION

1. Field of the Invention

The present invention relates to an image processing system arranged to perform a gradation conversion on an image signal and a recording medium recording an image processing program for performing the gradation conversion on the image signal.

2. Description of the Related Art

As a gradation processing to be performed on an image signal, a space-invariant method of using a single gradation conversion curve for the image signal and a space-variant method of using a plurality of gradation conversion curves different for each local region are proposed.

For example, Japanese Patent No. 3465226 discloses a technology for dividing the image signal into a plurality of regions on the basis of texture information, performing a gradation conversion processing by calculating gradation conversion curve for each region on the basis of a histogram, and performing a weighting interpolation on the basis of a distance between the respective regions. With the configuration, it is possible to perform the space-variant gradation processing and maintain the continuity between the regions, and it is possible to obtain the high quality image signals in which light-dark crush is prevented also for an image having a wide dynamic range.

Also, Japanese Unexamined Patent Application Publication No. 8-56316 discloses a technology for separating the image signal into a high frequency component and a low frequency component, performing a contrast emphasis processing on the low frequency component, and synthesizing the low frequency component after the contrast emphasis processing with the high frequency component. By employing such a technology, an emphasis on the noise of the high frequency component is prevented, and it is possible to obtain the high quality image signals.

Furthermore, Japanese Unexamined Patent Application Publication No. 2004-128985 discloses a technology for estimating a noise amount for each block unit on the basis of a noise model and performing different noise reducing processings for each block unit. By employing such a technology, it is possible to perform a space-variant noise reducing processing, and it is possible to obtain the high quality image signals in which degradation of the edge component is little.

SUMMARY OF THE INVENTION

According to an aspect of the present invention, there is provided an image processing system arranged to perform a gradation conversion on an image signal, the image processing system including: separation means adapted to separate the image signal into an invalid component caused by noise and other valid component; conversion means adapted to perform the gradation conversion on the valid component; and synthesis means adapted to synthesize an image signal on which the gradation conversion has been performed on the basis of the valid component on which the gradation conversion has been performed and the invalid component.

Also, according to an aspect of the present invention, there is provided a recording medium recording an image processing program for instructing a computer to perform a gradation conversion on an image signal, the image processing program instructing the computer to execute: a separation step of separating the image signal into an invalid component caused by noise and other valid component; a conversion step of performing the gradation conversion on the valid component; and a synthesis step of synthesizing an image signal on which the gradation conversion has been performed on the basis of the valid component on which the gradation conversion has been performed and the invalid component.

BRIEF DESCRIPTION OF THE DRAWINGS

FIG. 2 is a block diagram of a configuration example of a frequency decomposition unit according to the first embodiment;

FIG. 16 is a diagram illustrating a configuration of a Bayer-type primary color filter according to the second embodiment;

FIG. 17 is a diagram illustrating a configuration of a color-difference line-sequential type complementary color filter according to the second embodiment;

DETAILED DESCRIPTION OF THE PREFERRED EMBODIMENTS

Hereinafter, embodiments of the present invention will be described with reference to the drawings.

First Embodiment

Figure 1:
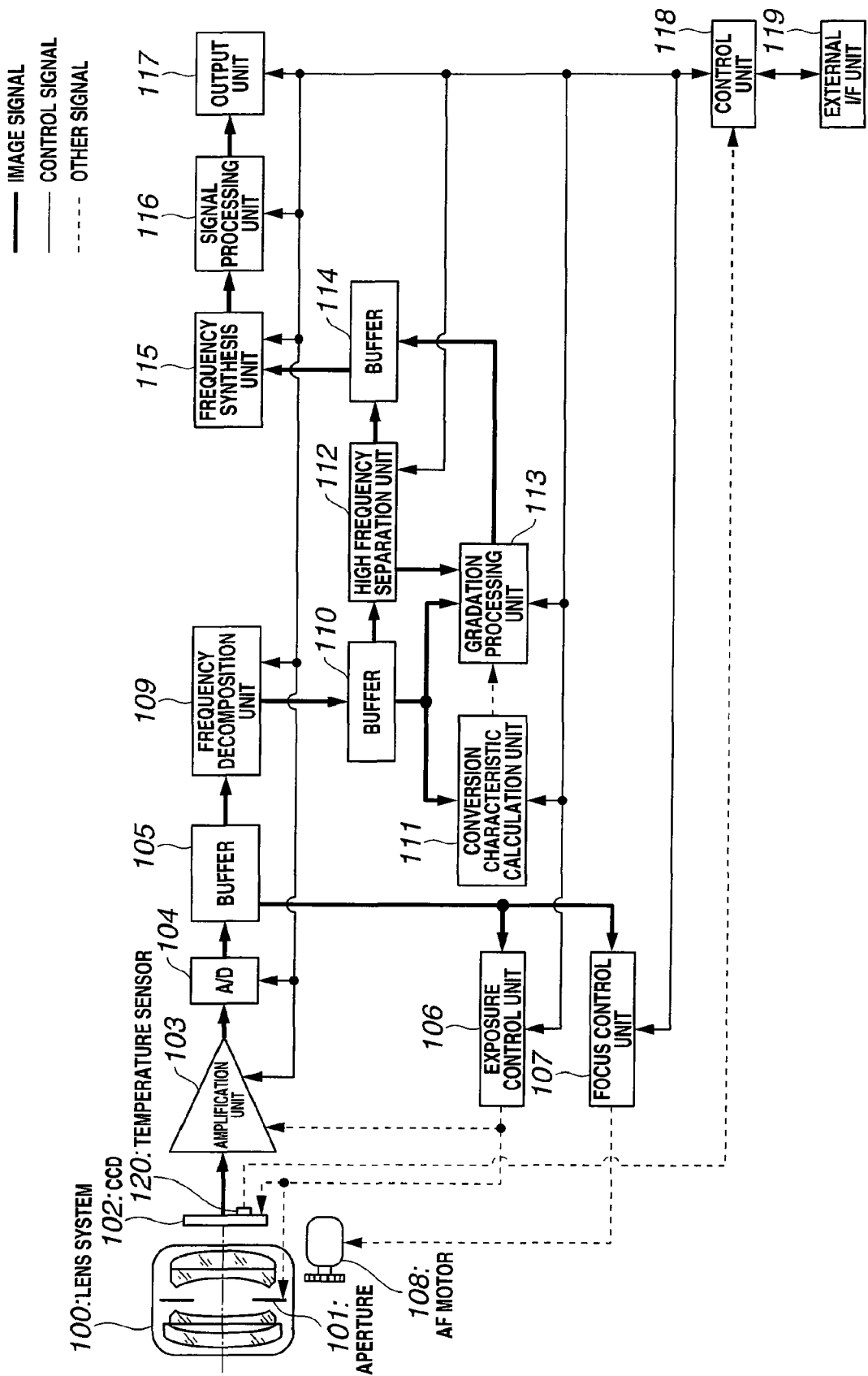
FIG. 1 is a block diagram of a configuration of an image processing system according to a first embodiment of the present invention.

FIG. 1 to FIG. 14 illustrate a first embodiment of the present invention, and FIG. 1 is a block diagram of a configuration of an image processing system.

The image processing system illustrated in FIG. 1 is an example constituted as an image pickup system including an image pickup unit.

That is, the image processing system includes a lens system 100, an aperture 101, a CCD 102, an amplification unit 103, an A/D conversion unit (in the drawing, which is simply referred to as "A/D") 104, a buffer 105, an exposure control unit 106, a focus control unit 107, an AF motor 108, a frequency decomposition unit 109 constituting separation means and frequency decomposition means, a buffer 110, a conversion characteristic calculation unit 111 constituting conversion means and conversion characteristic calculation means, a high frequency separation unit 112 constituting separation means and high frequency separation means, a gradation processing unit 113 constituting conversion means and gradation processing means, a buffer 114, a frequency synthesis unit 115 constituting synthesis means and frequency synthesis means, a signal processing unit 116, an output unit 117, a control unit 118 constituting control means and doubling as noise estimation means and collection means, an external I/F unit 119, and a temperature sensor 120.

An analog image signal captured and output via the lens system 100, the aperture 101, the CCD 102 is amplified by the amplification unit 103 and converted into a digital signal by the A/D conversion unit 104.

The image signal from the A/D conversion unit 104 is transferred via the buffer 105 to the frequency decomposition unit 109. The buffer 105 is connected to the exposure control unit 106 and also to the focus control unit 107.

The exposure control unit 106 is connected to the aperture 101, the CCD 102, and the amplification unit 103. Also, the focus control unit 107 is connected to the AF motor 108.

The signal from the frequency decomposition unit 109 is connected to the buffer 110. The buffer 110 is connected to the conversion characteristic calculation unit 111, the high frequency separation unit 112, and the gradation processing unit 113.

The conversion characteristic calculation unit 111 is connected to the gradation processing unit 113. The high frequency separation unit 112 is connected to the gradation processing unit 113 and the buffer 114. The gradation processing unit 113 is connected to the buffer 114.

The buffer 114 is connected via the frequency synthesis unit 115 and the signal processing unit 116 to the output unit 117 such as a memory card.

The control unit 118 is composed, for example, of a micro computer. The control unit 118 is bi-directionally connected to the amplification unit 103, the A/D conversion unit 104, the exposure control unit 106, the focus control unit 107, the frequency decomposition unit 109, the conversion characteristic calculation unit 111, the high frequency separation unit 112, the gradation processing unit 113, the frequency synthesis unit 115, the signal processing unit 116, and the output unit 117, and is configured to control these units.

In addition, the external I/F unit 119 is also bi-directionally connected to the control unit 118. The external I/F unit 119 is an interface provided with a power supply switch, a shutter button, a mode button for performing switching of various modes for each shooting operation, and the like.

Furthermore, the signal from the temperature sensor 120 is also connected to the control unit 118. The temperature sensor 120 is arranged in a neighborhood of the CCD 102, and is configured to substantially measure the temperature of the CCD 102.

Next, the action of the image processing system illustrated in FIG. 1 will be described along the flow of the image signal.

Before performing the shooting operation, the user sets image pickup conditions such as an ISO sensitivity via the external I/F unit 119.

After that, when the user performs a half press of the shutter button which is composed of a two-stage switch of the external I/F unit 119, the image processing system is turned into a pre-image pickup device.

The lens system 100 forms an optical image of a subject on an image pickup plane of the CCD 102.

The aperture 101 regulates a passage range of the subject luminous flux which has been formed into image by the lens system to change the luminance of the optical image formed on the image pickup plane of the CCD 102.

The CCD 102 photoelectrically converts the formed optical image and outputs as an analog image signal. It should be noted that according to the present embodiment, as the CCD 102, a monochrome single CCD is considered. But, the image pickup device is not limited to the CCD, but of course a CMOS or other image pickup devices may be used.

The analog signal output in this manner from the CCD 102 is amplified by the amplification unit 103 by a predetermined amount while taking into account the ISO sensitivity. Thereafter, the analog signal is converted into the digital signal by the A/D conversion unit 104 to be transferred to the buffer 105. It should be noted that according to the present embodiment, the gradation width of the digitalized image signal is set, for example, as 12-bits.

The image signal stored in the buffer 105 is transferred to the exposure control unit 106 and the focus control unit 107.

While taking into account the set ISO sensitivity, the shutter speed at a limit of image stability, and the like, the exposure control unit 106 performs a control on an aperture value of the aperture 101, an electronic shutter speed of the CCD 102, a gain of the amplification unit 103, and the like to achieve the correct exposure on the basis of the image signal.

Also, the focus control unit 107 obtains a focus signal by detecting the edge intensity and controls the AF motor 108 so that the edge intensity becomes the largest on the basis of the image signal.

In this way, after the focus adjustment, the exposure adjustment, or the like is performed, when the user performs a full press of a shutter button which is composed of a two-stage switch of the external I/F unit 119, the image processing system functions as a real shooting device.

After that, similarly to the pre shooting, the image signal is transferred to the buffer 105. The real shooting operation is performed on the basis of the exposure conditions calculated by the exposure control unit 106 and the focus conditions calculated by the focus control unit 107, and these conditions for each shooting operation are transferred to the control unit 118.

The image signal in the buffer 105 obtained by the real shooting operation is transferred to the frequency decomposition unit 109.

On the basis of the control of the control unit 118, the frequency decomposition unit 109 performs a predetermined frequency decomposition on the transferred image signal to obtain a high frequency component and a low frequency component. Then, the frequency decomposition unit 109 sequentially transfers the thus obtained high frequency component and the low frequency component to the buffer 110. It should be noted that according to the present embodiment, for the frequency decomposition, it is supposed to employ the wavelet transform by two times.

The conversion characteristic calculation unit 111 reads the low frequency component from the buffer 110 to calculate gradation characteristics used for the gradation conversion processing on the basis of the control of the control unit 118. It should be noted that according to the present embodiment, as the gradation conversion processing, a space-variant processing which uses a plurality of gradation characteristics different for each local region is supposed. Then, the conversion characteristic calculation unit 111 transfers the calculated gradation characteristics to the gradation processing unit 113.

The high frequency separation unit 112 reads the high frequency component from the buffer 110 to separate the high frequency component into an invalid component caused by noise and other valid component. Then, the high frequency separation unit 112 transfers the thus separated valid component to the gradation processing unit 113 and the above-mentioned invalid component to the buffer 114, respectively.

The gradation processing unit 113 reads the low frequency component from the buffer 110, the valid component in the high frequency component from the high frequency separation unit 112, and the gradation characteristic from the conversion characteristic calculation unit 111, respectively, on the basis of the control of the control unit 118. Then, the gradation processing unit 113 performs the gradation processing on the low frequency component and the valid component in the high frequency component on the basis of the above-mentioned gradation characteristic. The gradation processing unit 113 transfers the low frequency component on which the gradation processing has been performed and the valid component in the high frequency component on which the gradation processing has been performed to the buffer 114.

The frequency synthesis unit 115 reads the low frequency component on which the gradation processing has been performed, the valid component in the high frequency component on which the gradation processing has been performed, and the invalid component in the high frequency component from the buffer 114, and synthesizes the image signal on which the gradation processing has been performed on the basis of these components under the control of the control unit 118. It should be noted that according to the present embodiment, it is supposed to use the inverse wavelet transform as the frequency synthesis. Then, the frequency synthesis unit 115 transfers the synthesized image signal to the signal processing unit 116.

The signal processing unit 116 performs a known compression processing or the like on the image signal from the image signal the frequency synthesis unit 115 and transfers the signal after the processing to the output unit 117 on the basis of the control of the control unit 118.

The output unit 117 records and saves the image signal output from the signal processing unit 116 in the recording medium such as a memory card.

Next, FIG. 2 is a block diagram of a configuration example of the frequency decomposition unit 109.

The frequency decomposition unit 109 includes a data reading unit 200, a buffer 201, a horizontal high-pass filter (in the drawing, which is simply referred to as "horizontal high-pass", and the same applies in the following description) 202, a horizontal low-pass filter (in the drawing, which is simply referred to as "horizontal low-pass", and the same applies in the following description) 203, a sub sampler 204, a sub sampler 205, a vertical high-pass filter (in the drawing, which is simply referred to as "vertical high-pass", and the same applies in the following description) 206, a vertical low-pass filter (in the drawing, which is simply referred to as "vertical low-pass", and the same applies in the following description) 207, a vertical high-pass filter 208, a vertical low-pass filter 209, a sub sampler 210, a sub sampler 211, a sub sampler 212, a sub sampler 213, a switching unit 214, a data transfer control unit 215, a basis function ROM 216, and a filter coefficient reading unit 217.

The buffer 105 is connected via the data reading unit 200 to the buffer 201.

The buffer 201 is connected to the horizontal high-pass filter 202 and the horizontal low-pass filter 203.

The horizontal high-pass filter 202 is connected via the sub sampler 204 to the vertical high-pass filter 206 and the vertical low-pass filter 207. The horizontal low-pass filter 203 is connected via the sub sampler 205 to the vertical high-pass filter 208 and the vertical low-pass filter 209.

The vertical high-pass filter 206 is connected to the sub sampler 210, the vertical low-pass filter 207 is connected to the sub sampler 211, the vertical high-pass filter 208 is connected to the sub sampler 212, and the vertical low-pass filter 209 is connected to the sub sampler 213, respectively.

The sub sampler 210, the sub sampler 211, and the sub sampler 212 are connected to the switching unit 214.

The sub sampler 213 is connected to the switching unit 214 and the data transfer control unit 215. The switching unit 214 is connected to the buffer 110. The data transfer control unit 215 is connected to the buffer 201.

The basis function ROM 216 is connected to the filter coefficient reading unit 217. The filter coefficient reading unit 217 is connected to the horizontal high-pass filter 202, the horizontal low-pass filter 203, the vertical high-pass filter 206, the vertical low-pass filter 207, the vertical high-pass filter 208, and the vertical low-pass filter 209.

The control unit 118 is bi-directionally connected to the data reading unit 200, the switching unit 214, the data transfer control unit 215, and the filter coefficient reading unit 217 to control these units.

The basis function ROM 216 records filter coefficients used for the wavelet transform such as Harr function or Daubechies function. Among these, for example, the coefficient of the high-pass filter in the Harr function is represented by Numeric Expression 1 and the coefficient of the low-pass filter is represented by Numeric Expression 2, respectively.

High-pass filter coefficient={0.5,−0.5}   [Expression 1]

Low-pass filter coefficient={0.5,0.5}   [Expression 2]

It should be noted that these filter coefficients are commonly used in the horizontal direction and the vertical direction.

The filter coefficient reading unit 217 reads the filter coefficients from the basis function ROM 216, transfers the high-pass filter coefficient to the horizontal high-pass filter 202, the vertical high-pass filter 206, and the vertical high-pass filter 208, and transfers the low-pass filter coefficient to the horizontal low-pass filter 203, the vertical low-pass filter 207, and the vertical low-pass filter 209, respectively, on the basis of the control of the control unit 118.

In this way, after the filter coefficients are transferred to the respective high-pass filters and the respective low-pass filters, on the basis of the control of the control unit 118, the data reading unit 200 reads the image signal from the buffer 105 to be transferred to the buffer 201. It should be noted that in the following description, the image signal read from the buffer 105 and stored on the buffer 201 is set as $L_0$.

The image signal on the buffer 201 is subjected to the filtering processing in the horizontal direction and the vertical direction by the horizontal high-pass filter 202, the horizontal low-pass filter 203, the vertical high-pass filter 206, the vertical low-pass filter 207, the vertical high-pass filter 208, and the vertical low-pass filter 209.

At this time, the sub sampler 204 and the sub sampler 205 perform the sub sampling on the input image signal in the horizontal direction into ½, and the sub sampler 210, the sub sampler 211, the sub sampler 212, and the sub sampler 213 performs the sub sampling on the input image signal in the vertical direction into ½.

Therefore, the output of the sub sampler 210 provides a high frequency component $Hs1_{ij}$ in the slanted direction in the transform performed for the first time, the output of the sub sampler 211 provides a first-order high frequency component $Hh1_{ij}$ in the horizontal direction in the transform performed for the first time, the output of the sub sampler 212 provides a first-order high frequency component $Hv1_{ij}$ in the vertical direction in the transform performed for the first time, the output of the sub sampler 213 provides a first-order low frequency component $L1_{ij}$ in the transform performed for the first time, respectively. Herein, suffixes i and j mean coordinates in x and y directions in the first-order signal after the transform.

Figure 3A:
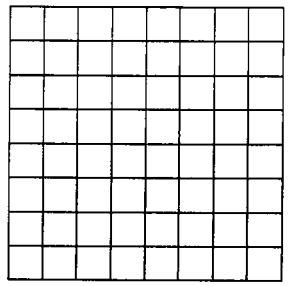
FIG. 3A is an explanatory diagram for describing a wavelet transform, illustrating an image signal in a real space according to the first embodiment.
Figure 3B:
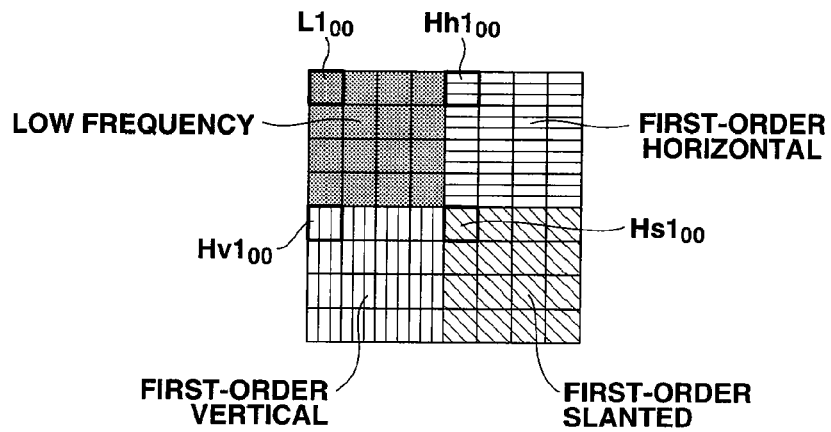
FIG. 3B is an explanatory diagram for describing the wavelet transform, illustrating the signal after the first wavelet transform has been performed according to the first embodiment.
Figure 3C:
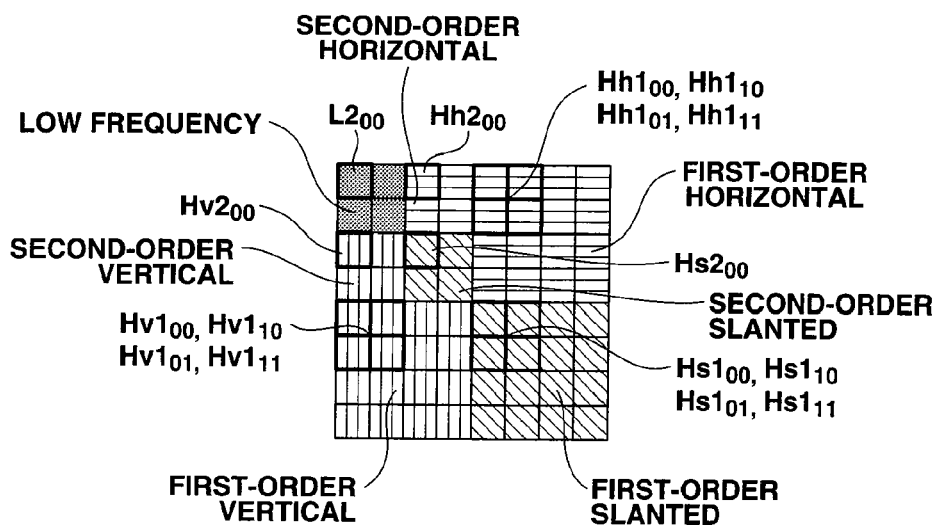
FIG. 3C is an explanatory diagram for describing the wavelet transform, illustrating the signal after the second wavelet transform has been performed according to the first embodiment.

FIGS. 3A to 3C are explanatory diagrams for describing the wavelet transform: FIG. 3A illustrates the image signal in the real space, FIG. 3B illustrates the signal after the wavelet transform is performed for the first time, and FIG. 3C illustrates the signal after the wavelet transform is performed for the second time, respectively.

When the wavelet transform is performed for the first time on the image signal in the real space as illustrated in FIG. 3A, the signal becomes as illustrated in FIG. 3B. Also, FIG. 3B illustrates the first-order high frequency component $Hs1_{00}$ in the slanted direction, the first-order high frequency component $Hh1_{00}$ in the horizontal direction, and the first-order high frequency component $Hv1_{00}$ in the vertical direction corresponding to the low frequency component $L1_{00}$.

In the transform performed for the first time, the three first-order high frequency components $Hs1_{ij}$, $Hh1_{ij}$, and $Hv1_{ij}$ corresponding to the first-order low frequency component $L1_{ij}$ of one pixel, are all one pixel.

On the basis of the control of the control unit 118, the switching unit 214 sequentially transfers the above-mentioned three first-order high frequency components $Hs1_{ij}$, $Hh1_{ij}$, and $Hv1_{ij}$ and the first-order low frequency component $L1_{ij}$ to the buffer 110.

Also, the data transfer control unit 215 transfers the first-order low frequency component $L1_{ij}$ from the sub sampler 213 to the buffer 201 on the basis of the control of the control unit 118.

As the filtering processing similar to the above is performed on the first-order low frequency component $L1_{ij}$ on the buffer 201, three second-order high frequency components $Hs2_{kl}$, $Hh2_{kl}$, and $Hv2_{kl}$ and a second-order low frequency component $L2_{kl}$ are output. Herein, suffixes k and l mean coordinates in the x and y directions in the second-order signal after the transform.

FIG. 3C illustrates the signal in such a transform performed for the second time.

As illustrated in FIG. 3C, in the transform performed for the second time, the second-order high frequency component in the slanted direction corresponding to the second-order low frequency component $L2_{00}$ of one pixel becomes $Hs2_{00}$, the second-order high frequency component in the horizontal direction becomes $Hh2_{00}$, and the second-order high frequency component in the vertical direction becomes $Hv2_{00}$, all of which are one pixel, but the first-order high frequency components in the corresponding slanted direction become $Hs1_{00}$, $Hs1_{10}$, $Hs1_{01}$, and $Hs1_{11}$, the first-order high frequency components in the horizontal direction become $Hh1_{00}$, $Hh1_{10}$, $Hh1_{01}$, and $Hh1_{11}$, and the first-order high frequency components in the vertical direction become $Hv1_{00}$, $Hv1_{10}$, $Hv1_{01}$, and $Hv1_{11}$, all of which are four pixels. The above-mentioned procedure is repeatedly performed until decomposition at a predetermined n (n is an integer equal to or larger than 1, and according to the present embodiment, as described above, n=2 is supposed) stage is performed on the basis of the control of the control unit 118.

Figure 4:
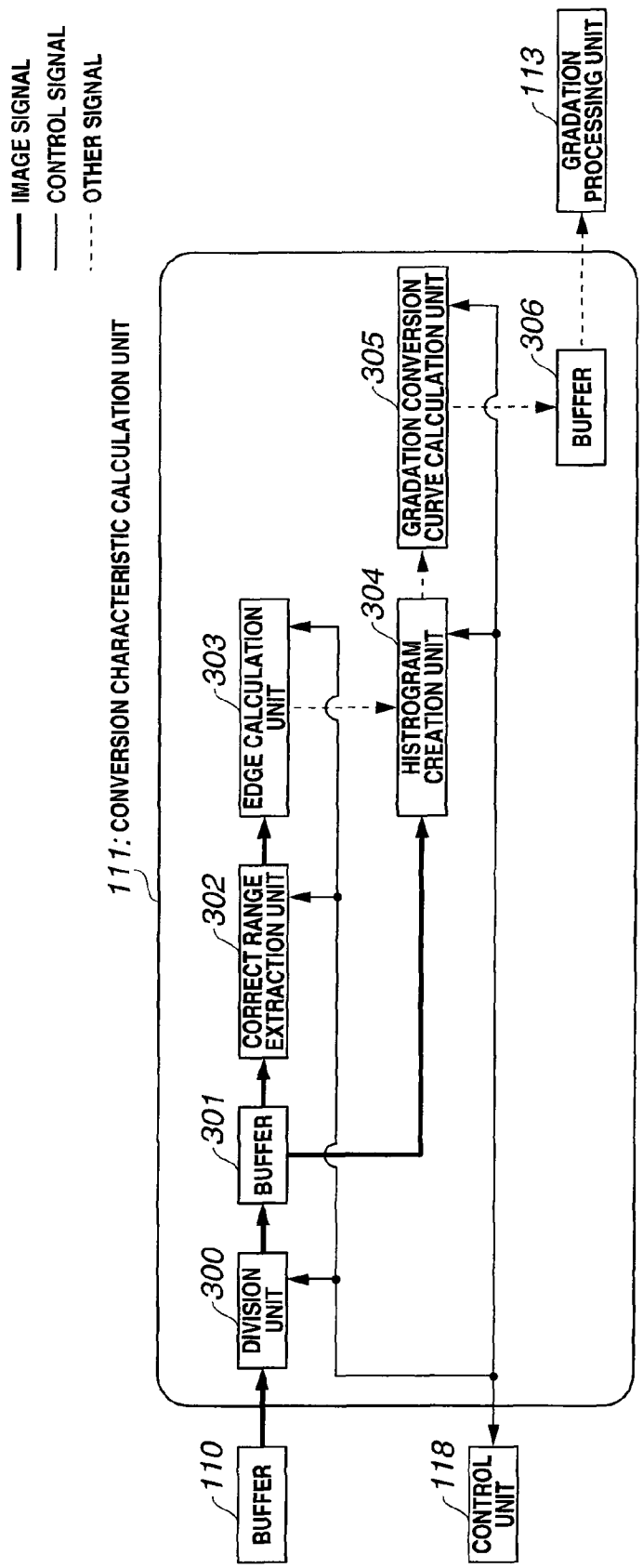
FIG. 4 is a block diagram of a configuration example of a conversion characteristic calculation unit according to the first embodiment.

Next, FIG. 4 is a block diagram of a configuration example of the conversion characteristic calculation unit 111.

The conversion characteristic calculation unit 111 includes a division unit 300 constituting division means, a buffer 301, a correct range extraction unit 302 constituting correct range extraction means, an edge calculation unit 303 constituting region-of-interest setting means and edge calculation means, a histogram creation unit 304 constituting histogram creation means, a gradation conversion curve calculation unit 305 constituting gradation conversion curve calculation means, and a buffer 306.

The buffer 110 is connected via the division unit 300 to the buffer 301.

The buffer 301 is connected to the correct range extraction unit 302 and the histogram creation unit 304. The correct range extraction unit 302 is connected via the edge calculation unit 303 to the histogram creation unit 304.

The histogram creation unit 304 is connected via the gradation conversion curve calculation unit 305 and the buffer 306 to the gradation processing unit 113.

The control unit 118 is bi-directionally connected to the division unit 300, the correct range extraction unit 302, the edge calculation unit 303, the histogram creation unit 304, and the gradation conversion curve calculation unit 305 to control these units.

Subsequently, a description will be given of the action of the conversion characteristic calculation unit 111.

Figure 7:
FIG. 7 is an explanatory diagram for describing a division into regions of a low frequency component in a synthesis operation for gradation conversion curves according to the first embodiment.

The division unit 300 reads the low frequency component of the image signal from the buffer 110 on the basis of the control of the control unit 118 and divides the low frequency component into regions of a predetermined size shown in FIG. 7, for example, a 32×32 pixel size, so that the respective regions are not overlapped one another. Herein, FIG. 7 is an explanatory diagram for describing the division into the regions of the low frequency component in the synthesis operation of the gradation conversion curves. Then, the division unit 300 sequentially transfers the divided regions to the buffer 301.

The correct range extraction unit 302 reads the low frequency components from the buffer 301 for each local region unit on the basis of the control of the control unit 118. The correct range extraction unit 302 compares the low frequency components with the pre-set threshold related to the dark part (by way of an example, in the case of 12-bit gradation, for example, 128) and the pre-set threshold related to the light part (in the case of the 12-bit gradation, for example, 3968), and transfers the low frequency components which are equal to or larger than the threshold of the dark part and also equal to or smaller than the threshold of the light part as the correct exposure range to the edge calculation unit 303.

The edge calculation unit 303 reads the low frequency components in the correct exposure range from the correct range extraction unit 302 on the basis of the control of the control unit 118, and uses a Laplacian filter or the like to calculate the known edge intensity. The edge calculation unit 303 transfers the calculated edge intensity to the histogram creation unit 304.

The histogram creation unit 304 selects a pixel having an edge intensity which is equal to or larger than the pre-set threshold (in the case of the above-mentioned 12-bit gradation, for example, 64) regarding the edge intensity from the edge calculation unit 303, and reads the low frequency components at the corresponding pixel positions from the buffer 301 on the basis of the control of the control unit 118. Then, the histogram creation unit 304 creates a histogram related to the read low frequency components and transfers the created histogram to the gradation conversion curve calculation unit 305.

The gradation conversion curve calculation unit 305 accumulates and furthermore normalizes the histograms from the histogram creation unit 304 on the basis of the control of the control unit 118 to calculate the gradation conversion curve. The normalization is performed while following the gradation of the image signal. In the case of the above-mentioned 12-bit gradation, the normalization is performed so as to have the range of 0 to 4095. The gradation conversion curve calculation unit 305 transfers the calculated gradation conversion curve to the buffer 306.

It should be noted that the respective processings in the correct range extraction unit 302, the edge calculation unit 303, the histogram creation unit 304, and the gradation conversion curve calculation unit 305 are performed in synchronization for each local region unit on the basis of the control of the control unit 118.

Figure 5:
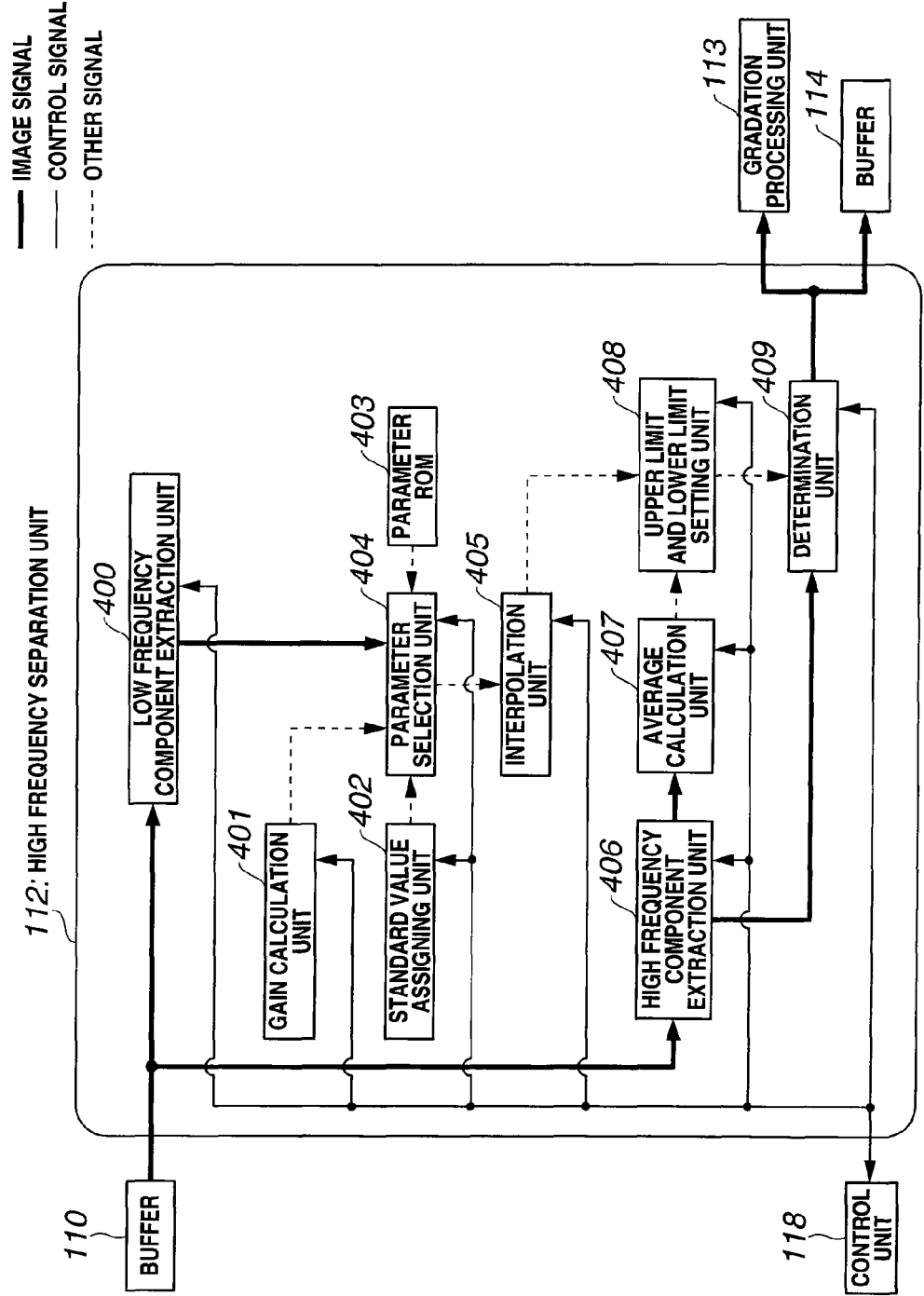
FIG. 5 is a block diagram of a configuration example of a high frequency separation unit according to the first embodiment.

Next, FIG. 5 is a block diagram of a configuration example of the high frequency separation unit 112.

The high frequency separation unit 112 includes a low frequency component extraction unit 400, a gain calculation unit 401 constituting noise estimation means and collection means, a standard value assigning unit 402 constituting noise estimation means and assigning means, a parameter ROM 403 constituting noise estimation means and recording means, a parameter selection unit 404 constituting noise estimation means and parameter selection means, an interpolation unit 405 constituting noise estimation means and interpolation means, a high frequency component extraction unit 406, an average calculation unit 407 constituting setting means and average calculation means, an upper limit and lower limit setting unit 408 constituting setting means and upper limit and lower limit setting means, and a determination unit 409 constituting determination means.

The buffer 110 is connected to the low frequency component extraction unit 400 and the high frequency component extraction unit 406. The low frequency component extraction unit 400 is connected to the parameter selection unit 404.

The gain calculation unit 401, the standard value assigning unit 402, and the parameter ROM 403 are connected to the parameter selection unit 404. The parameter selection unit 404 is connected via the interpolation unit 405 to the upper limit and lower limit setting unit 408.

The high frequency component extraction unit 406 is connected to the average calculation unit 407 and the determination unit 409. The average calculation unit 407 is connected via the upper limit and lower limit setting unit 408 to the determination unit 409.

The determination unit 409 is connected to the gradation processing unit 113 and the buffer 114.

The control unit 118 is bi-directionally connected to the low frequency component extraction unit 400, the gain calculation unit 401, the standard value assigning unit 402, the parameter selection unit 404, the interpolation unit 405, the high frequency component extraction unit 406, the average calculation unit 407, the upper limit and lower limit setting unit 408, and the determination unit 409 to control these units.

Subsequently, a description will be given of the action of the high frequency separation unit 112.

The low frequency component extraction unit 400 sequentially extracts the low frequency components from the buffer 110 for each pixel on the basis of the control of the control unit 118. It should be noted that according to the present embodiment, it is supposed to perform the wavelet transform by two times. In this case, the low frequency component extracted from the buffer 110 by the low frequency component extraction unit 400 becomes the second-order low frequency component $L2_{kl}$ as illustrated in FIG. 3C.

On the basis of the information related to the ISO sensitivity and the exposure condition transferred from the control unit 118, the gain calculation unit 401 calculates the gain information in the amplification unit 103 and transfers the calculated gain information to the parameter selection unit 404.

Also, the control unit 118 obtains temperature information of the CCD 102 from the temperature sensor 120 and transfers the thus obtained temperature information to the parameter selection unit 404.

On the basis of the control of the control unit 118, in a case where at least one of the above-mentioned gain information and the temperature information cannot be obtained, the standard value assigning unit 402 transfers a standard value of the information that cannot be obtained to the parameter selection unit 404.

The parameter selection unit 404 searches the parameter ROM 403 for a parameter of a reference noise model used for estimating the noise amount on the basis of the pixel value of the target pixel from the low frequency component extraction unit 400, the gain information from the gain calculation unit 401 or the standard value assigning unit 402, and the temperature information from the control unit 118 or the standard value assigning unit 402. Then, the parameter selection unit 404 transfers the searched parameter to the interpolation unit 405. Also, the parameter selection unit 404 transfers the image signal of the low frequency component from the low frequency component extraction unit 400 to the interpolation unit 405.

The interpolation unit 405 calculates a noise amount N related to the low frequency component on the basis of the parameter of the reference noise model and transfers the calculated noise amount N to the upper limit and lower limit setting unit 408.

It should be noted that to be more specific, the above-mentioned calculation of the noise amount N based on the parameter ROM 403, the parameter selection unit 404, and the interpolation unit 405 can be realized through the technology disclosed in Japanese Unexamined Patent Application Publication No. 2004-128985 described above, for example.

The high frequency component extraction unit 406 extracts the high frequency component corresponding to the low frequency component extracted by the low frequency component extraction unit 400 and the high frequency components located in the neighborhood of the high frequency component on the basis of the control of the control unit 118.

For example, in a case where the second-order low frequency component $L2_{00}$ illustrated in FIG. 3C is extracted as the low frequency component, the high frequency components corresponding to the second-order low frequency component $L2_{00}$ become total three pixels of $Hs2_{00}$, $Hh2_{00}$, and $Hv2_{00}$ which are the second-order high frequency components and total 12 pixels of $Hs1_{00}$, $Hs1_{10}$, $Hs1_{01}$, $Hs1_{11}$, $Hh1_{00}$, $Hh1_{10}$, $Hh1_{01}$, $Hh1_{11}$, $Hv1_{00}$, $Hv1_{10}$, $Hv1_{01}$, and $Hv1_{11}$ which are the first-order high frequency components.

Also, as the high frequency component located in a neighborhood of the high frequency components, for example, a region of 2×2 pixels including the corresponding high frequency component is selected.

The high frequency component extraction unit 406 sequentially transfers the high frequency component corresponding to the low frequency component and the high frequency components located in the neighborhood of the high frequency component to the average calculation unit 407, and sequentially transfers the high frequency component corresponding to the low frequency component to the determination unit 409.

On the basis of the control of the control unit 118, from the high frequency component corresponding to the low frequency component and the high frequency components located in the neighborhood of the high frequency component, the average calculation unit 407 calculates an average value AV and transfers the calculated average value AV to the upper limit and lower limit setting unit 408.

On the basis of the control of the control unit 118, by using the average value AV from the average calculation unit 407 and the noise amount N from the interpolation unit 405, the upper limit and lower limit setting unit 408 sets an upper limit App_Up and a lower limit App_Low for distinguishing the valid component and the invalid component as represented by Numeric Expression 3 as follows.

$$App\_Up = AV + N/2$$

$$App\_Low = AV - N/2 \quad \text{[Expression 3]}$$

The upper limit and lower limit setting unit 408 transfers the thus set upper limit App_Up and the lower limit App_Low to the determination unit 409.

On the basis of the control of the control unit 118, the determination unit 409 reads the high frequency component corresponding to the low frequency component from the high frequency component extraction unit 406 and also reads the upper limit App_Up and the lower limit App_Low shown in Numeric Expression 3 from the upper limit and lower limit setting unit 408. Then, in a case where the high frequency component is in range between the upper limit App_Up and the lower limit App_Low (for example, in a range equal to or larger than the lower limit App_Low and also equal to or smaller than the upper limit App_Up), the determination unit 409 determines that the high frequency component is the invalid component caused by the noise and transfers the high frequency component to the buffer 114. On the other hand, in a case where the high frequency component exceeds the upper limit App_Up (larger than the upper limit App_Up) or falls short of the lower limit App_Low (smaller than the lower limit App_Low), the determination unit 409 determines that the high frequency component is the valid component and transfers the high frequency component to the gradation processing unit 113.

It should be noted that the respective processings in the average calculation unit 407, the upper limit and lower limit setting unit 408, and the determination unit 409 described above are performed in synchronization for the respective pixels of the corresponding high frequency components on the basis of the control of the control unit 118.

Figure 6:
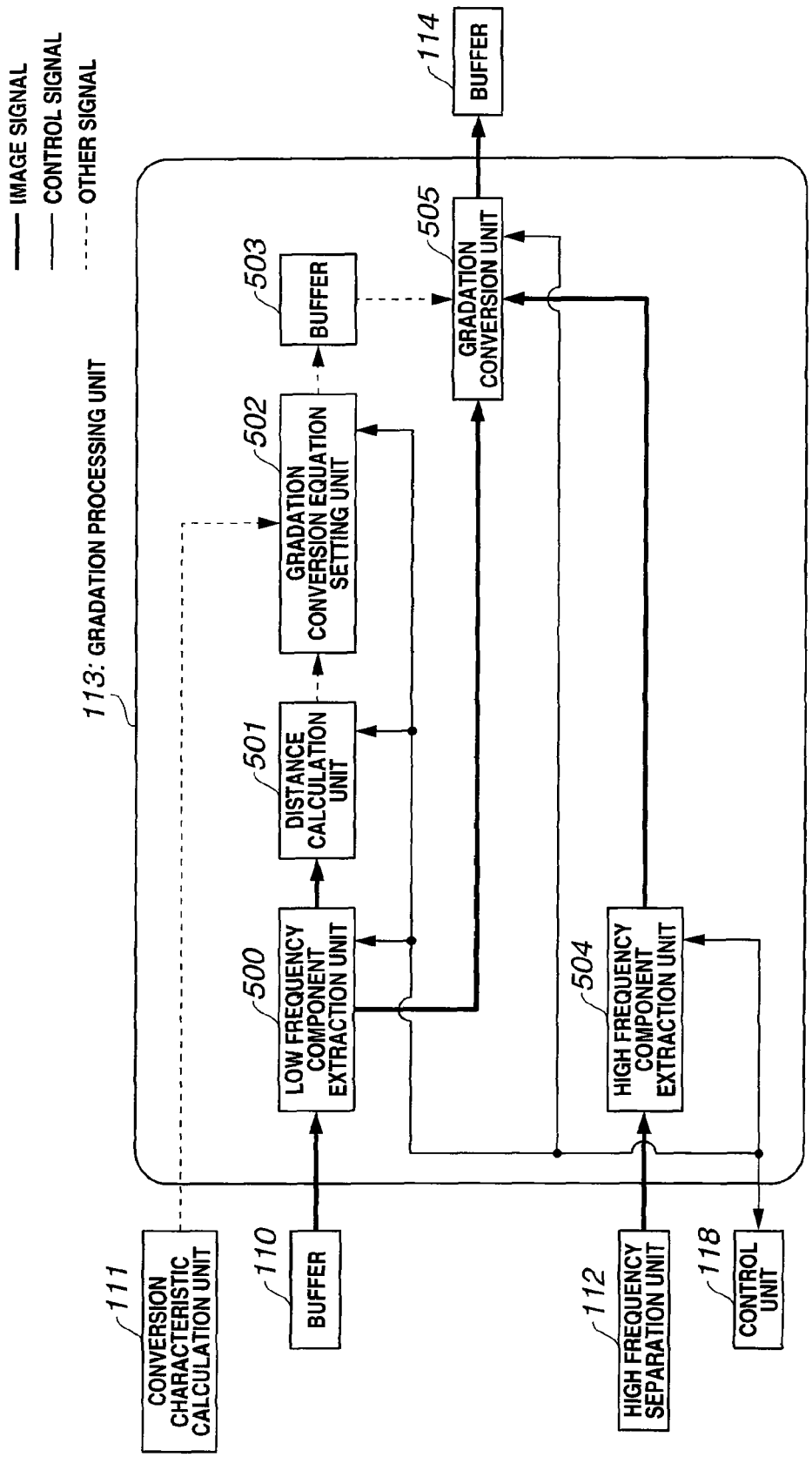
FIG. 6 is a block diagram of a configuration example of a gradation processing unit according to the first embodiment.

Next, FIG. 6 is a block diagram of a configuration example of the gradation processing unit 113.

The gradation processing unit 113 is configured by including a low frequency component extraction unit 500 constituting first extraction means, a distance calculation unit 501 constituting distance calculation means, a gradation conversion equation setting unit 502 constituting gradation conversion equation setting means, a buffer 503, a high frequency component extraction unit 504 constituting second extraction means, and a gradation conversion unit 505 constituting gradation conversion means.

The conversion characteristic calculation unit 111 is connected to the gradation conversion equation setting unit 502.

The buffer 110 is connected to the low frequency component extraction unit 500. The low frequency component extraction unit 500 is connected to the distance calculation unit 501 and the gradation conversion unit 505. The distance calculation unit 501 is connected to the gradation conversion unit 505 via the gradation conversion equation setting unit 502 and the buffer 503.

The high frequency separation unit 112 is connected via the high frequency component extraction unit 504 to the gradation conversion unit 505.

The gradation conversion unit 505 is connected to the buffer 114.

The control unit 118 is bi-directionally connected to the low frequency component extraction unit 500, the distance calculation unit 501, the gradation conversion equation setting unit 502, the high frequency component extraction unit 504, and the gradation conversion unit 505 to control these units.

Subsequently, a description will be given of the action of the gradation processing unit 113.

The low frequency component extraction unit 500 sequentially extracts the low frequency components from the buffer 110 for each pixel on the basis of the control of the control unit 118. It should be noted that according to the present embodiment, as described above, it is supposed to perform the wavelet transform by two times. In this case, the target pixel of the low frequency component extracted by the low frequency component extraction unit 500 from the buffer 110 becomes the second-order low frequency component $L2_{kl}$ as illustrated in FIG. 3C.

The low frequency component extraction unit 500 transfers the extracted low frequency components to the distance calculation unit 501 and the gradation conversion unit 505.

The distance calculation unit 501 calculates distances between the target pixel extracted by the low frequency component extraction unit 500 and four regions in a neighborhood of the target pixel.

Figure 8:
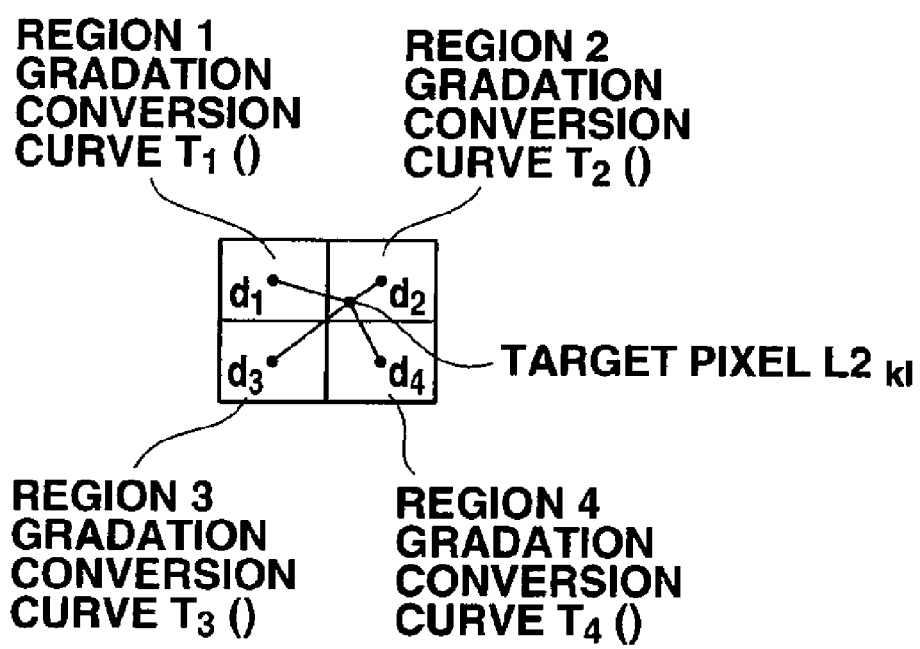
FIG. 8 is an explanatory diagram for describing distances $d_1$ to $d_4$ between a target pixel and neighboring four regions in the synthesis operation for gradation conversion curves according to the first embodiment.

FIG. 8 is an explanatory diagram of the distances between the target pixel and the neighboring four regions $d_1$ to $d_4$ in the synthesis operation of the gradation conversion curves.

The distances between the target pixel and the neighboring four regions are respectively calculated as a distance between the target pixel and the center of the respective regions. In the following description, the calculated distances between the target pixel and the neighboring four regions are represented by $d_m$ (m=1 to 4), and the respective gradation conversion curves of the neighboring four regions are represented by $T_m(\ )$. The distance calculation unit 501 transfers the calculated distances $d_m$ to the gradation conversion equation setting unit 502.

On the basis of the control of the control unit 118, the gradation conversion equation setting unit 502 reads the distances $d_m$ from the distance calculation unit 501 and also reads the corresponding gradation conversion curve $T_m(\ )$ of the neighboring four regions from the conversion characteristic calculation unit 111 to set the gradation conversion equation with respect to the target pixel as shown in Numeric Expression 4 as follows.

$$P' = \frac{1}{D}\left(\frac{T_1(P)}{d_1} + \frac{T_2(P)}{d_2} + \frac{T_3(P)}{d_3} + \frac{T_4(P)}{d_4}\right) \quad [\text{Expression 4}]$$

$$\text{Where } D = \frac{1}{d_1} + \frac{1}{d_2} + \frac{1}{d_3} + \frac{1}{d_4}$$

Herein, P in Numeric Expression 4 means a pixel of a target of the gradation conversion processing, and P' means a pixel after the gradation conversion processing, respectively.

The gradation conversion equation setting unit 502 transfers the gradation conversion equation set as shown in Numeric Expression 4 to the buffer 503.

On the other hand, the high frequency component extraction unit 504 extracts the extracted high frequency components corresponding to the low frequency components extracted by the low frequency component extraction unit 500 from the high frequency separation unit 112 on the basis of the control of the control unit 118. According to the present embodiment, as the target pixel of the low frequency component is the second-order low frequency component $L2_{kl}$ shown in FIG. 3C, the extracted high frequency components becomes total three pixels including one pixel each from the second-order high frequency components $Hs2_{kl}$, $Hh2_{kl}$, and $Hv2_{kl}$ and total 12 pixels including four pixels each from the first-order high frequency components $Hs1ij$, $Hh1ij$, and $Hv1ij$. Then, the high frequency component extraction unit 504 transfers the extracted high frequency components to the gradation conversion unit 505.

After that, in a case where the high frequency component from the high frequency component extraction unit 504 exists, the gradation conversion unit 505 reads the high frequency component and also reads the gradation conversion equation shown in Numeric Expression 4 from the buffer 503. On the basis of the read gradation conversion equation, the gradation conversion unit 505 performs the gradation conversion on the high frequency components. The gradation conversion unit 505 transfers the high frequency component after the gradation conversion to the buffer 114. On the other hand, in a case where it is determined that the corresponding high frequency component is the invalid component and the extracted high frequency component does not exist, on the basis of the control of the control unit 118, the gradation conversion unit 505 cancels the gradation conversion on the high frequency component.

Also, the gradation conversion unit 505 reads the low frequency component from the low frequency component extraction unit 500 and the gradation conversion equation shown in Numeric Expression 4 from the buffer 503, respectively, to perform the gradation conversion on the low frequency component. The gradation conversion unit 505 transfers the low frequency component after the gradation conversion to the buffer 114.

Figure 9:
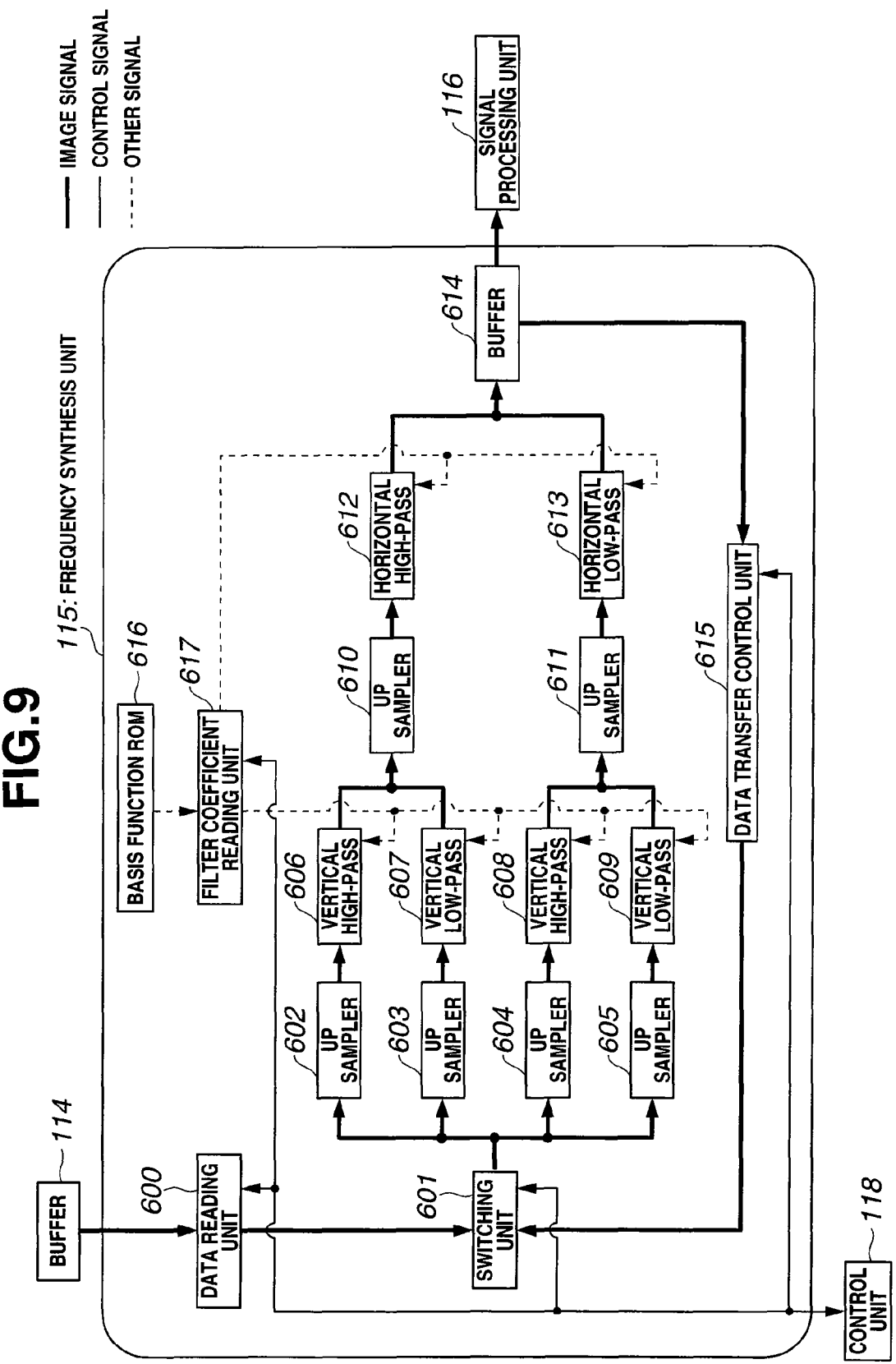
FIG. 9 is a block diagram of a configuration example of a frequency synthesis unit according to the first embodiment.

Next, FIG. 9 is a block diagram of a configuration example of the frequency synthesis unit 115.

The frequency synthesis unit 115 is configured by including a data reading unit 600, a switching unit 601, an up sampler 602, an up sampler 603, an up sampler 604, an up sampler 605, a vertical high-pass filter 606, a vertical low-pass filter 607, a vertical high-pass filter 608, a vertical low-pass filter 609, an up sampler 610, an up sampler 611, a horizontal high-pass filter 612, a horizontal low-pass filter 613, a buffer 614, a data transfer control unit 615, a basis function ROM 616, and a filter coefficient reading unit 617.

The buffer 114 is connected via the data reading unit 600 to the switching unit 601. The switching unit 601 is connected to the up sampler 602, the up sampler 603, the up sampler 604, and the up sampler 605. The up sampler 602 is connected to the vertical high-pass filter 606, the up sampler 603 is connected to the vertical low-pass filter 607, the up sampler 604 is connected to the vertical high-pass filter 608, and the up sampler 605 is connected to the vertical low-pass filter 609.

The vertical high-pass filter 606 and the vertical low-pass filter 607 are connected to the up sampler 610, and the vertical high-pass filter 608 and the vertical low-pass filter 609 are connected to the up sampler 611. The up sampler 610 is connected to the horizontal high-pass filter 612, and the up sampler 611 is connected to the horizontal low-pass filter 613. The horizontal high-pass filter 612 and the horizontal low-pass filter 613 are connected to the buffer 614. The buffer 614 is connected to the signal processing unit 116 and the data transfer control unit 615.

The data transfer control unit 615 is connected to the switching unit 601.

The basis function ROM 616 is connected to the filter coefficient reading unit 617. The filter coefficient reading unit 617 is connected to the vertical high-pass filter 606, the vertical low-pass filter 607, the vertical high-pass filter 608, the vertical low-pass filter 609, the horizontal high-pass filter 612, and the horizontal low-pass filter 613.

The control unit 118 is bi-directionally connected to the data reading unit 600, the switching unit 601, the data transfer control unit 615, and the filter coefficient reading unit 617 to control these units.

Subsequently, a description will be given of the action of the frequency synthesis unit 115.

The basis function ROM 616 records a filter coefficient used for the inverse wavelet transform such as the Harr function or the Daubechies function.

On the basis of the control of the control unit 118, the filter coefficient reading unit 617 reads filter coefficient from the basis function ROM 616. The filter coefficient reading unit 617 transfers the high-pass filter coefficient to the vertical high-pass filter 606, the vertical high-pass filter 608, and the horizontal high-pass filter 612 and the low-pass filter coefficient to the vertical low-pass filter 607, the vertical low-pass filter 609, the horizontal low-pass filter 613, respectively.

After the filter coefficients are transferred, on the basis of the control of the control unit 118, the data reading unit 600 reads the low frequency component on which the gradation processing has been performed and the valid component at the n-stage in the high frequency component on which the gradation processing has been performed and the invalid component at the n-stage in the high frequency component from the buffer 114 to be transferred to the switching unit 601. It should be noted that the valid component at the n-stage in the high frequency component on which the gradation processing has been performed and the invalid component at the n-stage in the high frequency component are the integrated high frequency component at the n-stage when read by the data reading unit 600.

On the basis of the control of the control unit 118, the switching unit 601 transfers the high frequency components in the slanted direction via the up sampler 602 to the vertical high-pass filter 606, the high frequency components in the horizontal direction via the up sampler 603 to the vertical low-pass filter 607, the high frequency components in the vertical direction via the up sampler 604 to the vertical high-pass filter 608, and the low frequency components via the up sampler 605 to the vertical low-pass filter 609, respectively, to execute the filtering processing in the vertical direction.

The frequency components from the vertical high-pass filter 606 and the vertical low-pass filter 607 are transferred via the up sampler 610 to the horizontal high-pass filter 612, and the frequency components from the vertical high-pass filter 608 and the vertical low-pass filter 609 are transferred via the up sampler 611 to the horizontal low-pass filter 613, and then the filtering processing in the horizontal direction is performed.

The frequency components from the horizontal high-pass filter 612 and the horizontal low-pass filter 613 are transferred to the buffer 614 to be synthesized into one, thus generating the low frequency component at the (n−1)-th stage.

At this time, the up sampler 602, the up sampler 603, the up sampler 604, and the up sampler 605 performs up sampling of the input frequency component double in the vertical direction, and the up sampler 610 and the up sampler 611 performs up sampling of the input frequency component double in the horizontal direction.

The data transfer control unit 615 transfers the low frequency components to the switching unit 601 on the basis of the control of the control unit 118.

On the basis of the control of the control unit 118, the data reading unit 600 reads from the three types of high frequency components in the slanted direction, the horizontal direction, and the vertical direction at the (n−1)-th stage from the buffer 114 to be transferred to the switching unit 601. Then, as the filtering processing similar to the above is performed on the frequency at the stage number of the decomposition (n−1), the low frequency component at the (n−2)-th stage is output to the buffer 614.

The above-mentioned procedure is repeatedly performed until the control unit 118 performs the synthesis at a predetermined n-th stage. With the configuration, in the end, the low frequency component at the zero-th stage is output to the buffer 614 and the low frequency component at the zero-th stage is transferred to the signal processing unit 116 as the image signal on which the gradation conversion has been performed.

Figure 10:
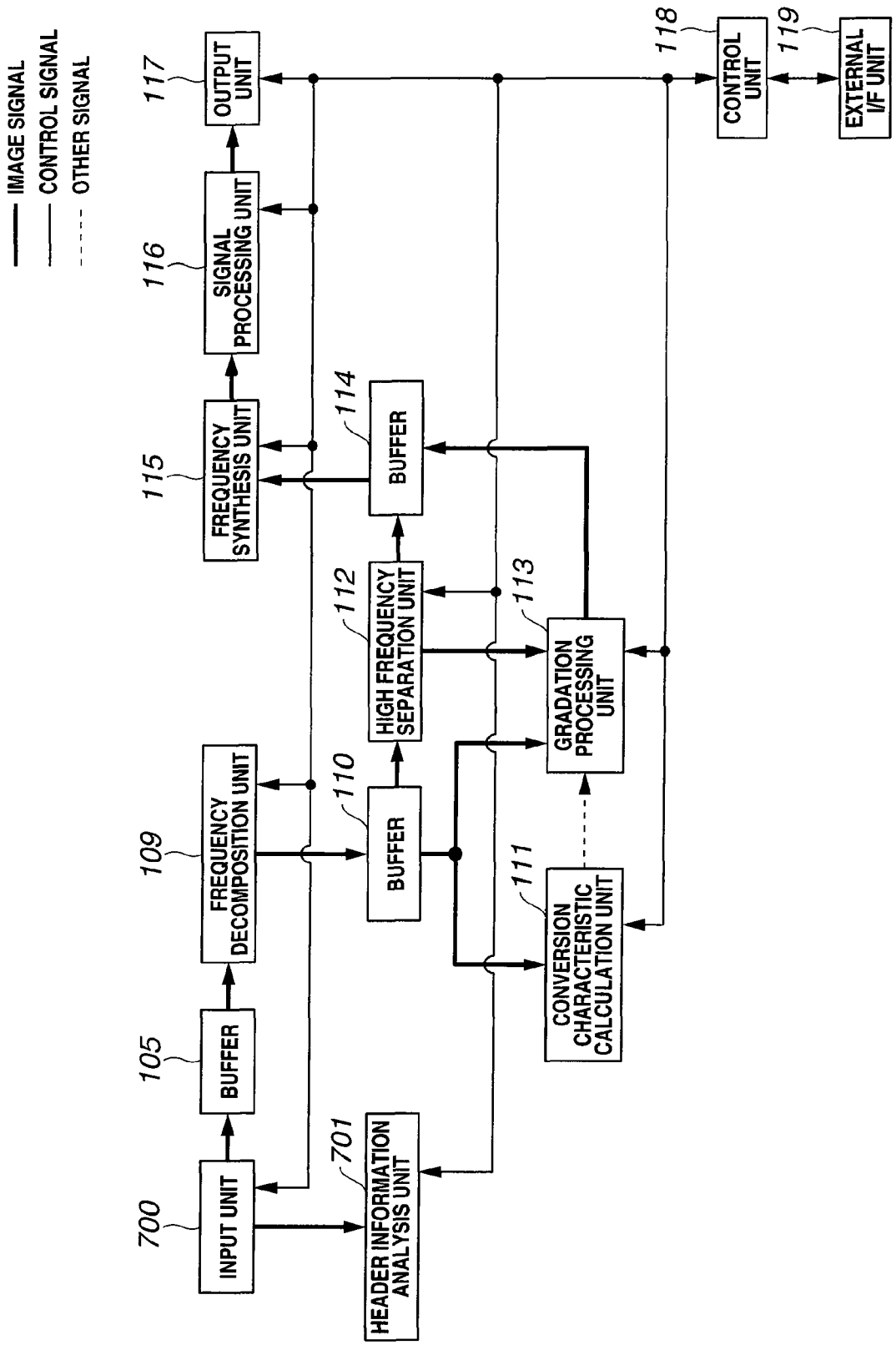
FIG. 10 is a diagram illustrating another configuration example of the image processing system according to the first embodiment.

It should be noted that in the above, the image processing system in which the image pickup unit including the lens system 100, the aperture 101, the CCD 102, the amplification unit 103, the A/D conversion unit 104, the exposure control unit 106, the focus control unit 107, the AF motor 108, and the temperature sensor 120 is integrated has been described. However, the image processing system is not necessarily limited to the above-mentioned configuration. For example, as illustrated in FIG. 10, the image pickup unit may be provided as a separated body. That is, in the image processing system illustrated in FIG. 10, the separated image pickup unit performs the image pickup, and an image signal recorded on a recording medium such as a memory card in an unprocessed raw data state is read out from the recording medium to be processed. It should be noted that at this time, associated information related to the image signal like the temperature of the image pickup device, the exposure conditions, and the like, for each shooting operation is recorded on a header unit or the like. It should be noted that transmission of various pieces of information from the separated image pickup unit to the image processing system is not necessarily performed via a recording medium, and may be performed via a communication circuit or the like.

Herein, FIG. 10 is a diagram illustrating another configuration example of the image processing system.

The image processing system illustrated in FIG. 10 has a configuration in which with respect to the image processing system illustrated in FIG. 1, the lens system 100, the aperture 101, the CCD 102, the amplification unit 103, the A/D conversion unit 104, the exposure control unit 106, the focus control unit 107, the AF motor 108, and the temperature sensor 120 are omitted, and an input unit 700 and an header information analysis unit 701 are added. Other basic configuration in the image processing system illustrated in FIG. 10 is similar to that illustrated in FIG. 1. Therefore, the same components are allocated with the same names and reference numerals to appropriately omit the description thereof, and only a different part will be mainly described.

The input unit 700 is connected to the buffer 105 and the header information analysis unit 701. The control unit 118 is bi-directionally connected to the input unit 700 and the header information analysis unit 701 to control these units.

Next, a different action in the image processing system illustrated in FIG. 10 is as follows.

For example, when a reproduction operation is started via the external I/F unit 119 such as a mouse or a key board, the image signal and the header information saved on the recording medium such as a memory card are read via the input unit 700.

Among the information read from the input unit 700, the image signal is transferred to the buffer 105, and the header information is transferred to the header information analysis unit 701, respectively.

The header information analysis unit 701 extracts the information for each shooting operation (that is, the exposure conditions, the temperature of the image pickup device, and the like, which are described above) to be transferred to the control unit 118 on the basis of the header information transferred from the input unit 700.

The processing in the following stage is similar to that of the image processing system illustrated in FIG. 1.

Furthermore, in the above, it is supposed to perform the processing by way of the hardware, but the configuration is not necessarily limited to the above. For example, the image signal from the CCD 112 is recorded on the recording medium such as a memory card as raw data without applying the process, and also the associated information such as image pickup conditions (for example, the temperature of the image pickup device, the exposure conditions, and the like, for each shooting operation from the control unit 118) is recorded in the recording medium as the header information. Then, the processing can be performed as the computer is allowed to execute the image processing program which is separate software to instruct the computer to read the information of the recording medium. It should be noted that the transmission of various pieces of information from the image pickup unit to the computer is not necessarily performed via the recording medium and may be performed via a communication line or the like.

Figure 11:
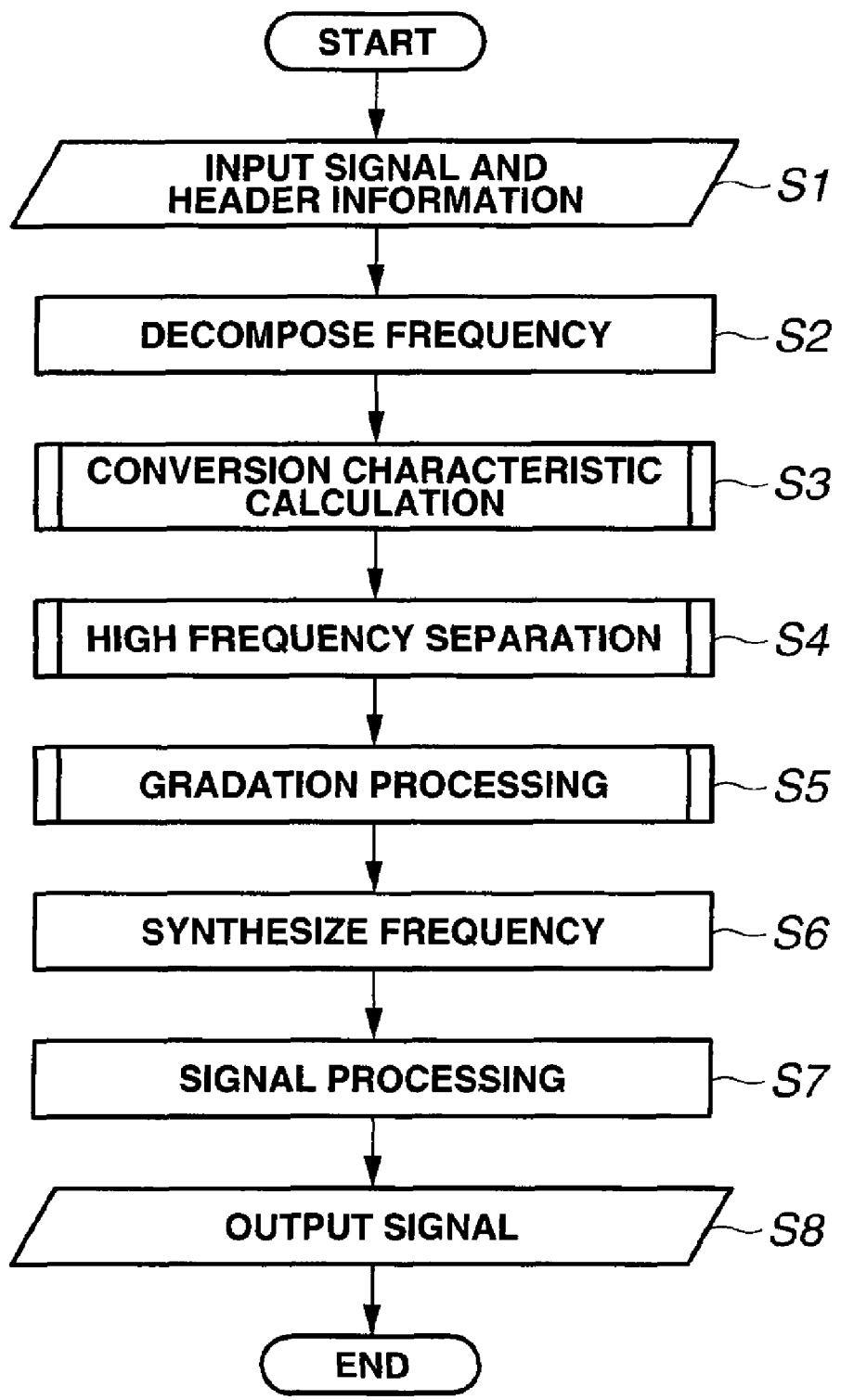
FIG. 11 is a flow chart showing a main routine of an image processing program according to the first embodiment.

FIG. 11 is a flow chart showing a main routine of an image processing program.

When the processing is started, first, the image signal is read, and also the header information such as the temperature and the exposure conditions of the image pickup device is read (step S1).

Next, by performing the frequency decomposition such as the wavelet transform, the high frequency component and the low frequency component are obtained (step S2).

Subsequently, as is described below with reference to FIG. 12, the conversion characteristic is calculated (step S3).

Furthermore, as is described below with reference to FIG. 13, the high frequency component is separated into the invalid component caused by the noise and the other valid component (step S4).

Then, as is described below with reference to FIG. 14, the gradation processing is performed on the low frequency component and the valid component in the high frequency component (step S5).

Next, on the basis of the low frequency component on which the gradation processing has been performed, the valid component in the high frequency component on which the gradation processing has been performed, and the invalid component in the high frequency component, the image signal on which the gradation conversion has been performed is synthesized (step S6).

Subsequently, the signal processing such as a known compression processing is performed (step S7).

Then, the image signal after the processing is output (step S8), and the processing is ended.

Figure 12:
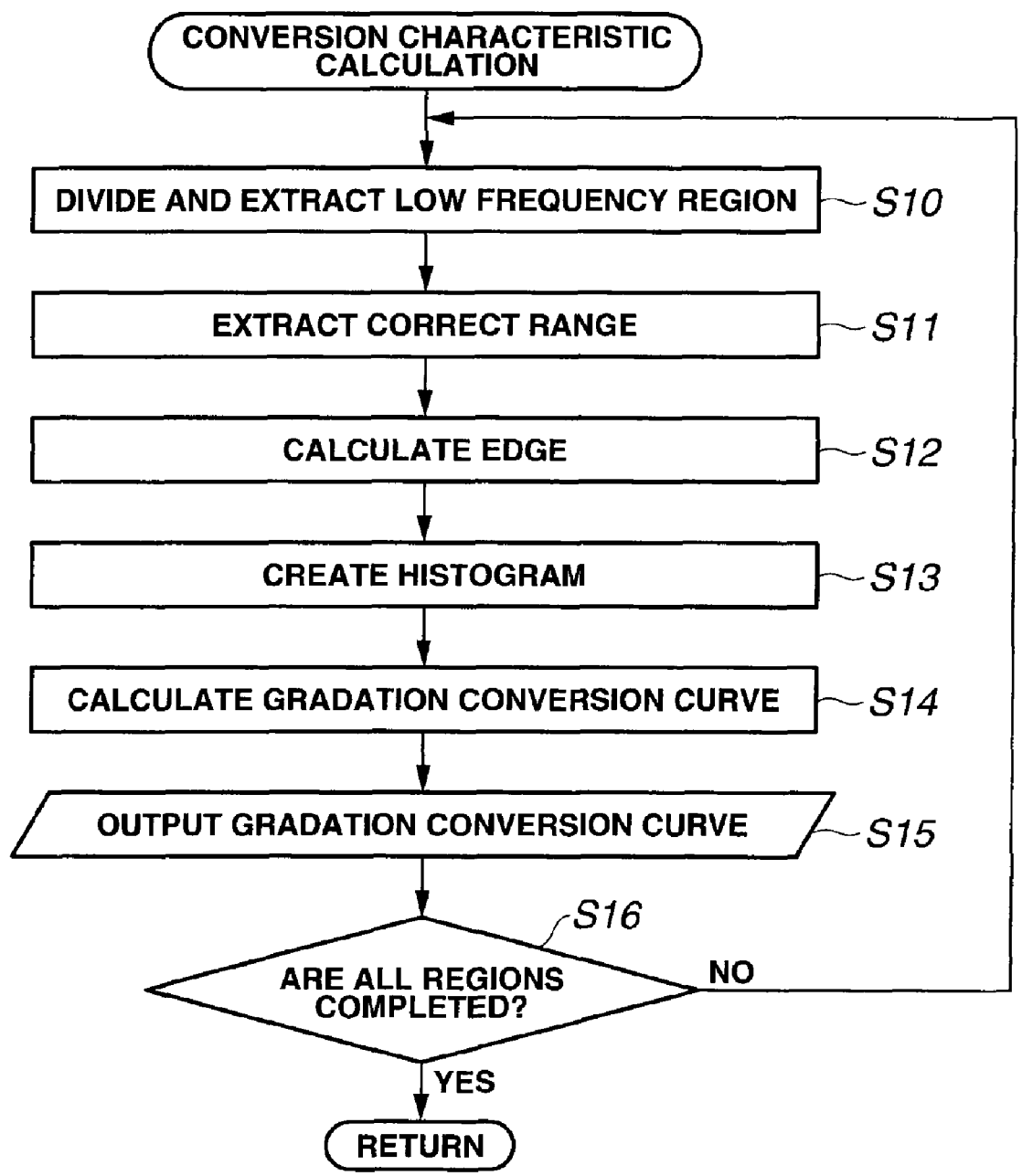
FIG. 12 is a flow chart showing a processing for a conversion characteristic calculation in step S3 of FIG. 11 according to the first embodiment.

FIG. 12 is a flow chart showing the processing for the conversion characteristic calculation in the above-mentioned step S3.

When the processing is started, as illustrated in FIG. 7, the low frequency component is divided into regions of a predetermined size to be sequentially extracted (step S10).

Next, the low frequency components are compared with the pre-set threshold related to the dark part and the pre-set threshold related to the light part respectively to extract the low frequency components which are equal to or larger than the threshold of the dark part and also equal to or smaller than the threshold of the light part as the correct exposure range (step S11).

Subsequently, by using the Laplacian filter with respect to the low frequency components in the correct exposure range, the known calculation for the edge intensity is performed (step S12).

Then, by selecting the pixels having the edge intensity equal to or larger than the pre-set threshold, the histogram is created (step S13).

After that, by accumulating the histograms and further performing the normalization, the gradation conversion curve is calculated (step S14).

The gradation conversion curve calculated in the above-mentioned manner is output (step S15).

Subsequently, it is determined whether or not the processing has been performed for all the regions (step S16). In a case where it is determined that the processing has not been completed, the flow is returned to the above-mentioned step S10 to repeat the above-mentioned processing. On the other hand, in a case where it is determined that the processing has been completed, the flow is returned to the processing shown in FIG. 11.

Figure 13:
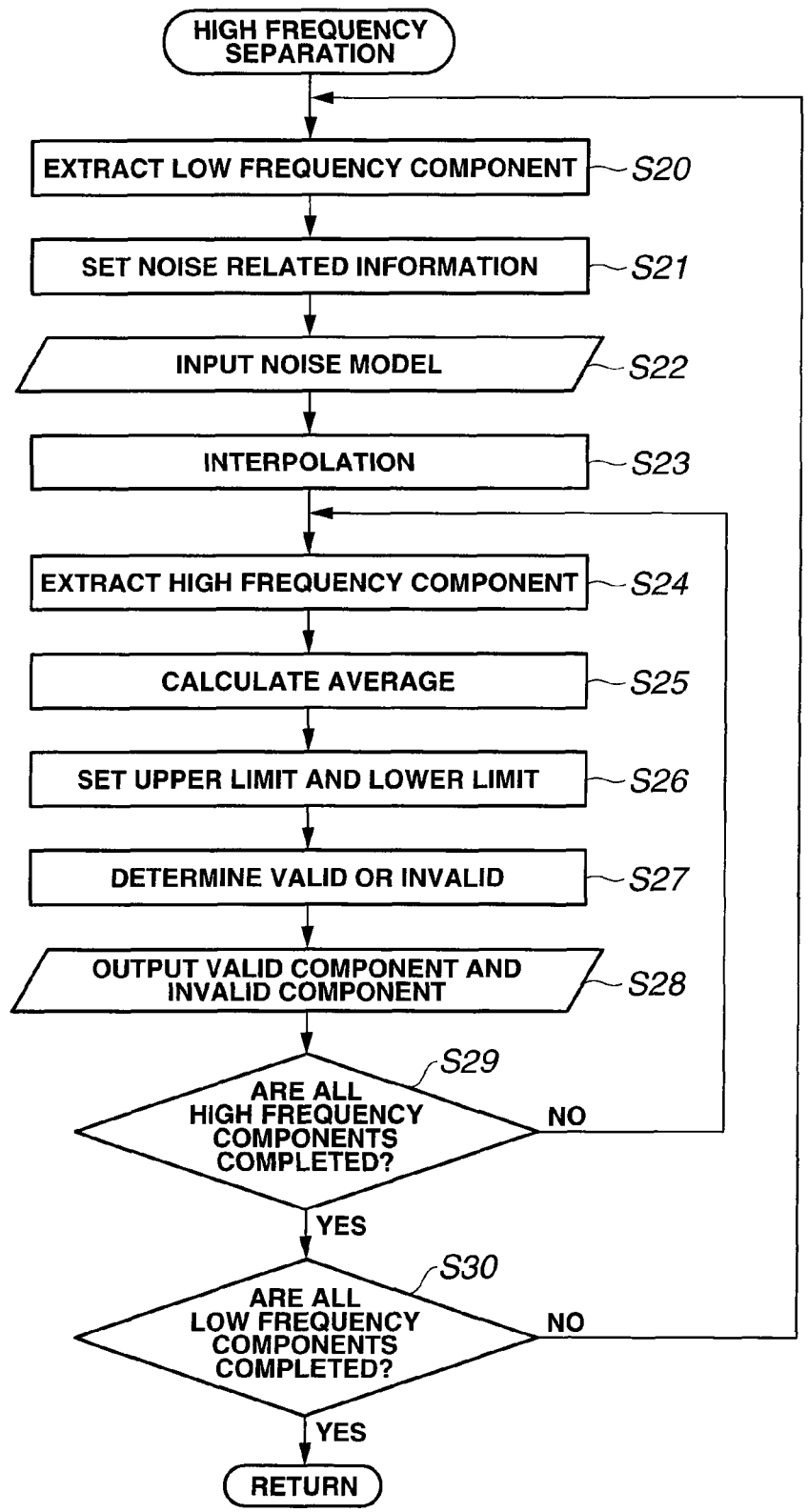
FIG. 13 is a flow chart showing a processing for a high frequency separation in step S4 of FIG. 11 according to the first embodiment.

FIG. 13 is a flow chart showing the processing for the high frequency separation in the above-mentioned step S4.

When the processing is started, first, the low frequency components are sequentially extracted for each pixel (step S20).

Next, from the read header information, the information such as the temperature and the gain of the image pickup device is set. At this time, if a necessary parameter does not exist for the header information, a pre-set standard value is assigned to the relevant information (step S21).

Subsequently, the parameter related to the reference noise model is read (step S22).

Then, on the basis of the parameter of the reference noise model, the noise amount related to the low frequency component is calculated through the interpolation processing (step S23).

After that, as illustrated in FIG. 3B or 3C, the high frequency component corresponding to the low frequency component and the high frequency components located in the neighborhood of the high frequency component are sequentially extracted (step S24).

Next, from the high frequency component corresponding to the low frequency component and the high frequency components located in the neighborhood of the high frequency component, the average value is calculated (step S25).

Subsequently, on the basis of the average value and the noise amount, the upper limit and the lower limit are set as shown in Numeric Expression 3 (step S26).

Then, in a case where the high frequency component is in the range between the upper limit and the lower limit, it is determined that the high frequency component is the invalid component caused by the noise, and in a case where the high frequency component exceeds the upper limit or falls short of the lower limit, it is determined that the high frequency component is the valid component (step S27).

Furthermore, the valid component and the invalid component are output while being separated from each other (step S28).

Then, it is determined whether or not the processing for all the high frequency components has been completed (step S29). In a case where it is determined that the processing has not been completed, the flow is returned to the above-mentioned step S24 to repeat the above-mentioned processing.

On the other hand, in the step S29, in a case where it is determined that the processing for all the high frequency components has been completed, it is determined whether or not the processing for all the low frequency components has been completed (step S30). In a case where it is determined that the processing has not been completed, the flow is returned to the above-mentioned step S20 to repeat the above-mentioned processing. On the other hand, in a case where it is determined that the processing has been completed, the flow is returned to the processing shown in FIG. 11.

Figure 14:
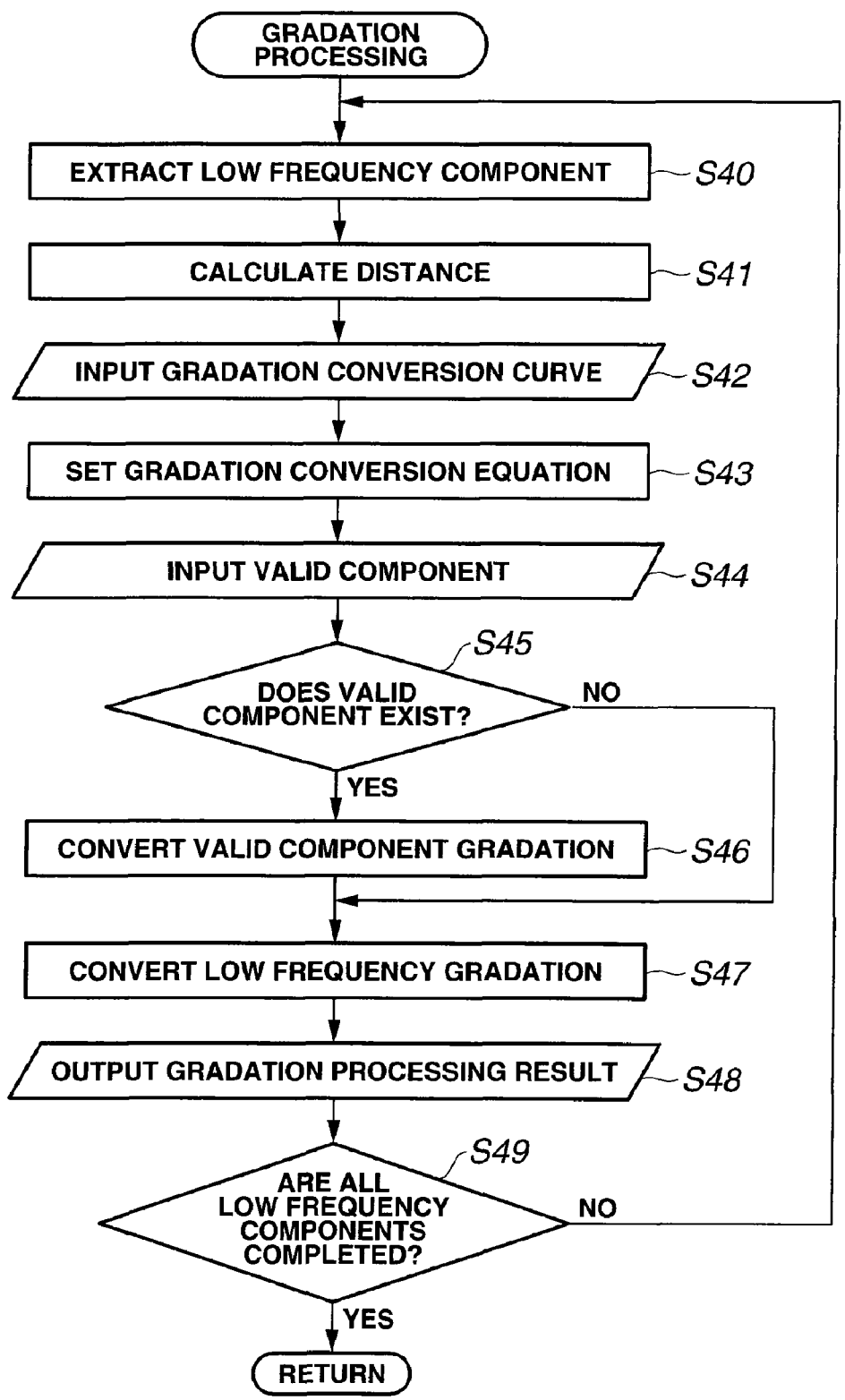
FIG. 14 is a flow chart showing a gradation processing in step S5 of FIG. 11 according to the first embodiment.

FIG. 14 is a flow chart showing the processing for the gradation processing in the above-mentioned step S5.

When the processing is started, first, the low frequency components are sequentially extracted for each pixel (step S40).

Next, as illustrated in FIG. 8, the distances between the target pixel of the low frequency component and the centers of the four neighboring regions are calculated (step S41).

Subsequently, the gradation conversion curves in the four neighboring regions are read (step S42).

Furthermore, as shown in Numeric Expression 4, the gradation conversion equation with respect to the target pixel is set (step S43).

Then, as illustrated in FIG. 3B or 3C, the high frequency components regarded as the valid components corresponding to the low frequency components are sequentially extracted (step S44).

After that, it is determined whether or not the high frequency component regarded as the valid component exists (step S45).

At this time, in a case where it is determined that the high frequency component regarded as the valid component exists, the gradation conversion equation shown in Numeric Expression 4 is applied to the high frequency component regarded as the valid component to perform the gradation conversion (step S46).

When the processing in the step S46 is ended or in a case where it is determined that the high frequency component regarded as the valid component does not exist in the above-mentioned step S45, the gradation conversion equation shown in Numeric Expression 4 is applied to the low frequency component to perform the gradation conversion (step S47).

Then, the low frequency component on which the gradation processing has been performed and the valid component in the high frequency component on which the gradation processing has been performed are output (step S48).

After that, it is determined whether or not the processing for all the low frequency components has been completed (step S49). In a case where it is determined that the processing has not been completed, the flow is returned to the above-mentioned step S40 to repeat the above-mentioned processing. On the other hand, in a case where it is determined that the processing has been completed, the flow is returned to the processing shown in FIG. 11.

It should be noted that in the above, the configuration of using the wavelet transform for the frequency decomposition and the frequency synthesis is adopted, but the configuration is not necessarily limited to the above. For example, a configuration of using the known frequency decomposition such as the Fourier transform, the discrete cosine transform or the transform for the frequency synthesis can also be adopted.

Also, in the above, the number of times to perform the wavelet transform is set as two, but the configuration is not necessarily limited to the above. For example, such a configuration can be adopted that by increasing the number of times to perform the conversion, the separation of the invalid component caused by the noise and the other valid component is improved, or by decreasing the number of times to perform the conversion, the uniformity of the image is improved.

With the method of the space-invariant gradation processing using the single gradation conversion curve described above in the background section in the related art, in a non-standard situation such as a backlight, there is a problem that it is difficult to obtain an appropriate image signal.

Also, according to the technology disclosed in Japanese Patent No. 3465226 described above in the background section, the gradation conversion curve is calculated for each image on the basis of the histogram, but the increase in the noise components is not taken into account. For this reason, for example, when a ratio of the dark part in the image is large, the gradation conversion curve based on the histogram provides a wide gradation to the dark part. However, in this case, the noise in the dark part prominently appears, and there is a problem that an optimal gradation conversion processing is not performed in terms of image quality.

Furthermore, according to the technology disclosed in Japanese Unexamined Patent Application Publication No. 8-56316 described above in the background section, the contrast emphasis processing is performed only on the low frequency component. Therefore, there is a problem that the sharpness is degraded in a region containing a large number of high frequency components such as an edge region. Also, according to the technology disclosed in the publication, different processings are performed on the low frequency component and other components. Therefore, there is a problem that the continuity and integrity for the image as a whole may be lost.

Then, according to the technology disclosed in Japanese Unexamined Patent Application Publication No. 2004-128985 described above in the background section, the noise reducing processing and other gradation processing are independent from each other. Therefore, there is a problem that it is difficult to mutually utilize the processings in an optimal manner.

In contrast with the above-mentioned background technology, according to the first embodiment of the present invention, only the high frequency component where the influence of the noise prominently visually appears is separated into the invalid component and the valid component. The gradation processing is performed on the valid component, and the gradation processing is not performed on the invalid component, and an increase in noise accompanying with the gradation processing is suppressed. Thus, it is possible to generate the high quality image signal.

Also, as the low frequency component is excluded from the target of the processing after being separated into the valid component and the invalid component, a possibility of generating an adverse effect accompanying with the processing is decreased, and it is possible to improve the stability.

Furthermore, as the image signal is synthesized with the invalid component, it is possible to obtain the image signal with little sense of visual discomfort, and the stability and reliability of the processing can be improved.

Also, the wavelet transform is excellent at the separation of the frequency, and it is therefore possible to perform the high accuracy processing.

As the gradation conversion curve is adaptively and also independently calculated for each region from the low frequency component of the image signal, it is possible to perform the gradation conversion at the high accuracy on various image signals.

Also, as the gradation conversion curve is calculated on the basis of the low frequency component, it is possible to calculate the appropriate gradation conversion curve with little influence from the noise.

As the gradation conversion with the identical conversion characteristic is performed on the low frequency component and the valid component in the high frequency component located at the same position, it is possible to obtain the image signal providing the sense of integrity with little sense of visual discomfort.

Also, as the gradation conversion curves independently obtained for each region are synthesized to set the gradation conversion equation used for the gradation conversion of the target pixel, the discontinuity between the regions is not generated, and it is possible to obtain the high quality image signals.

Then, in a case where the valid component in the high frequency component does not exist, the unnecessary gradation conversion is cancelled, and it is thus possible to improve the processing speed.

Second Embodiment

Figure 15:
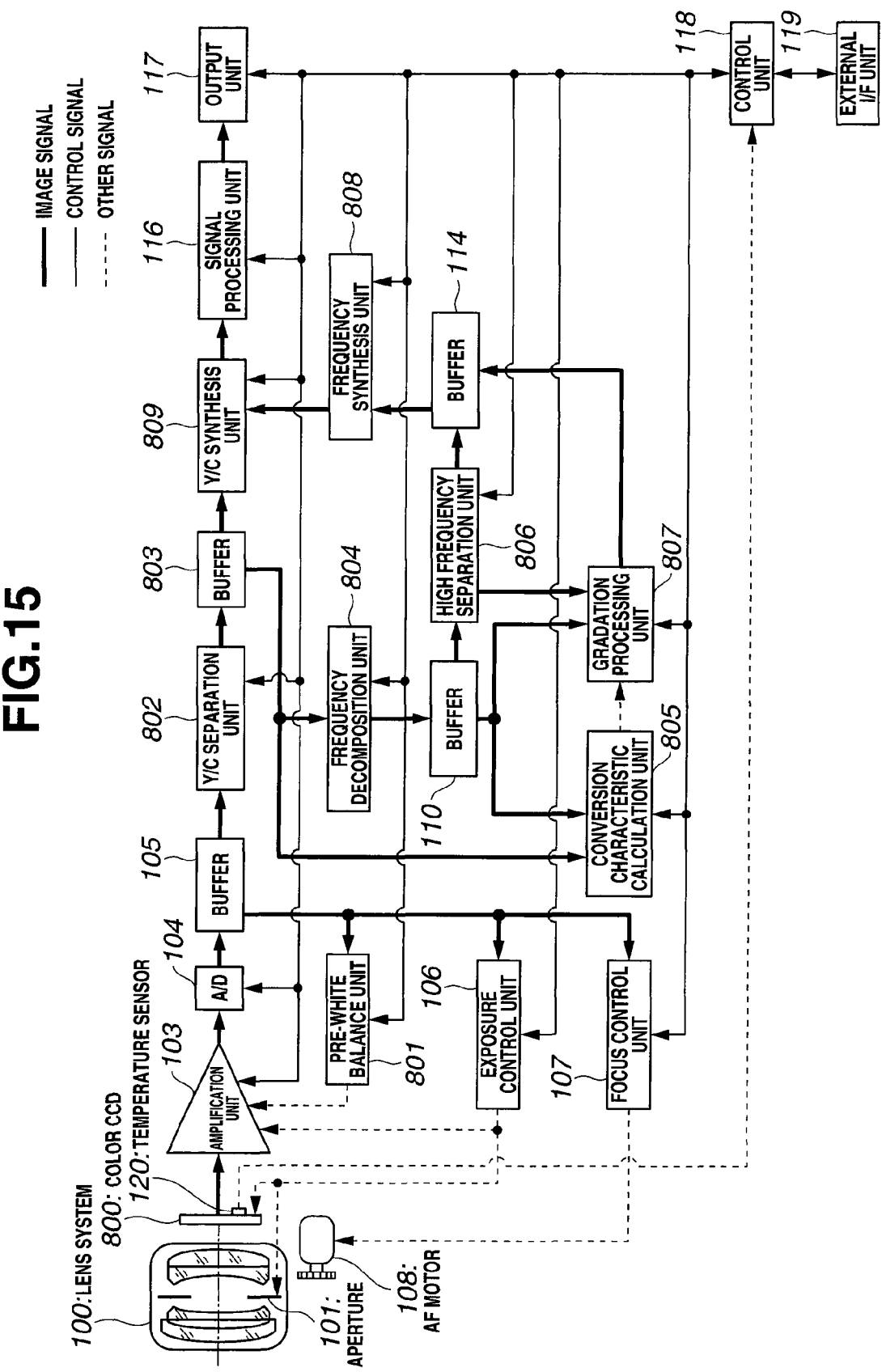
FIG. 15 is a block diagram of a configuration of an image processing system according to a second embodiment of the present invention.

FIGS. 15 to 25 illustrate a second embodiment of the present invention, and FIG. 15 is a block diagram of a configuration of an image processing system.

According to the second embodiment, the same part as that of the first embodiment described above is allocated with the same name and reference numeral to appropriately omit a description thereof, and only a different part will be mainly described.

The image processing system according to the present embodiment has a configuration in which with respect to the above-mentioned image processing system illustrated in FIG. 1 according to the first embodiment, a pre-white balance unit 801, a Y/C separation unit 802 constituting Y/C separation means, a buffer 803, and a Y/C synthesis unit 809 constituting Y/C synthesis means are added, and the CCD 102, the frequency decomposition unit 109, the conversion characteristic calculation unit 111, the high frequency separation unit 112, the gradation processing unit 113, and the frequency synthesis unit 115 are replaced by a color CCD 800, a frequency decomposition unit 804 constituting separation means and frequency decomposition means, a conversion characteristic calculation unit 805 constituting conversion means and conversion characteristic calculation means, a high frequency separation unit 806 constituting separation means and high frequency separation means, a gradation processing unit 807 constituting conversion means and gradation processing means, and a frequency synthesis unit 808 constituting synthesis means and frequency synthesis means. Other basic configuration is similar to that of the above-mentioned first embodiment. Therefore, the same components are allocated with the same names and reference numerals to appropriately omit the description thereof, and only a different part will be mainly described.

The color image signal captured via the lens system 100, the aperture 101, and the color CCD 800 is transferred to the amplification unit 103.

The buffer 105 is connected to the exposure control unit 106, the focus control unit 107, the pre-white balance unit 801, and the Y/C separation unit 802.

The pre-white balance unit 801 is connected to the amplification unit 103.

The Y/C separation unit 802 is connected to the buffer 803, and the buffer 803 is connected to the frequency decomposition unit 804, the conversion characteristic calculation unit 805, and the Y/C synthesis unit 809.

The frequency decomposition unit 804 is connected to the buffer 110. The buffer 110 is connected to the conversion characteristic calculation unit 805, the high frequency separation unit 806, and the gradation processing unit 807. The conversion characteristic calculation unit 805 is connected to the gradation processing unit 807. The high frequency separation unit 806 is connected to the buffer 114 and the gradation processing unit 807. The gradation processing unit 807 is connected to the buffer 114.

The buffer 114 is connected via the frequency synthesis unit 808 and the Y/C synthesis unit 809 to the signal processing unit 116.

The control unit 118 is also bi-directionally connected to the pre-white balance unit 801, the Y/C separation unit 802, the frequency decomposition unit 804, the conversion characteristic calculation unit 805, the high frequency separation unit 806, the gradation processing unit 807, the frequency synthesis unit 808, and the Y/C synthesis unit 809 to control these units.

Also, the temperature sensor 120 according to the present embodiment is arranged in a neighborhood of the color CCD 800, and the signal from the temperature sensor 120 is also connected to the control unit 118.

Next, the action of the image processing system illustrated in FIG. 15 is basically similar to that of the first embodiment, and therefore only a different part will be mainly described along the flow of the image signal.

When the user performs a half press of the shutter button which is composed of a two-stage switch of the external I/F unit 119, the image processing system functions as the pre-image pickup device.

After that, the color image signal captured via the lens system 100, the aperture 101, and the color CCD 800 is transferred via the amplification unit 103 and the A/D conversion unit 104 to the buffer 105. It should be noted that according to the present embodiment, as the color CCD 800, a single CCD in which a Bayer-type primary color filter is arranged on a front face is supposed.

Herein, FIG. 16 is a diagram illustrating a configuration of the Bayer-type primary color filter.

The Bayer-type primary color filter has a such configuration that that the basic unit is 2×2 pixels, one each of a red (R) filter and a blue (B) filter are arranged at pixel positions at opposite corners in the basis unit, and green (G) filters are arranged at pixel positions at remaining opposite corners.

Subsequently, the color image signal in the buffer 105 is transferred to the pre-white balance unit 801. The pre-white balance unit 801 multiplies signals at a predetermined level for each color signal (in other words, cumulatively adds) to calculate a simplified white balance coefficient. The pre-white balance unit 801 transfers the calculated coefficient to the amplification unit 103 and multiplies different gains for each color signal to perform the white balance.

In this way, when the focus adjustment, the exposure adjustment, the simplified white balance adjustment, and the like are performed, the user performs the full press of the shutter button composed of the two-stage switch of the external I/F unit 119. After that, the digital camera functions as the real shooting device.

After that, similarly to the pre shooting, the color image signal is transferred to the buffer 105. The white balance coefficient calculated by the pre-white balance unit 801 at this time is transferred to the control unit 118.

The color image signal in the buffer 105 obtained through the real shooting operation is transferred to the Y/C separation unit 802.

On the basis of the control of the control unit 118, through a known interpolation processing, the Y/C separation unit 802 generates the three color image signals composed of R, G, and B, and further separates the R, G, and B signals into a luminance signal Y and color difference signals Cb and Cr as shown in Numeric Expression 5 below.

$$Y = 0.29900R + 0.58700G + 0.11400B$$

$$Cb = -0.16874R - 0.33126G + 0.50000B$$

$$Cr = 0.50000R - 0.41869G - 0.08131B \quad \text{[Expression 5]}$$

The luminance signal and the color difference signals separated by the Y/C separation unit 802 are transferred to the buffer 803.

On the basis of the control of the control unit 118, the frequency decomposition unit 804 performs the frequency decomposition on the luminance signal in the buffer 105, and the high frequency component and the low frequency component are obtained. Then, the frequency decomposition unit 804 sequentially transfers the high frequency component and the low frequency component thus obtained to the buffer 110.

The conversion characteristic calculation unit 805 reads the low frequency component from the buffer 110 from on the basis of the control of the control unit 118, and the color difference signals from the buffer 803, respectively, to calculate the gradation characteristic used for the gradation conversion processing. It should be noted that according to the present embodiment, as the gradation conversion processing, the space-invariant processing using the single gradation conversion curve is supposed with respect to the image signal. Then, the conversion characteristic calculation unit 805 transfers the calculated gradation characteristics to the gradation processing unit 807.

The high frequency separation unit 806 reads the high frequency component from the buffer 110 and the high frequency component is separated into the invalid component caused by the noise and the other valid component on the basis of the control of the control unit 118. Then, the high frequency separation unit 806 transfers the thus separated valid component to the gradation processing unit 807 and the above-mentioned invalid component to the buffer 114, respectively.

The gradation processing unit 807 reads the low frequency component from the buffer 110, the valid components in the high frequency component from the high frequency separation unit 806, and the gradation characteristic from the conversion characteristic calculation unit 805, respectively, on the basis of the control of the control unit 118. Then, on the basis of the above-mentioned gradation characteristic, the gradation processing unit 807 performs the gradation processing on the low frequency component and the valid component in the high frequency component. The gradation processing unit 807 transfers the low frequency component on which the gradation processing has been performed and the valid component in the high frequency component on which the gradation processing has been performed to the buffer 114.

The frequency synthesis unit 808 reads the low frequency component on which the gradation processing has been performed, the valid component in the high frequency component on which the gradation processing has been performed, and the invalid component in the high frequency component from the buffer 114 and performs an additional processing on the basis of these components to synthesize the luminance signals on which the gradation conversion has been performed with each other on the basis of the control of the control unit 118. Then, the frequency synthesis unit 808 transfers the synthesized luminance signal to the Y/C synthesis unit 809.

The Y/C synthesis unit 809 reads the luminance signal Y' on which the gradation conversion has been performed from the frequency synthesis unit 808 and the color difference signals Cb and Cr from the buffer 803, respectively, to synthesize color image signals R', G', and B' on which the gradation conversion has been performed as shown in Numeric Expression 6 below on the basis of the control of the control unit 118.

$$R' = Y' + 1.40200Cr$$

$$G' = Y' - 0.34414Cb - 0.71414Cr$$

$$B' = Y' + 1.77200Cb \quad \text{[Expression 6]}$$

The Y/C synthesis unit 809 transfers the synthesized color image signals R', G', and B' to the signal processing unit 116.

The signal processing unit 116 performs a known compression processing or the like on the image signal from the Y/C synthesis unit 809 and transfers the signal after the processing to the output unit 117 on the basis of the control of the control unit 118.

The output unit 117 records and saves the image signal output from the signal processing unit 116 in the recording medium such as a memory card.

Figure 18:
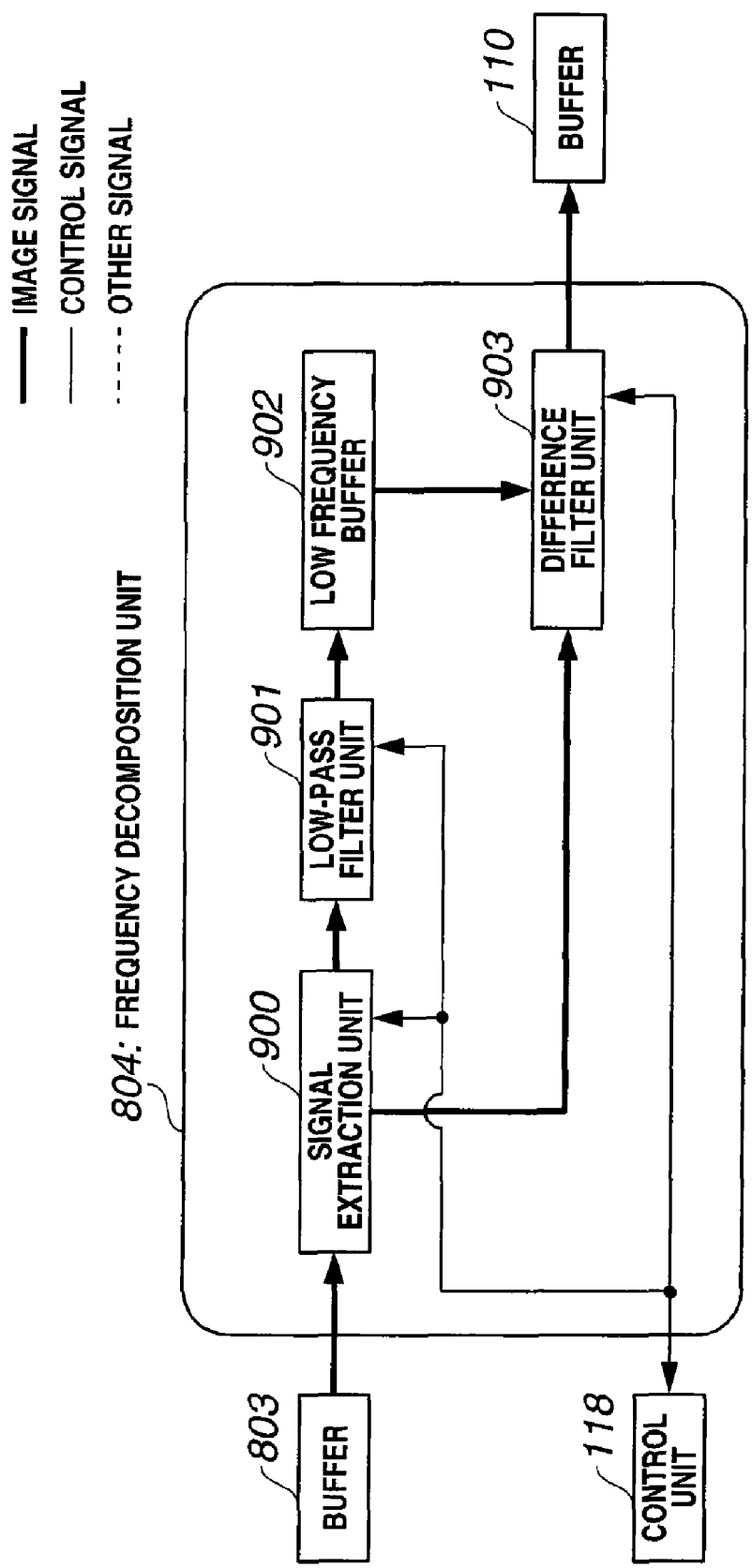
FIG. 18 is a block diagram of a configuration example of a frequency decomposition unit according to the second embodiment.

Next, FIG. 18 is a block diagram of a configuration example of the frequency decomposition unit 804.

The frequency decomposition unit 804 is configured by including a signal extraction unit 900, a low-pass filter unit 901, a low frequency buffer 902, and a difference filter unit 903.

The buffer 803 is connected to the signal extraction unit 900. The signal extraction unit 900 is connected to the low-pass filter unit 901 and the difference filter unit 903. The low-pass filter unit 901 is connected to the low frequency buffer 902. The low frequency buffer 902 is connected to the difference filter unit 903. The difference filter unit 903 is connected to the buffer 110.

The control unit 118 is bi-directionally connected to the signal extraction unit 900, the low-pass filter unit 901, and the difference filter unit 903 to control these units.

Subsequently, a description will be given of the action of the frequency decomposition unit 804.

The signal extraction unit 900 reads the luminance signals from the buffer 803 on the basis of the control of the control unit 118 to transfer the luminance signals to the low-pass filter unit 901 and the difference filter unit 903.

The low-pass filter unit 901 performs a known low-pass filter processing on the luminance signals from the signal extraction unit 900 to calculate the low frequency components of the luminance signals on the basis of the control of the control unit 118. It should be noted that according to the present embodiment, as the low-pass filter used by the low-pass filter unit 901, for example, an average value filter having a pixel size of 7×7. The low-pass filter unit 901 transfers the calculated low frequency components to the low frequency buffer 902.

The difference filter unit 903 reads the luminance signals from the signal extraction unit 900 and the low frequency components of the luminance signals from the low frequency buffer 902, respectively, and takes a difference thereof to calculate the high frequency components of the luminance signals. The difference filter unit 903 transfers the calculated high frequency components and the read low frequency components to the buffer 110.

Figure 19:
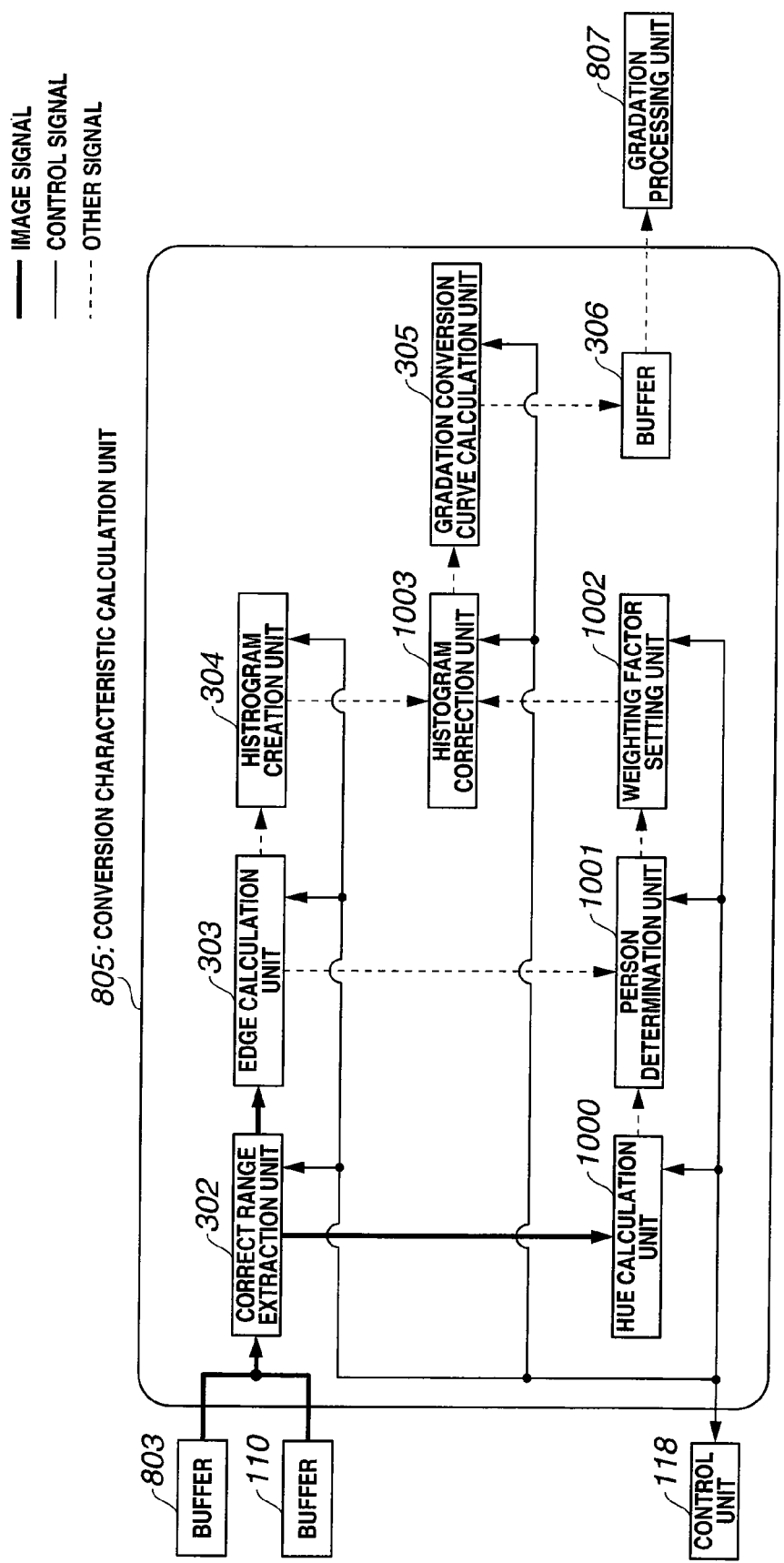
FIG. 19 is a block diagram of a configuration example of a conversion characteristic calculation unit according to the second embodiment 2.

Next, FIG. 19 is a block diagram of a configuration example of the conversion characteristic calculation unit 805.

The conversion characteristic calculation unit 805 has such a configuration that with respect to the conversion characteristic calculation unit 111 shown in FIG. 4 of the above-mentioned first embodiment, a hue calculation unit 1000 constituting region-of-interest setting means, a person determination unit 1001 constituting region-of-interest setting means, a weighting factor setting unit 1002 constituting weighting factor setting means, and a histogram correction unit 1003 constituting histogram correction means are added, and the division unit 300 and the buffer 301 are omitted. Other basic configuration is similar to that of the conversion characteristic calculation unit 111 shown in FIG. 4. Therefore, the same components are allocated with the same names and reference numerals to appropriately omit the description thereof, and only a different part will be mainly described.

The buffer 803 and the buffer 110 are connected to the correct range extraction unit 302. The correct range extraction unit 302 is connected to the edge calculation unit 303 and the hue calculation unit 1000.

The hue calculation unit 1000 is connected via the person determination unit 1001 and the weighting factor setting unit 1002 to the histogram correction unit 1003.

The histogram creation unit 304 is connected to the histogram correction unit 1003.

The histogram correction unit 1003 is connected via the gradation conversion curve calculation unit 305 and the buffer 306 to the gradation processing unit 807.

The control unit 118 is also bi-directionally connected to the hue calculation unit 1000, the person determination unit 1001, the weighting factor setting unit 1002, and the histogram correction unit 1003 to control these units.

Subsequently, a description will be given of the action of the conversion characteristic calculation unit 805.

The correct range extraction unit 302 reads the luminance signals from the buffer 110 which are compared with the pre-set threshold related to the dark part (by way of an example, in the case of 12-bit gradation, for example, 128) and the pre-set threshold related to the light part (in the case of the 12-bit gradation, for example, 3968) respectively, and transfers the luminance signals which are equal to or larger than the threshold of the dark part and also equal to or smaller than the threshold of the light part as the correct exposure range to the edge calculation unit 303 on the basis of the control of the control unit 118.

Also, the correct range extraction unit 302 reads the color difference signals Cb and Cr at coordinates corresponding to the luminance signals in the correct exposure range from the buffer 803 to be transferred to the hue calculation unit 1000.

The edge calculation unit 303 and the histogram creation unit 304 create the histogram of edge regions from the luminance signals similarly to the above-mentioned first embodiment, and transfer the created histogram to the histogram correction unit 1003.

The hue calculation unit 1000 reads the color difference signals Cb and Cr from the correct range extraction unit 302 which are compared with the pre-set threshold to extract a skin color region, and transfers the result to the person determination unit 1001 on the basis of the control of the control unit 118.

The person determination unit 1001 uses the information related to the skin color region from the hue calculation unit 1000 and the edge amount from the edge calculation unit 303 to extract a region determined as a human face, and transfers the result to the weighting factor setting unit 1002 on the basis of the control of the control unit 118.

On the basis of the control of the control unit 118, the weighting factor setting unit 1002 calculates luminance information in the region determined as the human face which is multiplied by a predetermined coefficient, thereby weighting factors for the corrections at the respective luminance levels are calculated. It should be noted that the weighting factors at the luminance levels which do not exist in the region determined as the human face are 0. The weighting factor setting unit 1002 transfers the calculated weighting factors to the histogram correction unit 1003.

The histogram correction unit 1003 reads the histogram from the histogram creation unit 304 and also reads the weighting factors from the weighting factor setting unit 1002 on the basis of the control of the control unit 118. Then, the histogram correction unit 1003 adds the weighting factors to the respective luminance levels of the histogram to perform the correction. The corrected histogram is transferred to the gradation conversion curve calculation unit 305, and similarly to the above-mentioned first embodiment, the gradation conversion curve is calculated.

The calculated gradation conversion curve is transferred to the buffer 306, and when necessary, transferred to the gradation processing unit 807. It should be noted that according to the present embodiment, the space-invariant processing is supposed, and the calculated gradation conversion curve is of one type.

Figure 20:
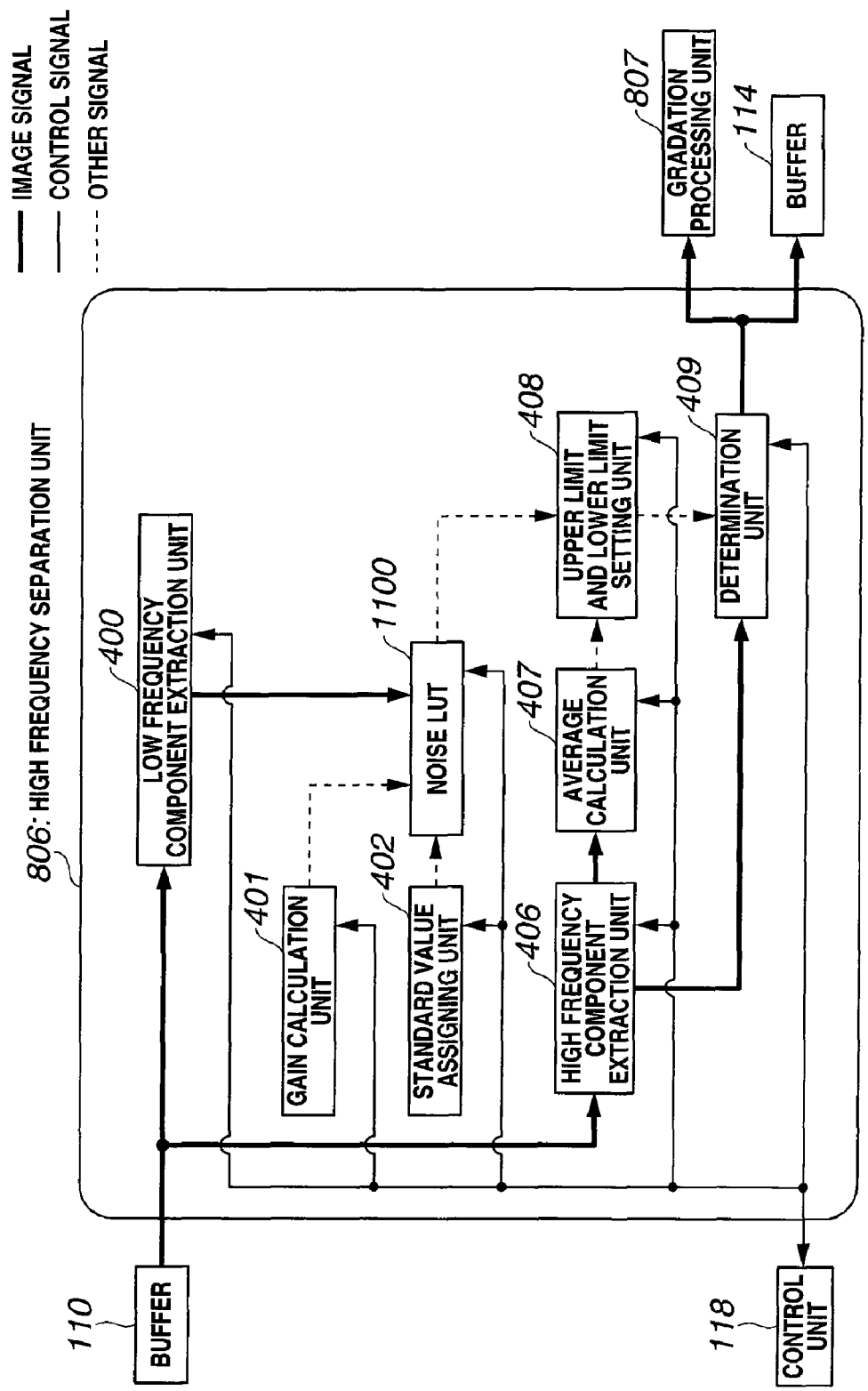
FIG. 20 is a block diagram of a configuration example of a high frequency separation unit according to the second embodiment.

Next, FIG. 20 is a block diagram of a configuration example of the high frequency separation unit 806.

The high frequency separation unit 806 has such a configuration that with respect to the high frequency separation unit 112 shown in FIG. 5 of the above-mentioned first embodiment, a noise LUT 1100 constituting noise estimation means and table conversion means are added, and the parameter ROM 403, the parameter selection unit 404, and the interpolation unit 405 are omitted. Other basic configuration is similar to that of the high frequency separation unit 112 shown in FIG. 5. Therefore, the same components are allocated with the same names and reference numerals to appropriately omit the description thereof, and only a different part will be mainly described.

The low frequency component extraction unit 400, the gain calculation unit 401, and the standard value assigning unit 402 are connected to the noise LUT 1100. The noise LUT 1100 is connected to the upper limit and lower limit setting unit 408.

The determination unit 409 is connected to the gradation processing unit 807 and the buffer 114.

The control unit 118 is also bi-directionally connected to the noise LUT 1100 to control the table.

Subsequently, a description will be given of the action of the high frequency separation unit 806.

The gain calculation unit 401 calculates the gain information in the amplification unit 103 which is transferred to the noise LUT 1100 on the basis of the ISO sensitivity, the information related to the exposure conditions, and the white balance coefficient sent from the control unit 118.

Also, the control unit 118 obtains temperature information of the color CCD 800 from the temperature sensor 120 and transfers the thus obtained temperature information to the noise LUT 1100.

On the basis of the control of the control unit 118, in a case where at least one of the above-mentioned gain information and the temperature information cannot be obtained, the standard value assigning unit 402 transfers a standard value of the information that cannot be obtained to the noise LUT 1100.

The noise LUT 1100 is a look up table where a relation among the signal value level of the image signal, the gain of the image signal, and the operation temperature of the image pickup device, and the noise amount is recorded. The look up table is designed, for example, by using the technology disclosed in Japanese Unexamined Patent Application Publication No. 2004-128985 described above. The noise LUT 1100 outputs the noise amount on the basis of the pixel value of the target pixel from the low frequency component extraction unit 400, the gain information from the gain calculation unit 401 or the standard value assigning unit 402, and the temperature information from the control unit 118 or the standard value assigning unit 402. The output noise amount is transferred to the upper limit and lower limit setting unit 408.

The high frequency component extraction unit 406 extracts the high frequency component corresponding to the low frequency component extracted by the low frequency component extraction unit 400 and the high frequency components located in the neighborhood of the high frequency component on the basis of the control of the control unit 118.

It should be noted that according to the present embodiment, as described above, the frequency decomposition unit 804 uses the low-pass filter and the difference filter to extract the low frequency component and the high frequency component. Therefore, the pixel configurations of the low frequency component and the high frequency component are of the same size and, and the high frequency component corresponding to the low frequency component is one pixel.

The action of the high frequency separation unit 806 thereafter is similar to that of the high frequency separation unit 112 of the above-mentioned first embodiment. The high frequency component is separated into the valid component and the invalid component. The valid component is transferred to the gradation processing unit 807, and the invalid component is transferred to the buffer 114, respectively.

Figure 21:
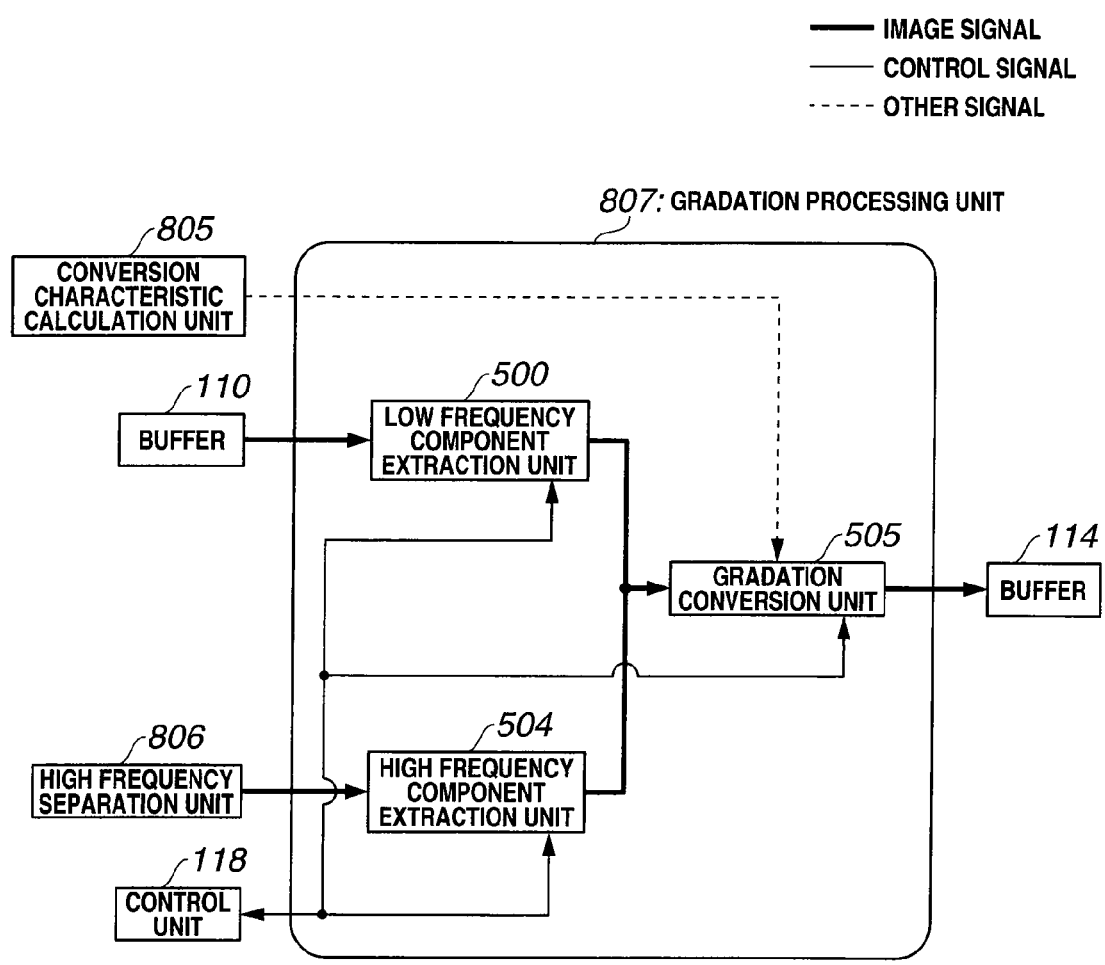
FIG. 21 is a block diagram of a configuration example of a gradation processing unit according to the second embodiment.

Next, FIG. 21 is a block diagram of a configuration example of the gradation processing unit 807.

The gradation processing unit 807 has such a configuration that with respect to the gradation processing unit 113 shown in FIG. 6 of the above-mentioned first embodiment, the distance calculation unit 501, the gradation conversion equation setting unit 502, and the buffer 503 are deleted. Other basic configuration is similar to that of the gradation processing unit 113 shown in FIG. 6. Therefore, the same components are allocated with the same names and reference numerals to appropriately omit the description thereof, and only a different part will be mainly described.

The conversion characteristic calculation unit 805 is connected to the gradation conversion unit 505.

The buffer 110 is connected via the low frequency component extraction unit 500 to the gradation conversion unit 505. The high frequency separation unit 806 is connected via the high frequency component extraction unit 504 to the gradation conversion unit 505.

The control unit 118 is bi-directionally connected to the low frequency component extraction unit 500, the high frequency component extraction unit 504, and the gradation conversion unit 505 to control these units.

Subsequently, a description will be given of the action of the gradation processing unit 807.

The low frequency component extraction unit 500 sequentially extracts the low frequency components from the buffer 110 for each pixel on the basis of the control of the control unit 118. The low frequency component extraction unit 500 transfers the extracted low frequency components to the gradation conversion unit 505.

The high frequency component extraction unit 504 extracts the high frequency components corresponding to the low frequency components extracted by the low frequency component extraction unit 500 from the high frequency separation unit 806 on the basis of the control of the control unit 118. According to the present embodiment, as described above, the pixel configurations of the low frequency component and the high frequency component are of the same size, and the high frequency component corresponding to the low frequency component is one pixel. It should be noted that in a case where it is determined that the high frequency component corresponding to the low frequency component is the invalid component and the extracted high frequency component does not exist, the high frequency component extraction unit 504 transfers the error information to the control unit 118.

The gradation conversion unit 505 reads the low frequency components from the low frequency component extraction unit 500 on the basis of the control of the control unit 118 and reads the gradation conversion curve from the conversion characteristic calculation unit 805 to perform the gradation conversion on the low frequency components. The gradation conversion unit 505 transfers the low frequency component after the gradation conversion to the buffer 114.

After that, the gradation conversion unit 505 reads the high frequency component of the valid component corresponding to the low frequency component from the high frequency component extraction unit 504 to perform the gradation conversion. Then, the gradation conversion unit 505 transfers the high frequency component after the gradation conversion to the buffer 114. It should be noted that in a case where the high frequency component corresponding to the low frequency component does not exist, the gradation conversion unit 505 cancel the gradation conversion on the high frequency component on the basis of the control of the control unit 118.

It should be noted that according to the present embodiment too, similarly to the above-mentioned first embodiment, the image processing system in which the image pickup unit is separately provided may be used.

Also, in the above, it is supposed to perform the processing by way of the hardware, but the configuration is not necessarily limited to the above. For example, the color image signal from the color CCD 800 is recorded on the recording medium such as a memory card as raw data while being unprocessed, and the associated information such as image pickup conditions (for example, the temperature of the image pickup device, the exposure conditions, and the like, for each shooting operation from the control unit 118) is recorded in the recording medium as the header information. Then, the processing can be performed as the computer is allowed to execute the image processing program which is separate software to instruct the computer to read the information of the recording medium. It should be noted that the transmission of various pieces of information from the image pickup unit to the computer is not necessarily performed via the recording medium and may be performed via a communication line or the like.

Figure 22:
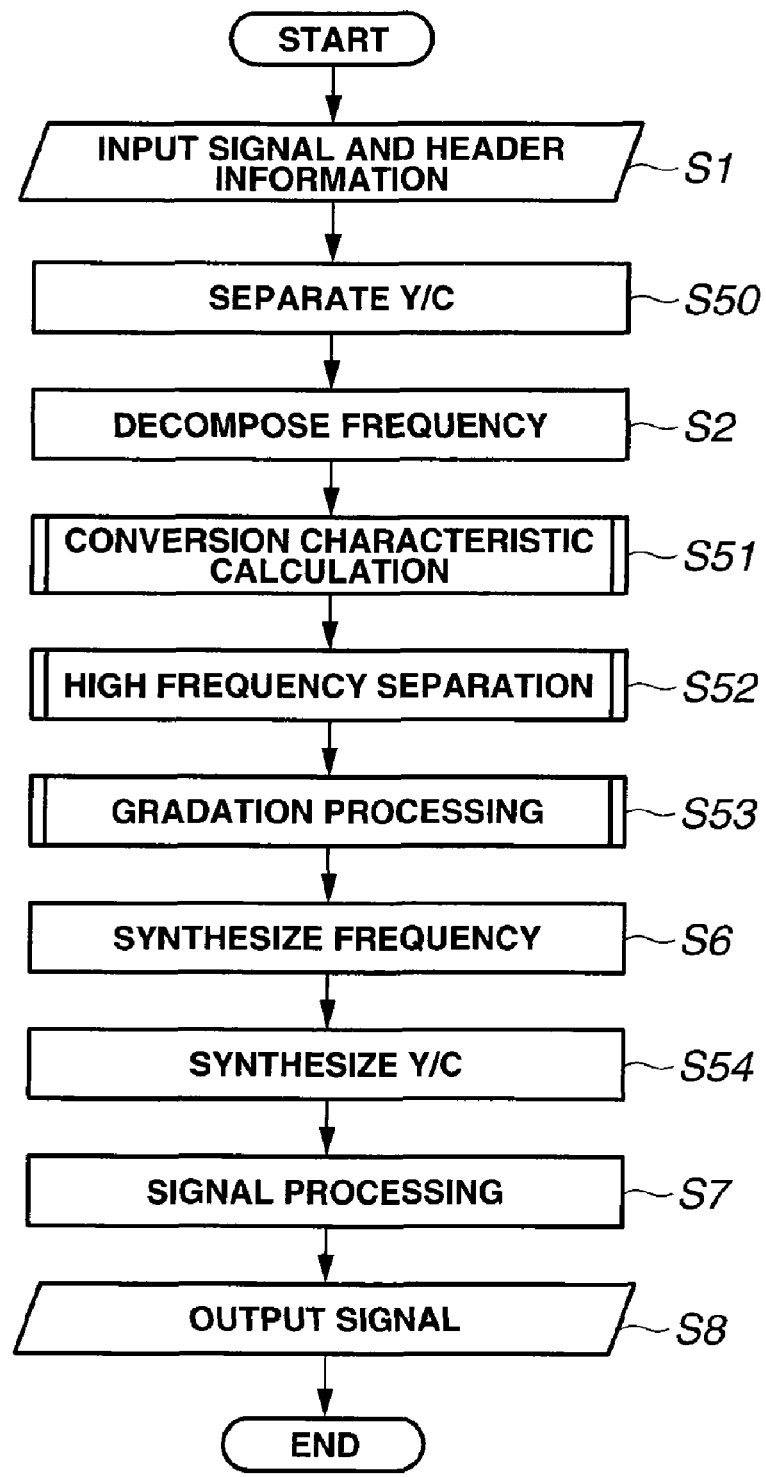
FIG. 22 is a flow chart showing a main routine of an image processing program according to the second embodiment.

FIG. 22 is a flow chart showing a main routine of an image processing program.

It should be noted that in FIG. 22, processing steps basically substantially identified with the processing shown in FIG. 11 of the above-mentioned first embodiment are allocated with the same step numbers.

When the processing is started, first, the color image signal is read, and also the header information such as the temperature and the exposure conditions of the image pickup device is read (step S1).

Next, as shown in Numeric Expression 5, the luminance signals and the color difference signals are calculated (step S50).

Subsequently, by using the low-pass filter and the difference filter, the frequency decomposition on the luminance signals is performed, and the high frequency component and the low frequency component are obtained (step S2).

Furthermore, as is described below with reference to FIG. 23, the conversion characteristic is calculated (step S51).

Then, as is described below with reference to FIG. 24, the high frequency component is separated into the invalid component caused by the noise and the other valid component (step S52).

Next, as is described below with reference to FIG. 25, the gradation processing is performed on the low frequency component and the valid component in the high frequency component (step S53).

Subsequently, on the basis of the low frequency component on which the gradation processing has been performed, the valid component in the high frequency component on which the gradation processing has been performed, and the invalid component in the high frequency component, the luminance signals on which the gradation conversion has been performed are synthesized one another (step S6).

Then, as shown in Numeric Expression 6, the luminance signals and the color difference signals are synthesized to obtain the color image signal on which the gradation conversion has been performed (step S54).

Furthermore, the signal processing such as a known compression processing is performed (step S7).

After that, the color image signal after the processing is output (step S8), and the processing is ended.

Figure 23:
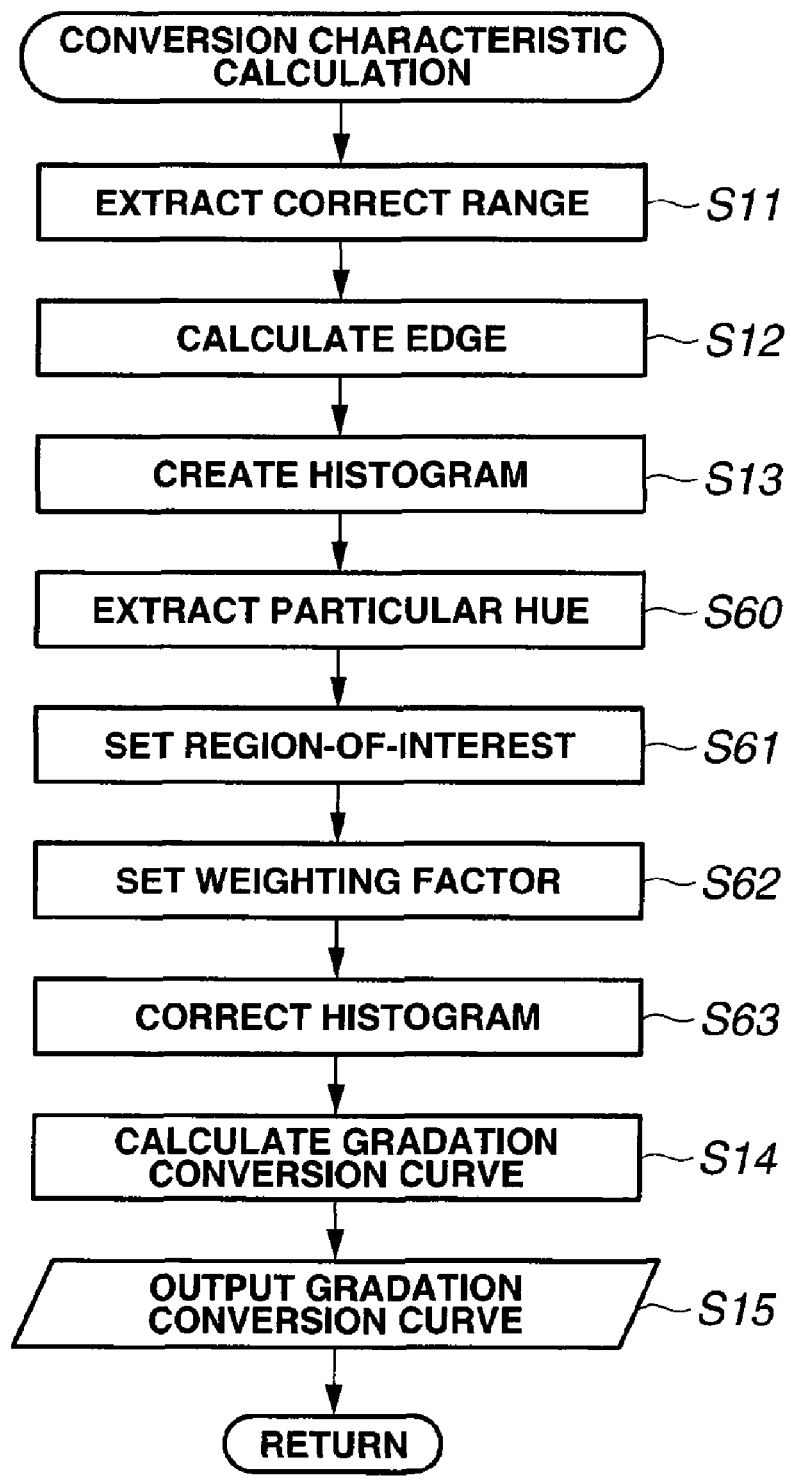
FIG. 23 is a flow chart showing a processing for a conversion characteristic calculation in step S51 of FIG. 22 according to the second embodiment.

FIG. 23 is a flow chart showing the processing for the conversion characteristic calculation in the above-mentioned step S51.

It should be noted that in FIG. 23, processing steps basically substantially identified with the processing shown in FIG. 12 of the above-mentioned first embodiment are allocated with the same step numbers.

When the processing is started, the luminance signals are compared with the pre-set threshold related to the dark part and the pre-set threshold related to the light part to extract the luminance signals which are equal to or larger than the threshold of the dark part and also equal to or smaller than the threshold of the light part as the correct exposure range (step S11).

Subsequently, the known calculation for the edge intensity is performed on the luminance signals in the correct exposure range by using the Laplacian filter or the like (step S12).

Then, by selecting the pixels having the edge intensity equal to or larger than the pre-set threshold, the histogram is created (step S13).

After that, by comparing the color difference signal with the pre-set threshold, a particular hue region, for example, a skin color region is extracted (step S60).

Furthermore, on the basis of the skin color region and the information on the edge intensity, the region determined as the human face is extracted and set as a region-of-interest (step S61).

Next, the luminance information in the region-of-interest is calculated and multiplied by a pre-set coefficient to calculate the weighting factors for the correction related to the respective luminance levels (step S62).

Subsequently, the weighting factors are added to the respective luminance levels of the histogram to perform the correction on the histogram (step S63).

After that, by accumulating the histograms and further performing the normalization, the gradation conversion curve is calculated (step S14).

The gradation conversion curve calculated in the above-mentioned manner is output (step S15), and the flow is returned from the processing to the processing shown in FIG. 22.

Figure 24:
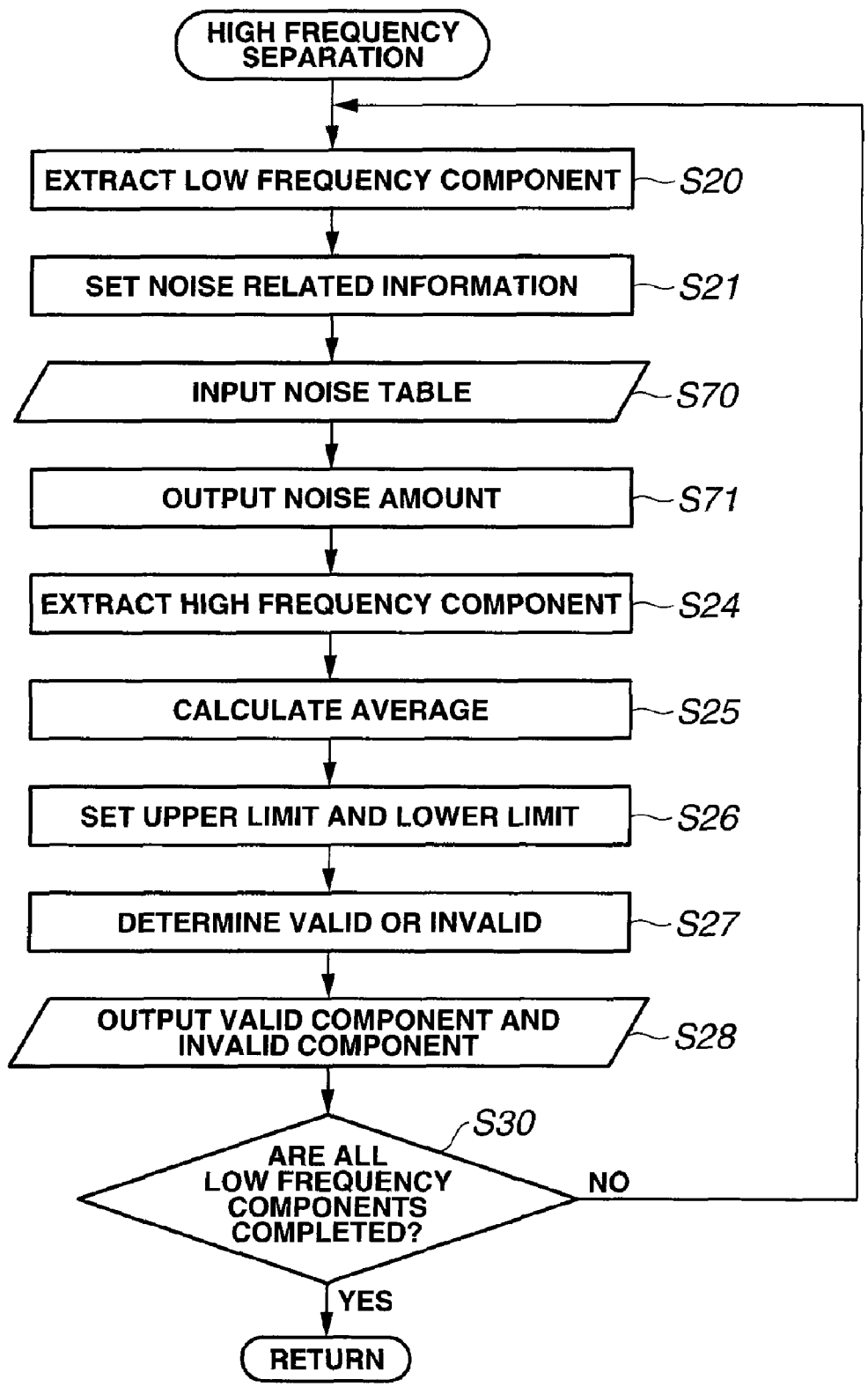
FIG. 24 is a flow chart showing a processing for a high frequency separation in step S52 of FIG. 22 according to the second embodiment.

FIG. 24 is a flow chart showing the processing for the high frequency separation.

It should be noted that in FIG. 24, processing steps basically substantially identified with the processing shown in FIG. 13 of the above-mentioned first embodiment are allocated with the same step numbers.

When the processing is started, first, the low frequency components are sequentially extracted for each pixel (step S20).

Next, from the read header information, the information such as the temperature and the gain of the image pickup device is set. At this time, if a necessary parameter does not exist for the header information, a pre-set standard value is assigned to the relevant information (step S21).

Subsequently, the table related to the noise amount where a relation among the signal value level of the image signal, the gain of the image signal, the operation temperature of the image pickup device, and the noise amount is recorded is read (step S70).

Then, on the basis of the table related to the noise amount, the noise amount is calculated (step S71).

After that, the high frequency component corresponding to the low frequency component and the high frequency components located in the neighborhood of the high frequency component are extracted (step S24).

Furthermore, from the high frequency component corresponding to the low frequency component and the high frequency components located in the neighborhood of the high frequency component, the average value is calculated (step S25).

Next, on the basis of the average value and the noise amount, the upper limit and the lower limit are set as shown in Numeric Expression 3 (step S26).

Subsequently, in a case where the high frequency component is in the range between the upper limit and the lower limit, it is determined that the high frequency component is the invalid component caused by the noise, and in a case where the high frequency component exceeds the upper limit or falls short of the lower limit, it is determined that the high frequency component is the valid component (step S27).

Then, the valid component and the invalid component are output while being separated from each other (step S28).

Furthermore, it is determined whether or not the processing for all the low frequency components has been completed (step S30). In a case where it is determined that the processing has not been completed, the flow is returned to the above-mentioned step S20 to repeat the above-mentioned processing. On the other hand, in a case where it is determined that the processing has been completed, the flow is returned to the processing shown in FIG. 22.

Figure 25:
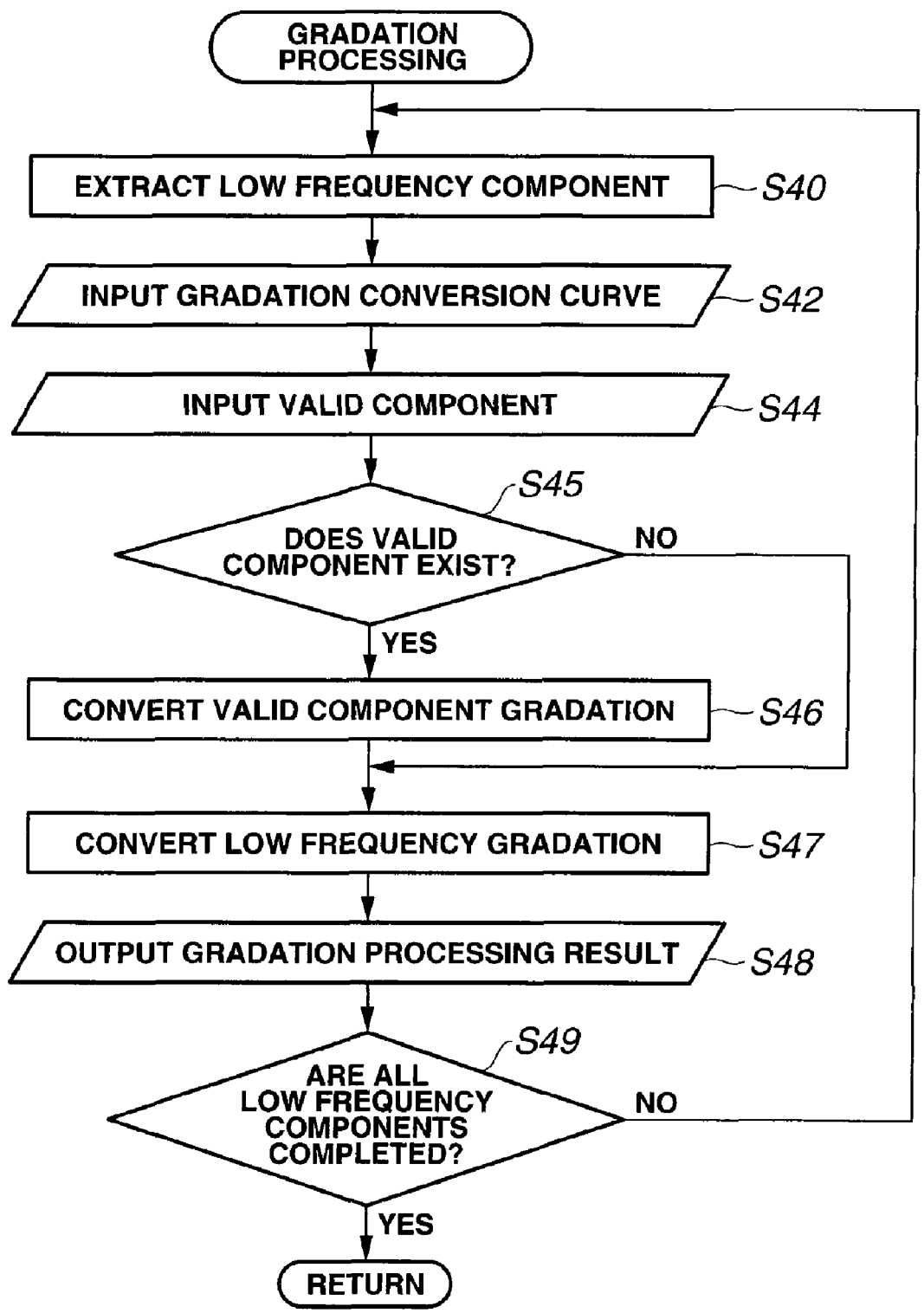
FIG. 25 is a flow chart showing a gradation processing in step S53 of FIG. 22 according to the second embodiment.

FIG. 25 is a flow chart showing the gradation processing in the above-mentioned step S53.

It should be noted that in FIG. 25, processing steps basically substantially identified with the processing shown in FIG. 14 of the above-mentioned first embodiment are allocated with the same step numbers.

When the processing is started, first, the low frequency components are sequentially extracted for each pixel (step S40).

Next, the gradation conversion curve is read (step S42).

Subsequently, the high frequency component regarded as the valid component corresponding to the low frequency component is extracted (step S44).

Then, it is determined whether or not the high frequency component regarded as the valid component exists (step S45).

At this time, in a case where it is determined that the high frequency component regarded as the valid component exists, the gradation conversion is performed on the high frequency component regarded as the valid component (step S46).

When the processing in the step S46 is ended or in a case where it is determined that the high frequency component regarded as the valid component does not exist in the above-mentioned step S45, the gradation conversion is performed on the low frequency components (step S47).

Next, the low frequency component on which the gradation processing has been performed and the valid component in the high frequency component on which the gradation processing has been performed are output (step S48).

After that, it is determined whether or not the processing for all the low frequency components has been completed (step S49). In a case where it is determined that the processing has not been completed, the flow is returned to the above-mentioned step S40 to repeat the above-mentioned processing. On the other hand, in a case where it is determined that the processing has been completed, the flow is returned to the processing shown in FIG. 22.

It should be noted that in the above description, the configuration of using the low-pass filter and the difference filter for the frequency decomposition and the frequency synthesis is adopted, but the configuration is not necessarily limited to the above. For example, a configuration of using a Gaussian filter and the Laplacian filter for the frequency decomposition and the frequency synthesis may also be adopted. In this case, although the operation amount is increased, an advantage is provided that the performance of the frequency decomposition is better. Then, in a case where the Gaussian filter and the Laplacian filter are used, similarly to the above-mentioned first embodiment, a configuration of performing the frequency decomposition and the frequency synthesis at multi stages can be adopted.

Also, in the above description, for the color image pickup device, the configuration of using the Bayer-type primary color filter is adopted, but the configuration is not necessarily limited to the above. For example, the single image pickup device using a color-difference line-sequential type complementary color filter shown in FIG. 17 or the two or three image pickup device may also be applied.

Herein, FIG. 17 is a diagram illustrating the configuration of the color-difference line-sequential type complementary color filter.

The color-difference line-sequential type complementary color filter has a basic unit of 2×2 pixels. Cyan (Cy) and yellow (Ye) are arranged on the same line of the 2×2 pixels, and magenta (Mg) and green (G) are arranged on the other line of the 2×2 pixels. It should be noted that such a configuration is adopted that the positions of magenta (Mg) and green (G) are inverted for each line.

According to the second embodiment described above, only the high frequency component where the influence of the noise prominently visually appears with respect to the color signal is separated into the invalid component and the valid component. The gradation processing is performed on the valid component, and the gradation processing is not performed on the invalid component, and an increase in noise accompanying with the gradation processing is suppressed. Thus, it is possible to generate the high quality color image signal.

Also, as the low frequency component is excluded from the target of the processing after being separated into the valid component and the invalid component, the possibility of generating the adverse effect accompanying with the processing is decreased, and it is possible to improve the stability.

Furthermore, as the image signal is synthesized with the invalid component, it is possible to obtain the color image signal with little sense of visual discomfort, and the stability and reliability of the processing can be improved.

Then, as the low-pass filter and the difference filter has a simple filter configuration, the image processing system in which the processing can be performed at a high speed can be configured at a low cost.

In addition, as the gradation conversion curve is obtained adaptively from the low frequency components of the luminance signals, it is possible to perform the high accuracy gradation conversion on various types of the color image signals.

Also, as the gradation conversion curve is calculated on the basis of the low frequency component, it is possible to calculate the appropriate gradation conversion curve with little influence from the noise.

Furthermore, as the gradation processing can be performed while weighting the region-of-interest such as a human being, it is possible to obtain the high quality image signals which are subjectively preferable.

Then, as the gradation conversion with the identical conversion characteristic is performed on the low frequency component and the valid component in the high frequency component located at the same position, it is possible to obtain the image signal providing the sense of integrity with little sense of visual discomfort.

In addition, in a case where the valid component in the high frequency component does not exist, the unnecessary gradation conversion is cancelled, and it is thus possible to improve the processing speed.

Third Embodiment

Figure 26:
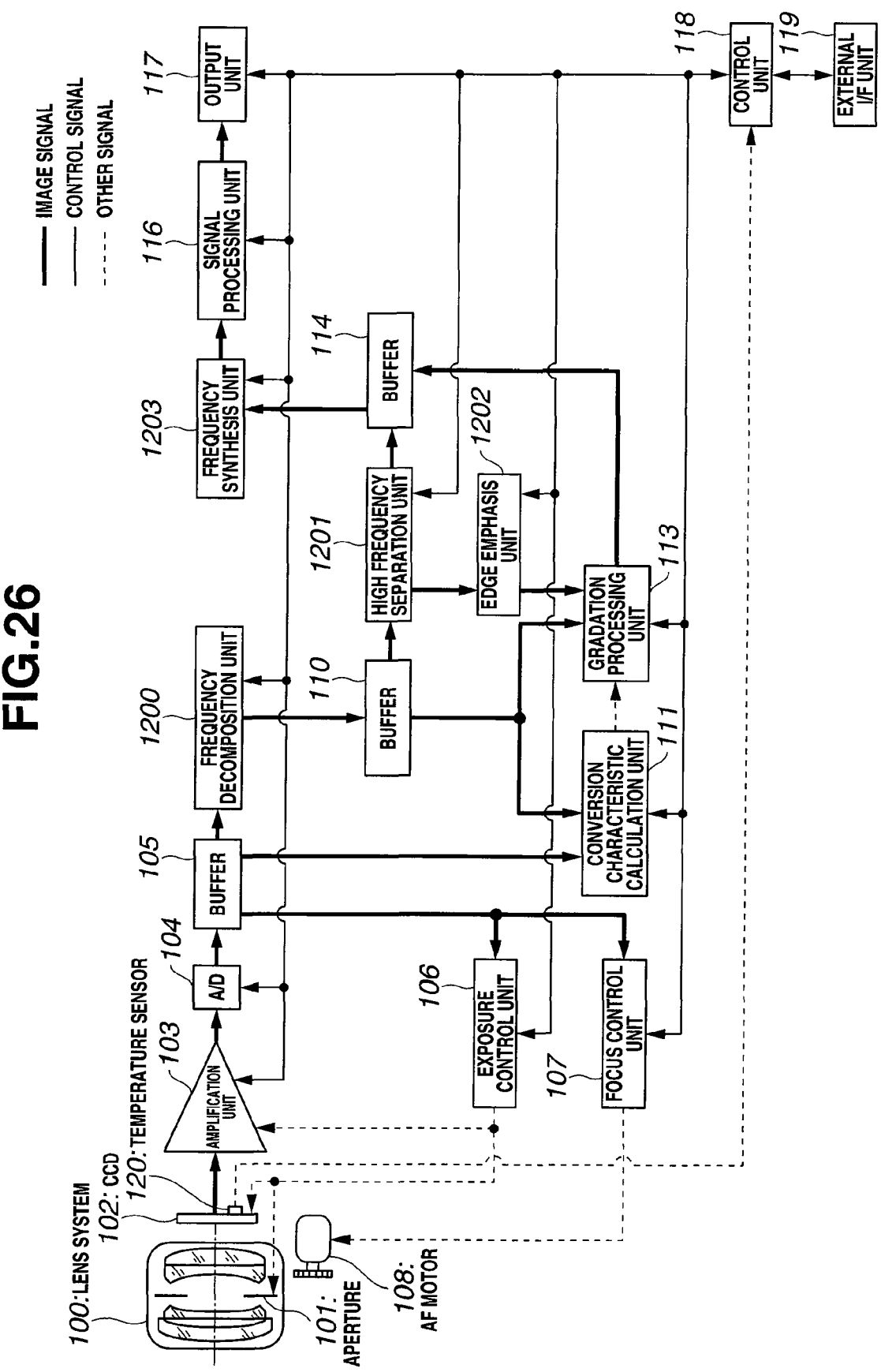
FIG. 26 is a block diagram of a configuration of an image processing system according to a third embodiment of the present invention.

FIGS. 26 to 30 illustrate a third embodiment of the present invention, and FIG. 26 is a block diagram of a configuration of an image processing system.

According to the third embodiment, a part similar to that of the above-mentioned first and second embodiments is allocated with the same reference numerals to appropriately omit the description thereof, and only a different part will be mainly described.

The image processing system according to the present embodiment has such a configuration that with respect to the above-mentioned image processing system illustrated in FIG. 1 according to the first embodiment, an edge emphasis unit 1202 constituting edge emphasis means is added, and the frequency decomposition unit 109, the high frequency separation unit 112, and the frequency synthesis unit 115 are respectively replaced by a frequency decomposition unit 1200 constituting separation means and frequency decomposition means, high frequency separation unit 1201 constituting separation means and high frequency separation means, and a frequency synthesis unit 1203 constituting synthesis means and frequency synthesis means. Other basic configuration is similar to that of the above-mentioned first embodiment. Therefore, the same components are allocated with the same names and reference numerals to appropriately omit the description thereof, and only a different part will be mainly described.

The buffer 105 is connected to the exposure control unit 106, the focus control unit 107, the conversion characteristic calculation unit 111, and the frequency decomposition unit 1200.

The frequency decomposition unit 1200 is connected to the buffer 110. The buffer 110 is connected to the conversion characteristic calculation unit 111, the high frequency separation unit 1201, and the gradation processing unit 113.

The high frequency separation unit 1201 is connected to the edge emphasis unit 1202 and the buffer 114. The edge emphasis unit 1202 is connected to the gradation processing unit 113.

The buffer 114 is connected via the frequency synthesis unit 1203 to the signal processing unit 116.

The control unit 118 is also bi-directionally connected to the frequency decomposition unit 1200, the high frequency separation unit 1201, the edge emphasis unit 1202, and the frequency synthesis unit 1203 to control these units.

Next, the action of the image processing system illustrated in FIG. 26 is basically similar to that of the first embodiment, and therefore only a different part will be mainly described along the flow of the image signal.

The image signal in the buffer 105 is transferred to the frequency decomposition unit 1200.

The frequency decomposition unit 1200 performs a predetermined frequency decomposition on the transferred image signal to obtain a high frequency component and a low frequency component on the basis of the control of the control unit 118. Then, the frequency decomposition unit 1200 sequentially transfers the thus obtained high frequency component and the low frequency components to the buffer 110. It should be noted that according to the present embodiment, for the frequency decomposition, for example, it is supposed to use a known discrete cosine transform of a 64×64 pixel unit.

Figure 27A:
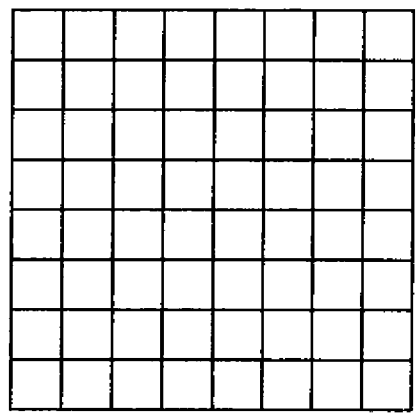
FIG. 27A is an explanatory diagram for describing a DCT (discrete cosine transform), illustrating an image signal in a real space according to the third embodiment.
Figure 27B:
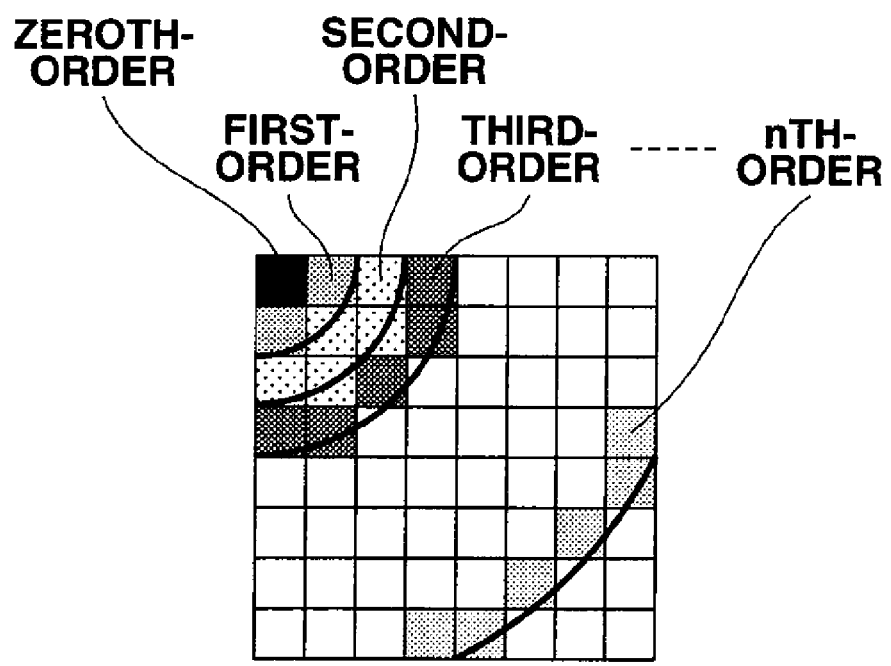
FIG. 27B is an explanatory diagram for describing the DCT (discrete cosine transform), illustrating a signal in a frequency space after the DCT transform according to the third embodiment.

FIGS. 27A and 27B are explanatory diagrams for describing the discrete cosine transform; FIG. 27A illustrates the image signal in the real space and FIG. 27B illustrates the signal in the frequency space after the discrete cosine transform, respectively.

In the frequency space of FIG. 27B, the upper left is set as the origin, that is, as the zero-th order component, and the high frequency components at the first-order or above are arranged on a concentric circle while using the zero-th order component as the origin.

The conversion characteristic calculation unit 111 reads the image signal from the buffer 105 for each 64×64 pixel unit used in the frequency decomposition unit 1200 on the basis of the control of the control unit 118. After that, the conversion characteristic calculation unit 111 calculates the gradation characteristic used for the gradation conversion processing similarly to the above-mentioned first embodiment. That is, according to the present embodiment, for the gradation conversion processing, it is supposed to employ the space-variant processing using a plurality of gradation characteristics different for each region at the 64×64 pixel unit. Then, the conversion characteristic calculation unit 111 transfers the calculated the gradation characteristic to the gradation processing unit 113.

The high frequency separation unit 1201 reads the high frequency components from the buffer 110 and performs the noise reducing processing on the high frequency components on the basis of the control of the control unit 118. After that, the high frequency component is separated into the invalid component caused by the noise and the other valid component. Then, the high frequency separation unit 1201 transfers the thus separated valid components to the edge emphasis unit 1202 and the above-mentioned invalid components to the buffer 114, respectively.

The edge emphasis unit 1202 multiplies the valid component transferred by the high frequency separation unit 1201 by a pre-set coefficient to perform the edge emphasis processing, and transfers the processing result to the gradation processing unit 113.

The gradation processing unit 113 reads the low frequency components from the buffer 110, the valid components in the high frequency components from the edge emphasis unit 1202, and the gradation characteristic from the conversion characteristic calculation unit 111, respectively, on the basis of the control of the control unit 118. Then, on the basis of the above-mentioned gradation characteristic, the gradation processing unit 113 performs the gradation processing on the low frequency component and the valid components in the high frequency components. The gradation processing unit 113 transfers the low frequency component on which the gradation processing has been performed and the valid components in the high frequency components to the buffer 114.

The frequency synthesis unit 1203 reads the low frequency component on which the gradation processing has been performed, the valid component in the high frequency component on which the gradation processing has been performed, and the invalid component in the high frequency component from the buffer 114 on the basis of the control of the control unit 118, and synthesizes the image signal on which the gradation processing has been performed on the basis of these components. It should be noted that according to the present embodiment, for the frequency synthesis, it is supposed to use a known inverse DCT (Discrete Cosine Transform). Then, the frequency synthesis unit 1203 transfers the synthesized image signal to the signal processing unit 116.

The signal processing unit 116 performs a known compression processing or the like on the image signal from the frequency synthesis unit 1203 and transfers the signal after the processing to the output unit 117 on the basis of the control of the control unit 118.

The output unit 117 records and saves the image signal output from the signal processing unit 116 in the recording medium such as a memory card.

Figure 28:
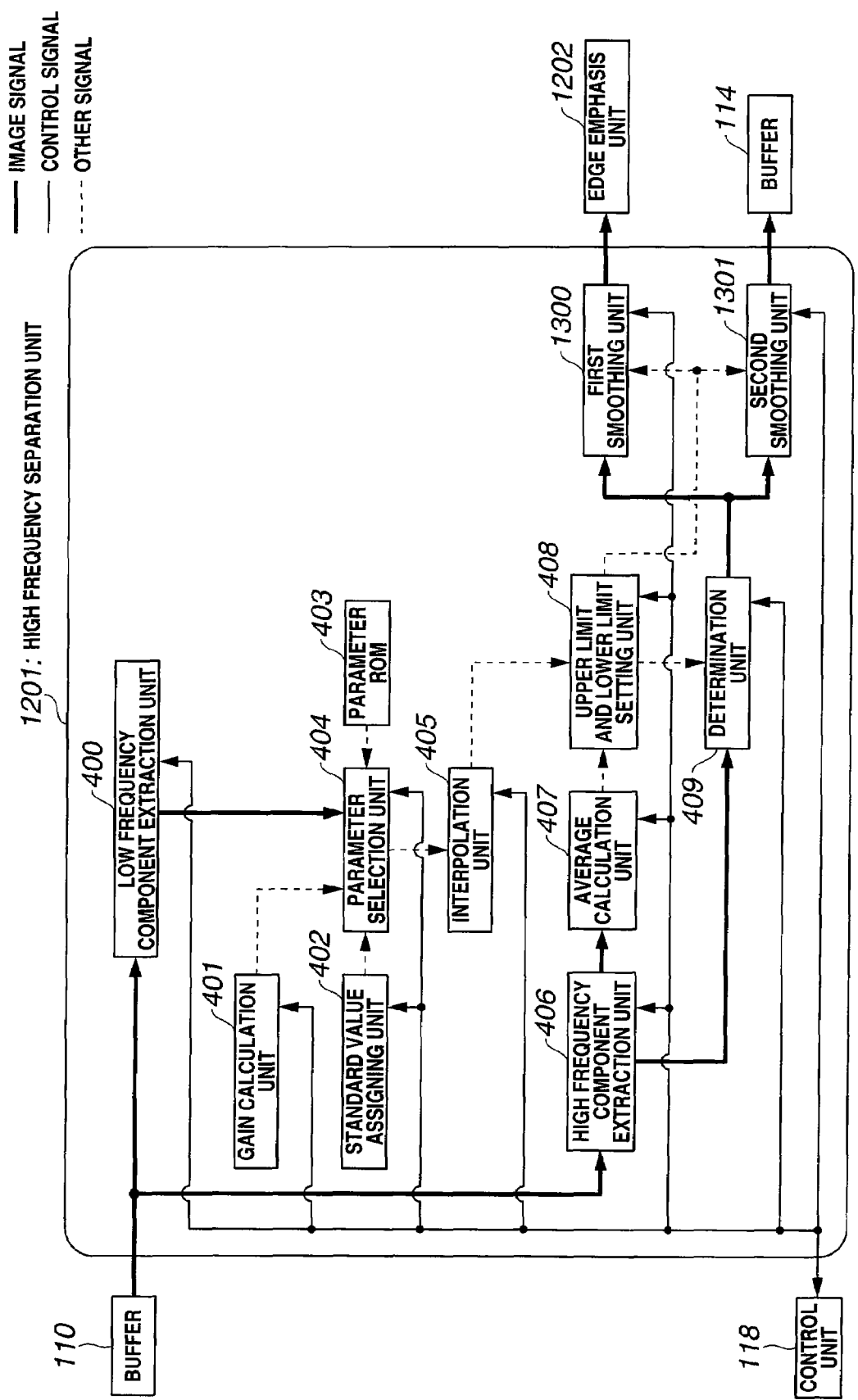
FIG. 28 is a block diagram of a configuration example of a high frequency separation unit according to the third embodiment.

Next, FIG. 28 is a block diagram of a configuration example of the high frequency separation unit 1201.

The high frequency separation unit 1201 has such a configuration that with respect to the high frequency separation unit 112 shown in FIG. 5 of the above-mentioned first embodiment, a first smoothing unit 1300 constituting noise reducing means and first smoothing means and a second smoothing unit 1301 constituting noise reducing means and second smoothing means are added. Other basic configuration is similar to that of the high frequency separation unit 112 shown in FIG. 5. Therefore, the same components are allocated with the same names and reference numerals to appropriately omit the description thereof, and only a different part will be mainly described.

The determination unit 409 is connected to the first smoothing unit 1300 and the second smoothing unit 1301. The first smoothing unit 1300 is connected to the edge emphasis unit 1202. The second smoothing unit 1301 is connected to the buffer 114.

The control unit 118 is bi-directionally connected to the first smoothing unit 1300 and the second smoothing unit 1301 to control these units.

Subsequently, a description will be given of the action of the high frequency separation unit 1201.

The low frequency component extraction unit 400 sequentially extracts the low frequency components from the buffer 110 on the basis of the control of the control unit 118. It should be noted that according to the present embodiment, as described above, it is supposed to use the discrete cosine transform of the 64×64 pixels. Then, the low frequency component extraction unit 400 extracts frequency components equal to or smaller than a predetermined n-th order among the frequency components at the respective orders shown in FIG. 27B as the low frequency components from the respective regions of the 64×64 pixels.

Regarding the extracted low frequency components, the noise amount is calculated via the parameter selection unit 404 and the interpolation unit 405 similarly to the above-mentioned first embodiment. Then, the interpolation unit 405 transfers the calculated noise amount to the upper limit and lower limit setting unit 408.

The high frequency component extraction unit 406 extracts frequency components at equal to or larger than the (n+1)-th order from the respective regions of the 64×64 pixels corresponding to the low frequency components extracted by the low frequency component extraction unit 400 as the high frequency components on the basis of the control of the control unit 118.

The average calculation unit 407 separates the high frequency components for each order to calculate the respective average values AV on the basis of the control of the control unit 118 and transfers the calculated average value AV to the upper limit and lower limit setting unit 408.

On the basis of the control of the control unit 118, by using the average value AV from the average calculation unit 407 and the noise amount N from the interpolation unit 405, the upper limit and lower limit setting unit 408 sets an upper limit App_Up and a lower limit App_Low for distinguishing the valid component and the invalid component as represented by Numeric Expression 3 as follows for each order.

The upper limit and lower limit setting unit 408 transfers the thus set upper limit App_Up and the lower limit App_Low to the determination unit 409, transfers the average value AV to the second smoothing unit 1301, and transfers the average value AV and the noise amount N to the first smoothing unit 1300, respectively.

On the basis of the control of the control unit 118, the determination unit 409 reads the high frequency components from the high frequency component extraction unit 406, and also reads the upper limit App_Up and the lower limit App_Low corresponding to the order of the high frequency components from the upper limit and lower limit setting unit 408. Then, in a case where the high frequency component exceeds the upper limit App_Up or falls short of the lower limit App_Low, the determination unit 409 determines that the high frequency component is the valid component and transfers the high frequency components to the first smoothing unit 1300.

On the other hand, in a case where the high frequency component is in the range between the upper limit App_Up and the lower limit App_Low, the determination unit 409 determines that the high frequency component is the invalid component caused by the noise and transfers the high frequency component to the second smoothing unit 1301.

The second smoothing unit 1301 performs a processing of substituting the high frequency component (herein, the high frequency component is set as P) with the average value AV from the upper limit and lower limit setting unit 408 as shown in Numeric Expression 7 below.

$$P=AV \qquad \text{[Expression 7]}$$

Also, the first smoothing unit 1300 uses the average value AV from the upper limit and lower limit setting unit 408 and the noise amount N to perform the correction on the high frequency component P. The correction has two types of processings. First, in a case where the high frequency component exceeds the upper limit App_Up, the first smoothing unit 1300 performs a correction as shown in Numeric Expression 8 below.

$$P=AV-N/2 \qquad \text{[Expression 8]}$$

On the other hand, in a case where the high frequency components falls short of the lower limit App_Low, the first smoothing unit 1300 performs a correction as shown in Numeric Expression 9 below.

$$P=AV+N/2 \qquad \text{[Expression 9]}$$

Then, the processing result obtained by the first smoothing unit 1300 is transferred to the edge emphasis unit 1202, and the processing result obtained by the second smoothing unit 1301 is transferred to the buffer 114, respectively.

Therefore, only the high frequency component determined as the valid component is transferred via the edge emphasis unit 1202 to the gradation processing unit 113, and the gradation processing is performed. On the other hand, the high frequency component determined as the invalid component is transferred to the buffer 114 without performing the gradation processing thereon.

It should be noted that according to the present embodiment too, similarly to the above-mentioned first and second embodiments, the image processing system in which the image pickup unit is separately provided may be used.

Also, in the above, it is supposed to perform the processing by way of the hardware, but the configuration is not necessarily limited to the above. For example, the image signal from the CCD 112 is recorded in the recording medium such as a memory card as raw data without applying the process, and also the associated information such as image pickup conditions (for example, the temperature of the image pickup device, the exposure conditions, and the like, for each shooting operation from the control unit 118) is recorded in the recording medium as the header information. Then, the processing can be performed as the computer is allowed to execute the image processing program which is separate software to instruct the computer to read the information of the recording medium. It should be noted that the transmission of various pieces of information from the image pickup unit to the computer is not necessarily performed via the recording medium and may be performed via a communication line or the like.

Figure 29:
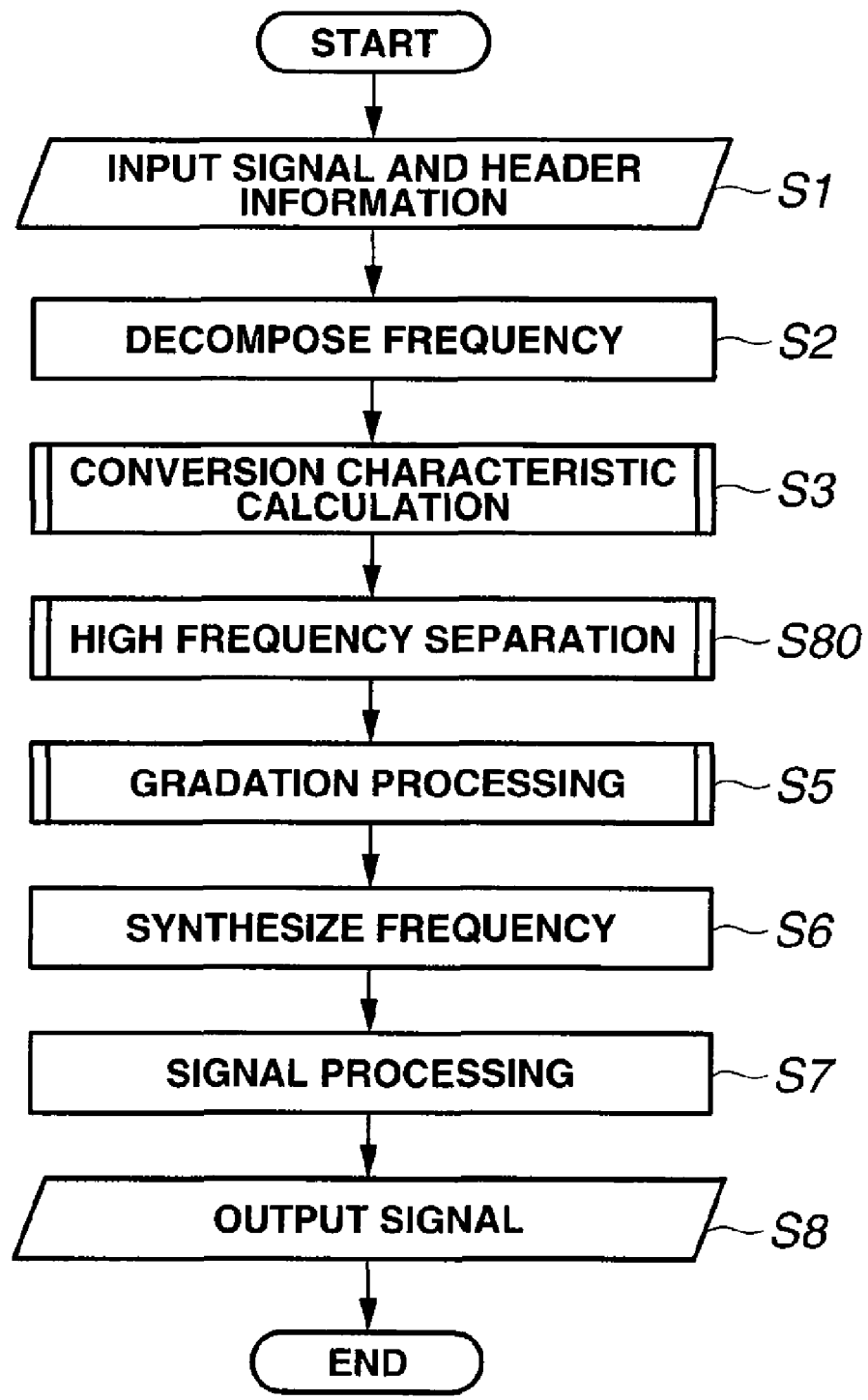
FIG. 29 is a flow chart showing a main routine of an image processing program according to the third embodiment.

FIG. 29 is a flow chart showing a main routine of an image processing program.

It should be noted that in FIG. 29, processing steps basically substantially identified with the processing shown in FIG. 11 of the above-mentioned first embodiment are allocated with the same step numbers.

When the processing is started, first, the image signal is read, and also the header information such as the temperature and the exposure conditions of the image pickup device is read (step S1).

Next, by performing the frequency decomposition such as the discrete cosine transform, the high frequency component and the low frequency component are obtained (step S2).

Subsequently, as shown in FIG. 12, the conversion characteristic is calculated (step S3).

Furthermore, as is described below with reference to FIG. 30, the high frequency component is separated into the invalid component caused by the noise and the other valid component (step S80).

Then, as shown in FIG. 14, the gradation processing is performed on the low frequency component and the valid component in the high frequency component (step S5).

Next, on the basis of the low frequency component on which the gradation processing has been performed, the valid component in the high frequency component on which the gradation processing has been performed, and the invalid component in the high frequency component, the image signal on which the gradation conversion has been performed is synthesized (step S6).

Subsequently, the signal processing such as a known compression processing is performed (step S7).

Then, the image signal after the processing is output (step S8), and the processing is ended.

Figure 30:
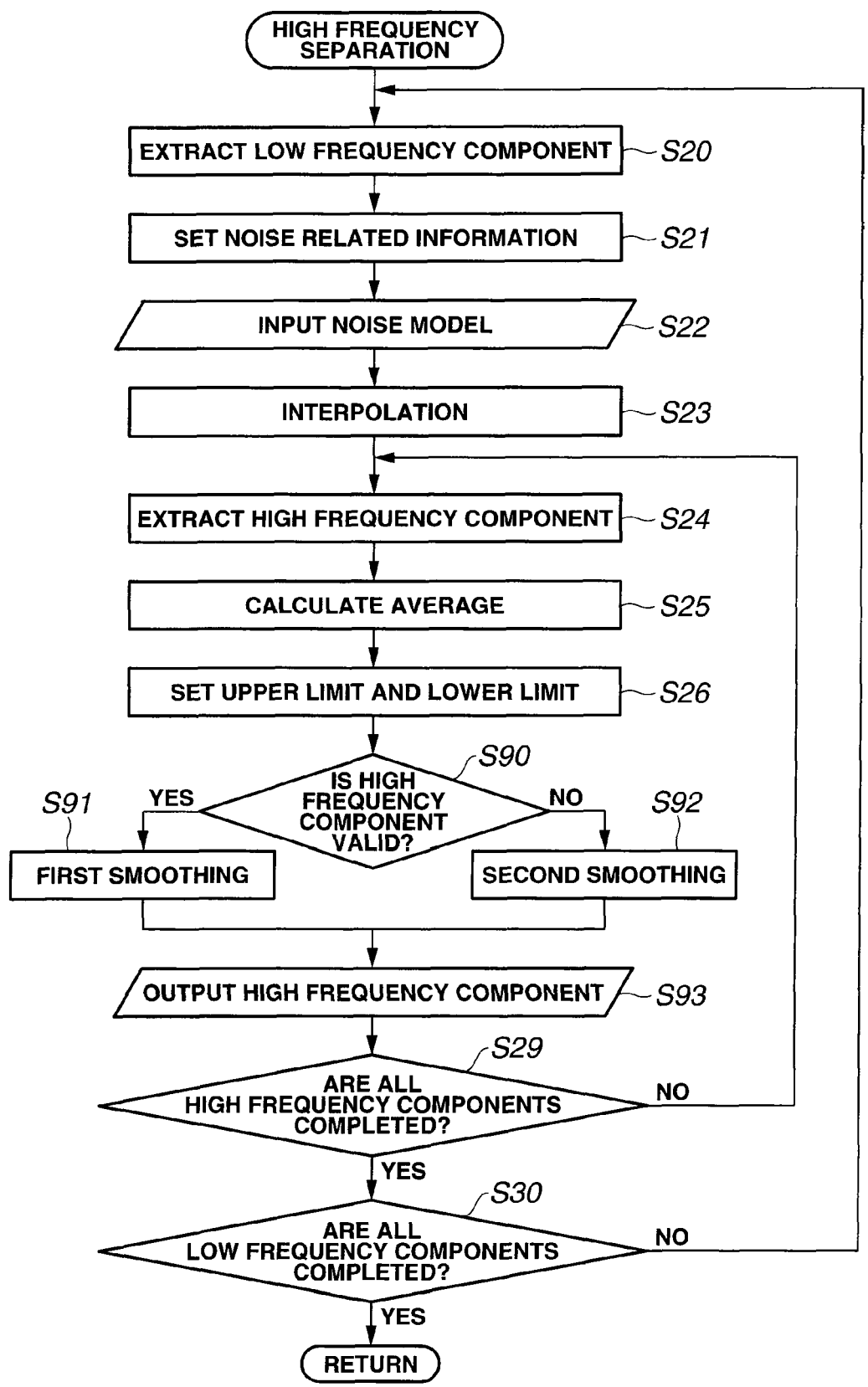
FIG. 30 is a flow chart showing a processing for a high frequency separation in step S80 of FIG. 29 according to the third embodiment.

FIG. 30 is a flow chart showing the processing for the high frequency separation in the above-mentioned step S80.

It should be noted that in FIG. 30, processing steps basically substantially identified with the processing shown in FIG. 13 of the above-mentioned first embodiment are allocated with the same step numbers.

When the processing is started, first, the low frequency components are sequentially extracted for each pixel (step S20).

Next, from the read header information, the information such as the temperature and the gain of the image pickup device is set. At this time, if a necessary parameter does not exist for the header information, a pre-set standard value is assigned to the relevant information (step S21).

Subsequently, the parameter related to the reference noise model is read (step S22).

Then, on the basis of the parameter of the reference noise model, the noise amount related to the low frequency component is calculated through the interpolation processing (step S23).

After that, as illustrated in FIG. 27B, the high frequency components corresponding to the low frequency components are sequentially extracted (step S24).

Next, the average values of the high frequency components corresponding to the low frequency components are calculated for each order (step S25).

Subsequently, on the basis of the average value and the noise amount, the upper limit and the lower limit are set as shown in Numeric Expression 3 (step S26).

Then, in a case where the high frequency component is in the range between the upper limit and the lower limit, it is determined that the high frequency component is the invalid component caused by the noise, and in a case where the high frequency component exceeds the upper limit or falls short of the lower limit, it is determined that the high frequency component is the valid component (step S90).

At this time, in a case where it is determined that the high frequency component is the valid component, the correction processing shown in Numeric Expression 8 or Numeric Expression 9 is performed on the high frequency component (step S91).

On the other hand, in step S90, in a case where it is determined that the high frequency component is the invalid component, the correction processing shown in Numeric Expression 7 is performed on the high frequency component (step S92).

When the processing in step S91 or S92 is ended, the valid component and the invalid component are output while being separated from each other (step S93).

Then, it is determined whether or not the processing for all the high frequency components has been completed (step S29). In a case where it is determined that the processing has not been completed, the flow is returned to the above-mentioned step S24 to repeat the above-mentioned processing.

On the other hand, in the step S29, in a case where it is determined that the processing for all the high frequency components has been completed, it is determined whether or not the processing for all the low frequency components has been completed (step S30). In a case where it is determined that the processing has not been completed, the flow is returned to the above-mentioned step S20 to repeat the above-mentioned processing. On the other hand, in a case where it is determined that the processing has been completed, the flow is returned to the processing shown in FIG. 29.

It should be noted that in the above description, the configuration of using the discrete cosine transform for the frequency decomposition and the frequency synthesis is adopted, but the configuration is not necessarily limited to the above. For example, similarly to the above-mentioned first embodiment, a configuration of using the wavelet transform can be adopted, and similarly to the second embodiment described above, a configuration of using the low-pass filter and the difference filter in combination can also be adopted.

Furthermore, in the above description, the configuration of processing the monochrome image signal is adopted, but the configuration is not necessarily limited to the above. For example, similarly to the second embodiment described above, a configuration of calculating the luminance signals from the color image signal obtained from the color image pickup device for the processing can also be adopted.

According to the third embodiment described above, only the high frequency component where the influence of the noise prominently visually appears is separated into the invalid component and the valid component. The gradation processing is performed on the valid component, and the gradation processing is not performed on the invalid component, and an increase in noise accompanying with the gradation processing is suppressed. Thus, it is possible to generate the high quality image signal.

Also, as the low frequency component is excluded from the target of the processing after being separated into the valid component and the invalid component, the possibility of generating the adverse effect accompanying with the processing is decreased, and it is possible to improve the stability.

Furthermore, as the image signal is synthesized with the invalid component, it is possible to obtain the image signal with little sense of visual discomfort, and the stability and reliability of the processing can be improved.

Also, the discrete cosine transform is excellent at the separation of the frequency, and it is therefore possible to perform the high accuracy processing.

As the gradation conversion curve is adaptively and also independently calculated for each region from the low frequency component of the image signal, it is possible to perform the gradation conversion at the high accuracy on various image signals.

Then, as the gradation conversion is performed on the high frequency component on which the noise reducing processing has been performed, an increase in noise accompanying with the gradation processing is suppressed. Thus, it is possible to generate the high quality image signal.

Also, as the correction processing is performed on the valid component in the high frequency component and the smoothing processing is performed on the invalid component in the high frequency component, the generation of the discontinuity accompanying with the noise reducing processing is prevented, and it is possible to generate the high quality image signal.

Furthermore, as the edge emphasis processing is performed only on the valid component in the high frequency component and the edge emphasis processing is not performed on the invalid component in the high frequency component, it is possible to emphasize only the edge component without emphasizing the noise component. With the configuration, it is possible to generate the high quality image signal.

Fourth Embodiment

Figure 31:
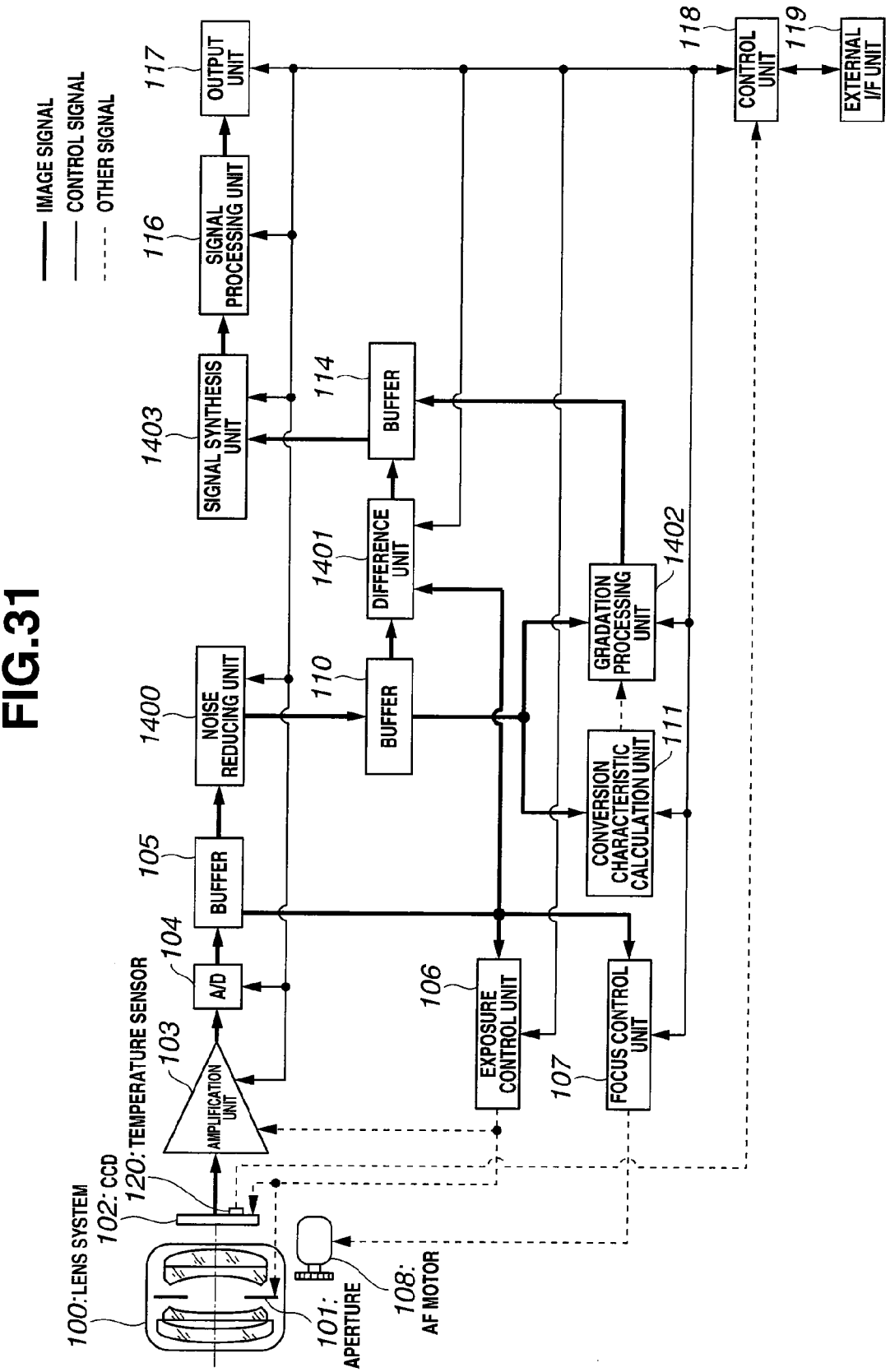
FIG. 31 is a block diagram of a configuration of an image processing system according to a fourth embodiment of the present invention.

FIGS. 31 to 36 illustrate a fourth embodiment of the present invention, and FIG. 31 is a block diagram of a configuration of an image processing system.

According to the fourth embodiment, the same configuration as that of the above-mentioned first to third embodiments is allocated with the same reference numerals to appropriately omit the description thereof, and only a different part will be mainly described.

The image processing system according to the present embodiment has such a configuration that with respect to the above-mentioned image processing system illustrated in FIG. 1 according to the first embodiment, a noise reducing unit 1400 constituting separation means and noise reducing means, a difference unit 1401 constituting separation means and difference means, and a signal synthesis unit 1403 constituting synthesis means and signal synthesis means are added, the gradation processing unit 113 is replaced by a gradation processing unit 1402 constituting conversion means and gradation processing means, and the frequency decomposition unit 109, the high frequency separation unit 112, and the frequency synthesis unit 115 are omitted. Other basic configuration is similar to that of the above-mentioned first embodiment. Therefore, the same components are allocated with the same names and reference numerals to appropriately omit the description thereof, and only a different part will be mainly described.

The buffer 105 is connected to the exposure control unit 106, the focus control unit 107, the noise reducing unit 1400, and the difference unit 1401.

The noise reducing unit 1400 is connected to the buffer 110. The buffer 110 is connected to the conversion characteristic calculation unit 111, the difference unit 1401, and the gradation processing unit 1402.

The conversion characteristic calculation unit 111 is connected to the gradation processing unit 1402. The difference unit 1401 is connected to the buffer 114. The gradation processing unit 1402 is connected to the buffer 114. The buffer 114 is connected via the signal synthesis unit 1403 to the signal processing unit 116.

The control unit 118 is also bi-directionally connected to the noise reducing unit 1400, the difference unit 1401, the gradation processing unit 1402, and the signal synthesis unit 1403 to control these units.

Next, the action of the image processing system illustrated in FIG. 31 is basically similar to that of the first embodiment, and therefore only a different part will be mainly described along the flow of the image signal.

The image signal in the buffer 105 is transferred to the noise reducing unit 1400.

The noise reducing unit 1400 performs the noise reducing processing on the basis of the control of the control unit 118 and transfers the image signal after the noise reducing processing as the valid component to the buffer 110.

The conversion characteristic calculation unit 111 reads the valid component from the buffer 110, and similarly to the above-mentioned first embodiment, calculates the gradation characteristic used for the gradation conversion processing. It should be noted that according to the present embodiment, for the gradation conversion processing, for example, it is supposed to use a space-variant processing using a plurality of gradation characteristics different for each region of a 64×64 pixel unit. Then, the conversion characteristic calculation unit 111 transfers the calculated the gradation characteristic to the gradation processing unit 1402.

On the basis of the control of the control unit 118, the difference unit 1401 reads the image signal before the noise reducing processing from the buffer 105, and also reads the image signal after the noise reducing processing from the buffer 110 as the valid component to perform a processing of taking a difference thereof. The difference unit 1401 transfers a signal obtained as the result of taking the difference as the invalid component to the buffer 114.

The gradation processing unit 1402 reads the valid component from the buffer 110 and the gradation characteristic from the conversion characteristic calculation unit 111, respectively, on the basis of the control of the control unit 118. Then, on the basis of the above-mentioned gradation characteristic, the gradation processing unit 1402 performs the gradation processing on the above-mentioned valid component. The gradation processing unit 1402 transfers the valid component on which the gradation processing has been performed to the buffer 114.

The signal synthesis unit 1403 reads the valid component on which the gradation processing has been performed and the invalid component from the buffer 114 on the basis of the control of the control unit 118 and adds these components, so that the image signal on which the gradation conversion has been performed is synthesized. The signal synthesis unit 1403 transfers the image signal thus synthesized to the signal processing unit 116.

The signal processing unit 116 performs a known compression processing or the like on the image signal from the signal synthesis unit 1403 and transfers the signal after the processing to the output unit 117 on the basis of the control of the control unit 118.

The output unit 117 records and saves the image signal output from the signal processing unit 116 in the recording medium such as a memory card.

Figure 32:
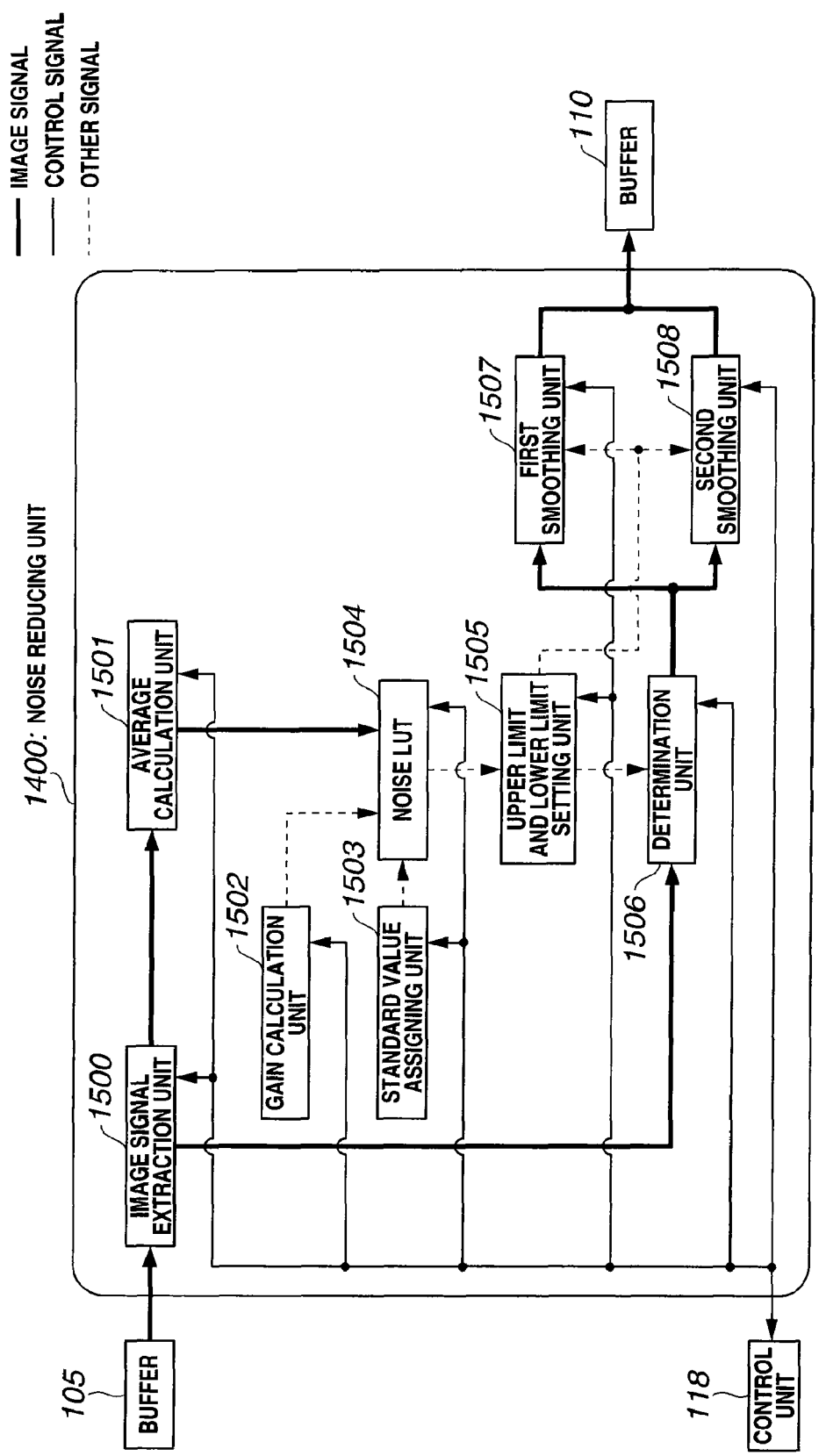
FIG. 32 is a block diagram of a configuration example of a noise reducing unit according to the fourth embodiment.

Next, FIG. 32 is a block diagram of a configuration example of the noise reducing unit 1400.

The noise reducing unit 1400 is configured by including an image signal extraction unit 1500, an average calculation unit 1501 constituting noise estimation means and average calculation means, a gain calculation unit 1502 constituting noise estimation means and collection means, a standard value assigning unit 1503 constituting noise estimation means and assigning means, a noise LUT 1504 constituting noise estimation means and table conversion means, an upper limit and lower limit setting unit 1505 constituting setting means and upper limit and lower limit setting means, a determination unit 1506 constituting determination means, a first smoothing unit 1507 constituting first smoothing means, and a second smoothing unit 1508 constituting second smoothing means.

The buffer 105 is connected to the image signal extraction unit 1500. The image signal extraction unit 1500 is connected to the average calculation unit 1501 and the determination unit 1506.

The average calculation unit 1501, the gain calculation unit 1502, and the standard value assigning unit 1503 are connected to the noise LUT 1504. The noise LUT 1504 is connected to the upper limit and lower limit setting unit 1505. The upper limit and lower limit setting unit 1505 is connected to the determination unit 1506, the first smoothing unit 1507, and the second smoothing unit 1508.

The determination unit 1506 is connected to the first smoothing unit 1507 and the second smoothing unit 1508. The first smoothing unit 1507 and the second smoothing unit 1508 are connected to the buffer 110.

The control unit 118 is bi-directionally connected to the image signal extraction unit 1500, the average calculation unit 1501, the gain calculation unit 1502, the standard value assigning unit 1503, the noise LUT 1504, the upper limit and lower limit setting unit 1505, the determination unit 1506, the first smoothing unit 1507, and the second smoothing unit 1508 to control these units.

Subsequently, a description will be given of the action of the noise reducing unit 1400.

The image signal extraction unit 1500 sequentially extracts the target pixel on which the noise reducing processing should be performed and neighboring pixels of, for example, 3×3 pixels including the target pixel from the buffer 105 on the basis of the control of the control unit 118. The image signal extraction unit 1500 transfers the target pixel and the neighboring pixels to the average calculation unit 1501, and the target pixel to the determination unit 1506, respectively.

The average calculation unit 1501 reads the target pixel and the neighboring pixels from the image signal extraction unit 1500 and calculates the average value AV thereof on the basis of the control of the control unit 118. The average calculation unit 1501 transfers the calculated average value AV to the noise LUT 1504.

The gain calculation unit 1502 calculates the gain information in the amplification unit 103 to be transferred to the noise LUT 1504 on the basis of the information related to the ISO sensitivity and the exposure condition transferred from the control unit 118.

Also, the control unit 118 obtains temperature information of the CCD 102 from the temperature sensor 120 and transferred the thus obtained temperature information to the noise LUT 1504.

On the basis of the control of the control unit 118, in a case where at least one of the above-mentioned gain information and the temperature information cannot be obtained, the standard value assigning unit 1503 transfers a standard value of the information that cannot be obtained to the noise LUT 1504.

The noise LUT 1504 is a look up table where a relation among the signal value level of the image signal, the gain of the image signal, the operation temperature of the image pickup device, and the noise amount is recorded. The look up table is designed, for example, by using the technology disclosed in Japanese Unexamined Patent Application Publication No. 2004-128985.

The noise LUT 1504 outputs the noise amount N on the basis of the average value AV related to the target pixel from the average calculation unit 1501, the gain information from the gain calculation unit 1502 or the standard value assigning unit 1503, and the temperature information from the control unit 118 or the standard value assigning unit 1503. The noise amount N and the average value AV from the average calculation unit 1501 are transferred from the noise LUT 1504 to the upper limit and lower limit setting unit 1505.

On the basis of the control of the control unit 118, the upper limit and lower limit setting unit 1505 uses the average value AV and the noise amount N from the noise LUT 1504 to set the upper limit App_Up and the lower limit App_Low for identifying whether the target pixel belongs to the noise or not as shown in Numeric Expression 3.

The upper limit and lower limit setting unit 1505 transfers the thus set upper limit App_Up and the lower limit App_Low to the determination unit 1506, transfers the average value AV to the second smoothing unit 1508, and transfers the average value AV and the noise amount N to the first smoothing unit 1507, respectively.

The determination unit 1506 reads the target pixel from the image signal extraction unit 1500 and the upper limit App_Up and the lower limit App_Low from the upper limit and lower limit setting unit 1505, respectively, on the basis of the control of the control unit 118. Then, in a case where the target pixel exceeds the upper limit App_Up or falls short of the lower limit App_Low, the determination unit 1506 determines that the target pixel does not belong to the noise and transfers the target pixel to the first smoothing unit 1507.

On the other hand, in a case where the target pixel is in the range between the upper limit App_Up and the lower limit App_Low, the determination unit 1506 determines that the target pixel belongs to the noise and transfers the target pixel to the second smoothing unit 1508.

The second smoothing unit 1508 performs the processing of substituting the target pixel (herein, the target pixel is set as P) with the average value AV from the upper limit and lower limit setting unit 1505 as shown in Numeric Expression 7.

Also, the first smoothing unit 1507 uses the average value AV and the noise amount N from the upper limit and lower limit setting unit 1505 to perform the correction on the target pixel P. The correction has two types of processings. In a case where the target pixel P exceeds the upper limit App_Up, the first smoothing unit 1507 performs the correction shown in Numeric Expression 8. On the other hand, the first smoothing unit 1507 performs the correction shown in Numeric Expression 9 in a case where the target pixel P falls short of the lower limit App_Low.

Then, the processing result obtained by the first smoothing unit 1507 and the processing result obtained by the second smoothing unit 1508 are both transferred to the buffer 110.

Figure 33:
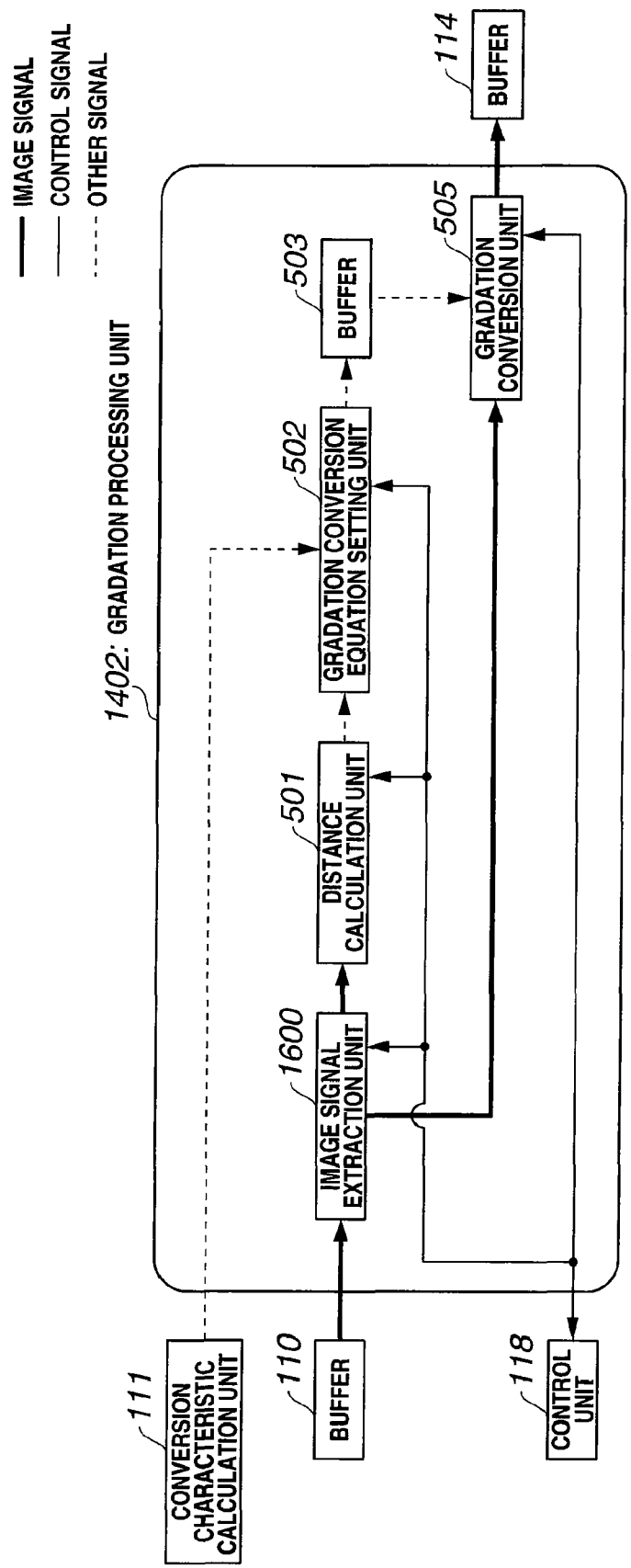
FIG. 33 is a block diagram of a configuration example of a gradation processing unit according to the fourth embodiment.

Next, FIG. 33 is a block diagram of a configuration example of the gradation processing unit 1402.

The gradation processing unit 1402 has such a configuration that with respect to the gradation processing unit 113 shown in FIG. 6 of the above-mentioned first embodiment, the low frequency component extraction unit 500, the high frequency component extraction unit 504 is omitted, and an image signal extraction unit 1600 constituting extraction means is added. Other basic configuration is similar to that of the gradation processing unit 113 shown in FIG. 6. Therefore, the same components are allocated with the same names and reference numerals to appropriately omit the description thereof, and only a different part will be mainly described.

The buffer 110 is connected to the image signal extraction unit 1600. The image signal extraction unit 1600 is connected to the distance calculation unit 501 and the gradation conversion unit 505.

The control unit 118 is also bi-directionally connected to the image signal extraction unit 1600 to control the unit.

Subsequently, a description will be given of the action of the gradation processing unit 1402.

The image signal extraction unit 1600 sequentially extracts the image signals after the noise reducing processing as valid components from the buffer 110 for each pixel on the basis of the control of the control unit 118. The image signal extraction unit 1600 transfers the extracted valid component to the distance calculation unit 501 and the gradation conversion unit 505.

After that, similarly to the above-mentioned first embodiment, the distance calculation unit 501 and the gradation conversion equation setting unit 502 sets the gradation conversion equation with respect to the target pixel as shown in Numeric Expression 4. Then, the gradation conversion equation setting unit 502 transfers the set gradation conversion equation to the buffer 503.

On the basis of the control of the control unit 118, the gradation conversion unit 505 reads the valid component from the image signal extraction unit 1600 and also reads the gradation conversion equation from the buffer 503 to perform the gradation conversion on the valid component. The gradation conversion unit 505 transfers the valid component after the gradation conversion to the buffer 114.

It should be noted that according to the present embodiment too, similarly to the above-mentioned first to third embodiments, the image processing system in which the image pickup unit is separately provided may be used.

Also, in the above, it is supposed to perform the processing by way of the hardware, but the configuration is not necessarily limited to the above. For example, the image signal from the CCD 112 is recorded in the recording medium such as a memory card as raw data without applying the process, and also the associated information such as image pickup conditions (for example, the temperature of the image pickup device, the exposure conditions, and the like, for each shooting operation from the control unit 118) is recorded in the recording medium as the header information. Then, the processing can be performed as the computer is allowed to execute the image processing program which is separate software to instruct the computer to read the information of the recording medium. It should be noted that the transmission of various pieces of information from the image pickup unit to the computer is not necessarily performed via the recording medium and may be performed via a communication line or the like.

Figure 34:
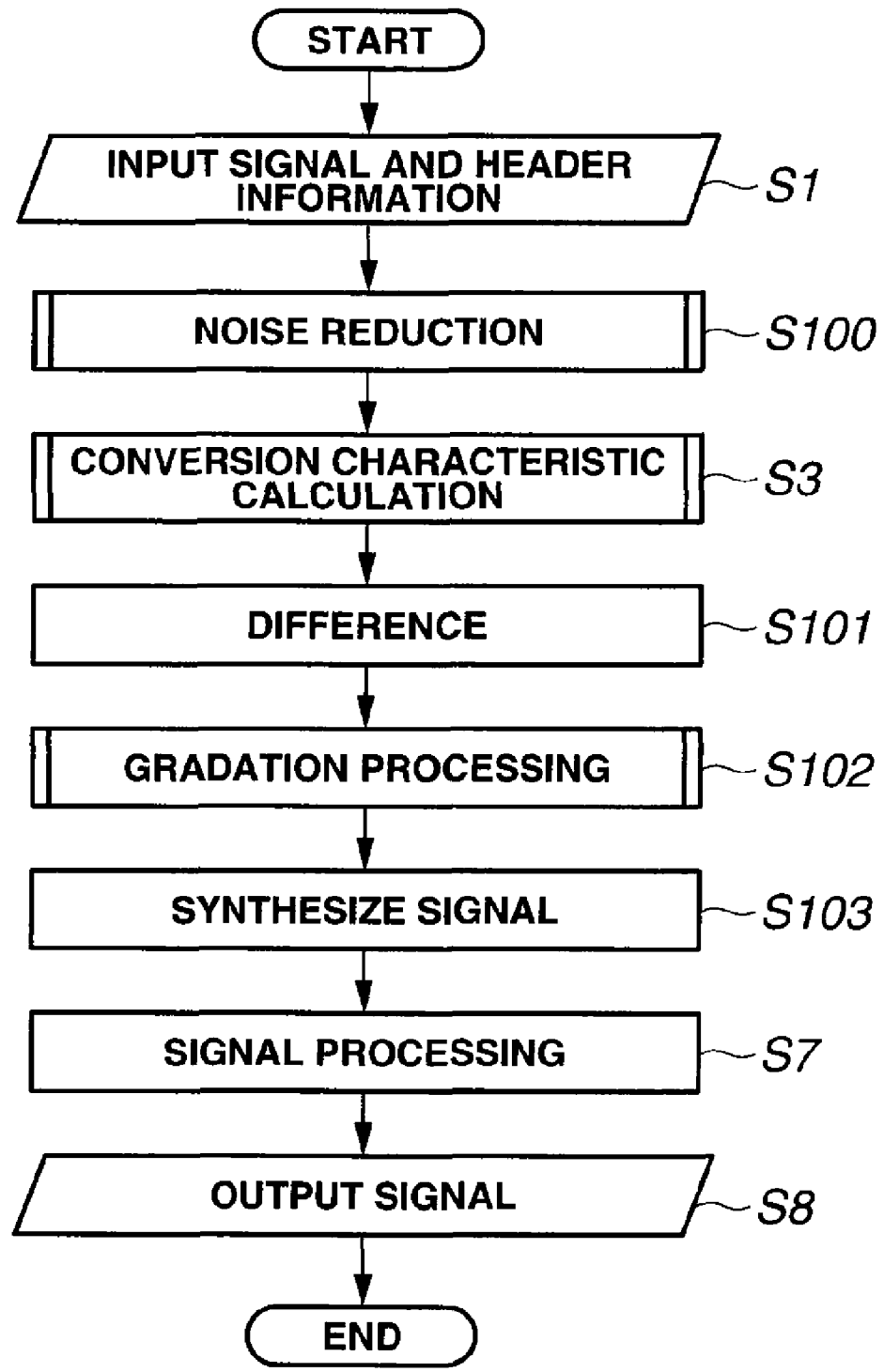
FIG. 34 is a flow chart showing a main routine of an image processing program according to the fourth embodiment.

FIG. 34 is a flow chart showing a main routine of an image processing program.

It should be noted that in FIG. 34, processing steps basically substantially identified with the processing shown in FIG. 11 of the above-mentioned first embodiment are allocated with the same step numbers.

When the processing is started, first, the image signal is read, and also the header information such as the temperature and the exposure conditions of the image pickup device is read (step S1).

Next, as is described below with reference to FIG. 35, the noise reducing processing is performed to calculate the image signal after the noise reducing processing as the valid component (step S100).

Subsequently, as shown in FIG. 12, the conversion characteristic is calculated (step S3).

Furthermore, from the difference between the image signal and the image signal after the noise reducing processing, the invalid component is calculated (step S101).

Then, as is described below with reference to FIG. 36, the gradation processing is performed on the valid component (step S102).

Next, on the basis of the valid component on which the gradation processing has been performed and the invalid component, the image signal on which the gradation conversion has been performed is synthesized (step S103).

Subsequently, the signal processing such as a known compression processing is performed (step S7).

Then, the image signal after the processing is output (step S8), and the processing is ended.

Figure 35:
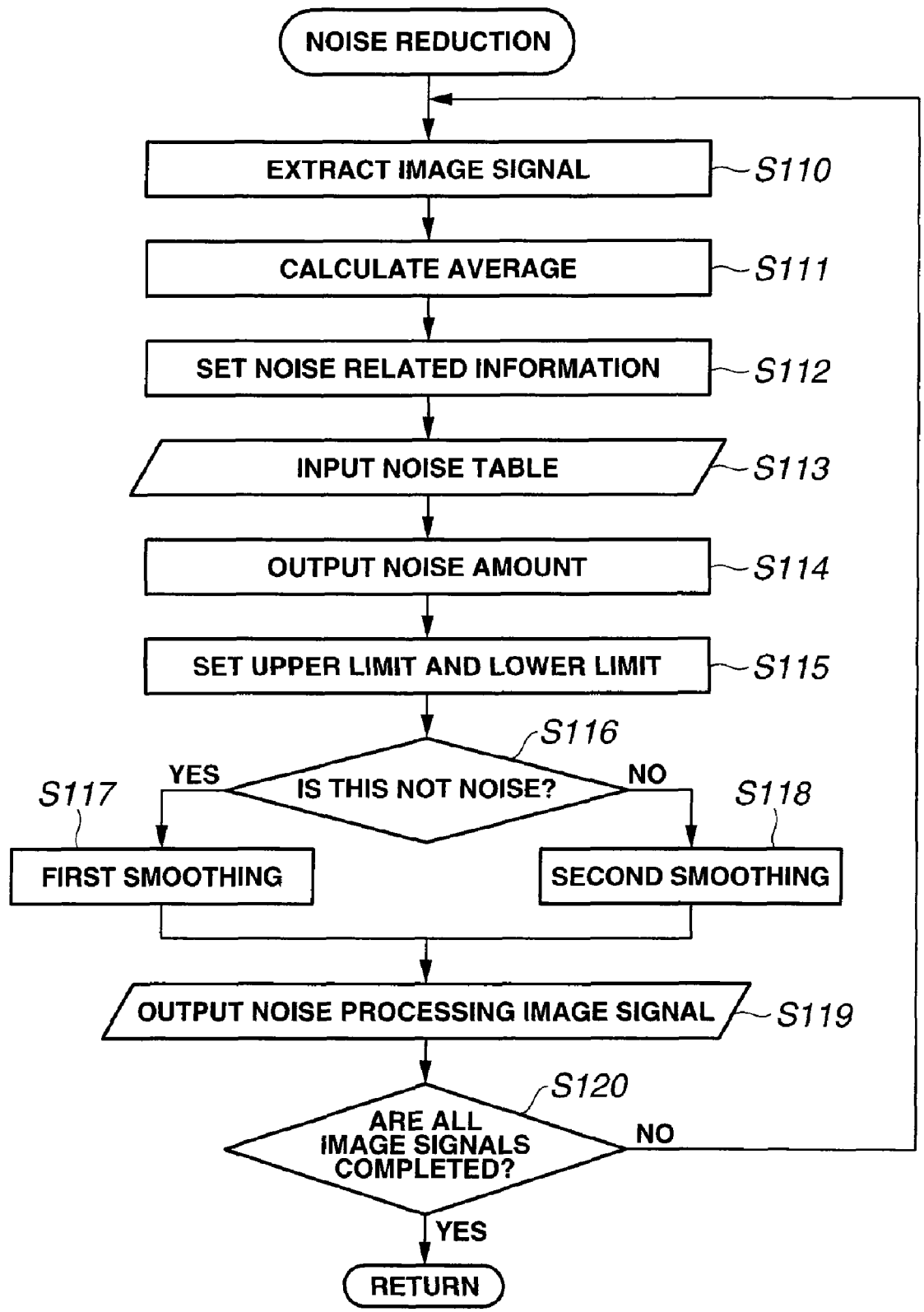
FIG. 35 is a flow chart showing a processing for a noise reduction in step S100 of FIG. 34 according to the fourth embodiment.

FIG. 35 is a flow chart showing the processing for the noise reduction in the above-mentioned step S100.

When the processing is started, first, the target pixel on which the noise reducing processing should be performed and neighboring pixels, for example, of 3×3 pixels including the target pixel are sequentially extracted (step S110).

Next, an average value of the target pixel and the neighboring pixels is calculated (step S111).

Subsequently, from the read header information, the information such as the temperature and the gain of the image pickup device is set. At this time, if a necessary parameter does not exist for the header information, a pre-set standard value is assigned to the relevant information (step S112).

Then, the table related to the noise amount where a relation among the signal value level of the image signal, the gain of the image signal, the operation temperature of the image pickup device, and the noise amount is recorded is read (step S113).

Furthermore, on the basis of the table related to the noise amount, the noise amount is calculated (step S114).

After that, on the basis of the average value and the noise amount, the upper limit and the lower limit are set as shown in Numeric Expression 3 (step S115).

Next, it is determined whether the target pixel belongs to the noise or not through the comparison with the upper limit and the lower limit (step S116).

At this time, in a case where the target pixel exceeds the upper limit or falls short of the lower limit, it is determined that the target pixel does not belong to the noise, and the correction processing shown in Numeric Expression 8 or Numeric Expression 9 is performed on the target pixel (step S117).

On the other hand, in step S116, in a case where the target pixel is in the range between the upper limit and the lower limit, it is determined that the target pixel belongs to the noise, the correction processing shown in Numeric Expression 7 is performed on the target pixel (step S118).

Then, the corrected target pixel is output as the pixel after the noise reducing processing (step S119).

After that, the image signal after the noise reducing processing is set as the valid component, and it is determined whether the processing has been completed for all the valid components or not (step S120). In a case where it is determined that the processing has not been completed, the flow is returned to the above-mentioned step S110 to repeat the above-mentioned processing. On the other hand, in a case where it is determined that the processing has been completed, the flow is returned to the processing shown in FIG. 34.

Figure 36:
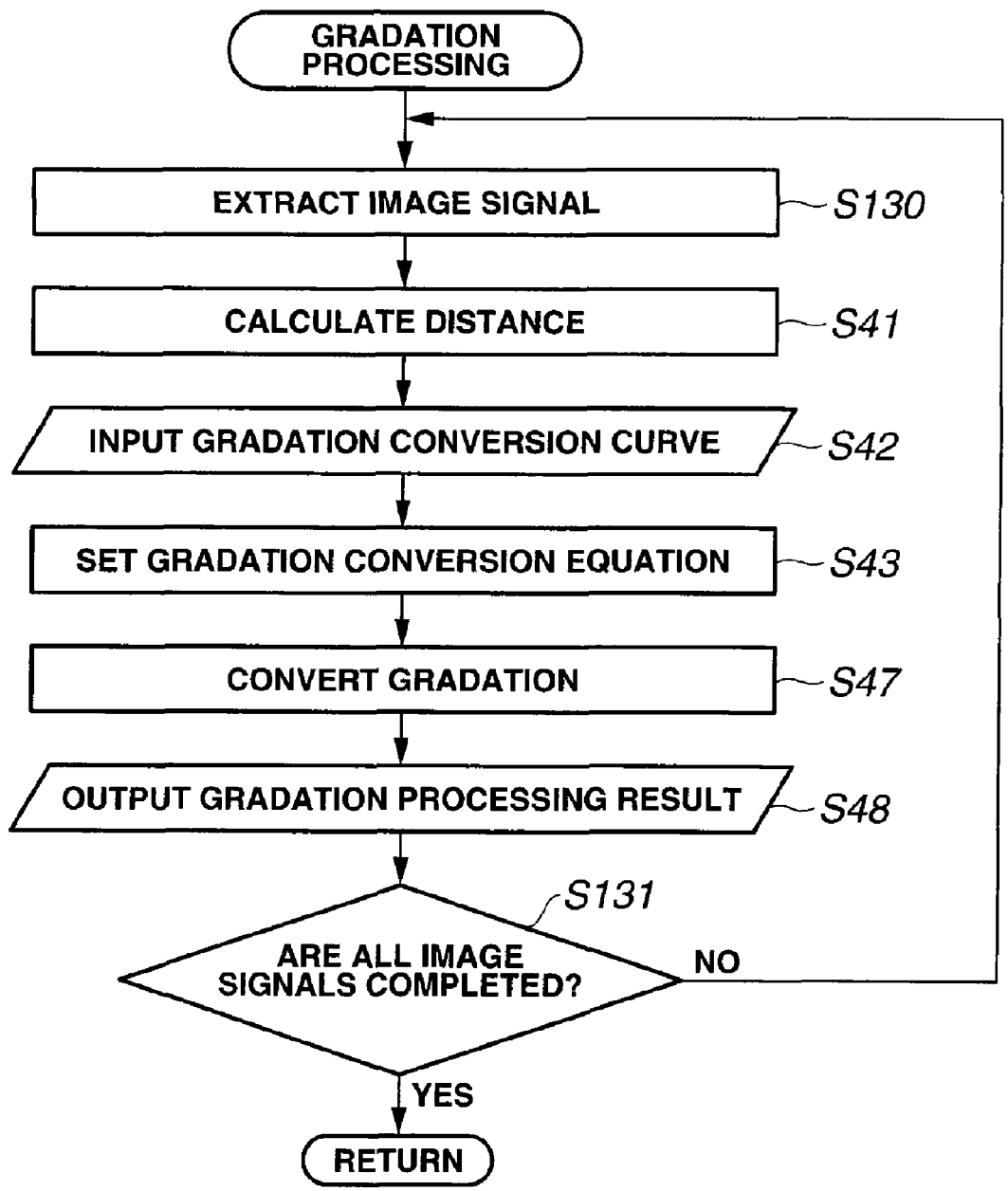
FIG. 36 is a flow chart showing a gradation processing in step S102 of FIG. 34 according to the fourth embodiment.

FIG. 36 is a flow chart showing the gradation processing in the above-mentioned step S102.

It should be noted that in FIG. 36, processing steps basically substantially identified with the processing shown in FIG. 14 of the above-mentioned first embodiment are allocated with the same step numbers.

When the processing is started, first, the image signals after the noise reducing processing are sequentially extracted as valid components for each pixel (step S130).

Next, as illustrated in FIG. 8, the distances between the target pixel of the valid component and the centers of the four neighboring regions are calculated (step S41).

Subsequently, the gradation conversion curves in the four neighboring regions are read (step S42).

Furthermore, as shown in Numeric Expression 4, the gradation conversion equation with respect to the target pixel is set (step S43).

Then, by applying the gradation conversion equation shown in Numeric Expression 4 with respect to the target pixel of the valid component, the gradation conversion is performed (step S47).

Next, the target pixel on which the gradation processing has been performed is output (step S48).

After that, it is determined whether the processing has been completed for all the image signals after the noise reducing processing or not (step S131). In a case where it is determined that the processing has not been completed, the flow is returned to the above-mentioned step S130 to repeat the above-mentioned processing. On the other hand, in a case where it is determined that the processing has been completed, the flow is returned to the processing shown in FIG. 34.

It should be noted that in the above description, the configuration of processing the monochrome image signal is adopted, but the configuration is not necessarily limited to the above. For example, similarly to the second embodiment described above, it is possible to adopt a configuration of processing the color image signal obtained from the color image pickup device.

According to the fourth embodiment described above, the gradation processing is performed only on the image signal after the noise reduction, and an increase in noise accompanying with the gradation processing is suppressed. Thus, it is possible to generate the high quality image signal.

Also, as the conversion characteristic is calculated on the basis of the image signal after the noise reduction, the appropriate conversion characteristic with little influence from the noise can be calculated, and it is possible to improve the stability and reliability of the processing. At this time, as the gradation conversion curve is adaptively calculated from the image signal after the noise reduction, it is possible to perform the high accuracy gradation conversion on various types of image signals.

Furthermore, the present embodiment corresponds to the processing system in which the gradation conversion processing is combined with the noise reducing processing. Therefore, the affinity and compatibility with the existing system are high, and the present embodiment can be applied to a large number of image processing systems. Furthermore, the higher performance can be achieved as a whole, and the system scale can be reduced, which leads to the realization of the lower cost.

Then, the image signal after the noise reduction on which the gradation processing has been performed and the invalid component are synthesized with each other. Thus, the error generated in the noise reducing processing can be suppressed, and it is possible to perform the stable gradation processing. Also, it is possible to generate the high quality image signal with little sense of visual discomfort.

In addition, as the gradation conversion curve is adaptively obtained, it is possible to perform the high accuracy gradation conversion on various types of image signals.

Also, as the gradation conversion curve is obtained independently for each region, the degree of freedom is further improved, and also it is possible to obtain the high quality image signals for scenes with a large contrast.

It should be noted that the present invention is not limited to the embodiments described above, and various modifications and applications can of course be made without departing from the gist of the present invention.

What is claimed is:

1. An image processing system arranged to perform a gradation conversion on an image signal, the image processing system comprising:
    a frequency decomposition unit for decomposing the image signal into a high frequency component and a low frequency component;
    a high frequency separation unit for separating the high frequency component into an invalid component caused by noise and other valid component;
    a conversion characteristic calculation unit for calculating a conversion characteristic used for the gradation conversion on the basis of the low frequency component;
    a gradation processing unit for respectively performing gradation processing on the low frequency component and gradation processing on the valid component in the high frequency component by using the conversion characteristic, and respectively outputting the low frequency component on which the gradation processing has been performed and the valid component in the high frequency component on which the gradation processing has been performed; and
    a frequency synthesis unit for synthesizing the invalid component in the high frequency component, the low frequency component on which the gradation processing has been performed and the valid component in the high frequency component on which the gradation processing has been performed.

2. The image processing system according to claim 1, further comprising a Y/C separation unit configured to separate, in a case where the image signal is a color image signal, the color image signal into a luminance signal and a color signal,
    wherein the image signal dealt with by the frequency decomposition unit, the high frequency separation unit, the conversion characteristic calculation unit, the gradation processing unit, and the frequency synthesis unit is the luminance signal separated by the Y/C separation unit.

3. The image processing system according to claim 2, further comprising a Y/C synthesis unit configured to synthesize the color signal on which the gradation conversion has been performed on the basis of the luminance signal on which the gradation conversion has been performed and the color signal.

4. The image processing system according to claim 2, wherein the color image signal is a color image signal obtained from one of a single image pickup device in which an R (red), G (green), and B (blue) Bayer-type primary color filter is arranged on a front face and a single image pickup device in which a Cy (cyan), Mg (magenta), Ye (yellow), and G (green) color-difference line-sequential type complementary color filter is arranged on a front face.

5. The image processing system according to claim 1, wherein the frequency decomposition unit uses one of a wavelet transform, a Fourier transform, and a discrete cosine transform to decompose the image signal into the high frequency component and the low frequency component.

6. The image processing system according to claim 1, wherein the frequency decomposition unit uses a low-pass filter and a difference filter to decompose the image signal into the high frequency component and the low frequency component.

7. The image processing system according to claim 1, wherein the frequency decomposition unit uses a Gaussian filter and a Laplacian filter to decompose the image signal into the high frequency component and the low frequency component.

8. The image processing system according to claim 1, wherein the conversion characteristic calculation unit includes:
  division unit configured to divide the low frequency component into a plurality of regions;
  correct range extraction unit configured to extract a correct exposure range on the basis of a signal value of the low frequency component for each region;
  edge calculation unit configured to calculate an edge amount regarding the correct exposure range for each region;
  histogram creation unit configured to create a histogram on the basis of the edge amount for each region; and
  gradation conversion curve calculation unit configured to calculate a gradation conversion curve as the conversion characteristic on the basis of the histogram for each region.

9. The image processing system according to claim 8, wherein the gradation processing unit includes:
  first extraction unit configured to sequentially extract low frequency component target pixels which are targets of the gradation processing from the low frequency component;
  second extraction unit configured to sequentially extract valid component target pixels corresponding to positions of the low frequency component target pixels from the valid component in the high frequency component;
  distance calculation unit configured to calculate distance information between the low frequency component target pixel and a center of the region located in a neighborhood of the low frequency component target pixel;
  gradation conversion equation setting unit configured to set a gradation conversion equation used for the gradation conversion on the basis of the gradation conversion curve of a predetermined number of regions located in a neighborhood of the low frequency component target pixel and the distance information; and
  gradation conversion unit configured to perform a gradation conversion on the low frequency component target pixel and the valid component target pixel on the basis of the set gradation conversion equation.

10. The image processing system according to claim 9, wherein the gradation processing unit further includes control unit configured to perform, in a case where the valid component target pixel corresponding to the position of the low frequency component target pixel does not exist, a control to cancel the gradation conversion on the valid component target pixel.

11. The image processing system according to claim 1, further comprising noise reducing unit configured to perform a noise reducing processing on the high frequency component.

12. The image processing system according to claim 1, further comprising edge emphasis unit configured to perform an edge emphasis processing on the valid component in the high frequency component.

13. An image processing system arranged to perform a gradation conversion on an image signal, the image processing system comprising:
  a separation unit adapted to separate the image signal into an invalid component caused by noise and other valid component;
  a conversion unit adapted to perform the gradation conversion on the valid component; and
  a synthesis unit adapted to synthesize an image signal on which the gradation conversion has been performed on the basis of the valid component on which the gradation conversion has been performed and the invalid component,
  the separation unit comprising:
  a frequency decomposition unit adapted to decompose the image signal into a high frequency component and a low frequency component; and
  a high frequency separation unit adapted to separate the high frequency component into an invalid component caused by noise and other valid component, and
  the conversion unit comprising:
  a conversion characteristic calculation unit adapted to calculate a conversion characteristic used for the gradation conversion on the basis of the low frequency component; and
  a gradation processing unit adapted to perform a gradation processing on the low frequency component and the valid component in the high frequency component by using the conversion characteristic, wherein the conversion characteristic calculation unit includes:
  a correct range extraction unit configured to extract a correct exposure range on the basis of a signal value of the low frequency component;
  an edge calculation unit configured to calculate an edge amount regarding the correct exposure range;
  a histogram creation unit configured to create a histogram on the basis of the edge amount; and
  a gradation conversion curve calculation unit configured to calculate a gradation conversion curve as the conversion characteristic on the basis of the histogram.

14. The image processing system according to claim 13, wherein the conversion characteristic calculation unit further includes:
  a region-of-interest setting unit configured to set a region-of-interest from the low frequency component;
  a weighting factor setting unit configured to set a weighting factor regarding the region-of-interest; and
  a histogram correction unit configured to correct the histogram on the basis of the weighting factor,
  wherein the gradation conversion curve calculation unit calculates the gradation conversion curve on the basis of the corrected histogram.

15. The image processing system according to claim 13, wherein the gradation processing unit includes:
  a low frequency component extraction unit to sequentially extract low frequency component target pixels which are targets of the gradation processing from the low frequency component,
  a high frequency component extraction unit configured to sequentially extract valid component target pixels corresponding to positions of the low frequency component target pixels from the valid component in the high frequency component; and a gradation conversion unit configured to perform a gradation conversion on the low frequency component target pixels and the valid component target pixels on the basis of the gradation conversion curve.

16. The image processing system according to claim 15, further comprising a control unit configured to perform, in a case where the valid component target pixel corresponding to the position of the low frequency component target pixel does not exist, a control to cancel the gradation conversion on the valid component target pixel.

17. An image processing system arranged to perform a gradation conversion on an image signal, the image processing system comprising:
a separation unit adapted to separate the image signal into an invalid component caused by noise and other valid component;
a conversion unit adapted to perform the gradation conversion on the valid component; and
a synthesis unit adapted to synthesize an image signal on which the gradation conversion has been performed on the basis of the valid component on which the gradation conversion has been performed and the invalid component,
the separation unit comprising:
a frequency decomposition unit adapted to decompose the image signal into a high frequency component and a low frequency component; and
a high frequency separation unit adapted to separate the high frequency component into an invalid component caused by noise and other valid component, and
the conversion unit comprising:
a conversion characteristic calculation unit adapted to calculate a conversion characteristic used for the gradation conversion on the basis of the low frequency component; and
a gradation processing unit adapted to perform a gradation processing on the low frequency component and the valid component in the high frequency component by using the conversion characteristic, wherein the high frequency separation unit includes:
a noise estimation unit adapted to estimate a noise amount of the high frequency component on the basis of the low frequency component;
a setting unit adapted to set a permissible range on the basis of the noise amount and the high frequency component; and
a determination unit configured to determine whether the high frequency component belongs to the invalid component or the valid component on the basis of the permissible range.

18. The image processing system according to claim 17, wherein the high frequency separation unit includes:
a gain calculation unit configured to collect information related to a temperature value of an image pickup device used when the image signal is picked up and a gain value with respect to the image signal;
a standard value assignment unit configured to assign a standard value with respect to information which cannot be collected by the collection means;
a noise LUT configured to output the noise amount on the basis of the information from the gain calculation unit or the standard value assignment unit and the low frequency component or the image signal;
an average calculation unit configured to calculate an average value of the high frequency components;
an upper limit and lower limit setting unit configured to set an upper limit and a lower limit regarding the high frequency component as values representing borders of a permissible range on the basis of the noise amount and the average value; and
a determination unit configured to determine whether the high frequency component belongs to the invalid component or the valid component on the basis of the permissible range.

19. A non-transitory computer-readable storage medium storing a program, when executed by a computer, causes the computer to perform a gradation conversion on an image signal, comprising the following steps:
a frequency decomposition step of decomposing the image signal into a high frequency component and a low frequency component;
a frequency separation step of separating the high frequency component into an invalid component caused by noise and other valid component;
a conversion characteristic calculation step of calculating a conversion characteristic used for the gradation conversion on the basis of the low frequency component; and
a gradation processing step of respectively performing gradation processing on the low frequency component and gradation processing on the valid component in the high frequency component by using the conversion characteristic, and respectively outputting the low frequency component on which the gradation processing has been performed and the valid component in the high frequency component on which the gradation processing has been performed; and
a frequency synthesis step of synthesizing the invalid component in the high frequency component, the low frequency component on which the gradation processing has been performed and the valid component in the high frequency component on which the gradation processing has been performed.

20. The recording medium according to claim 19, wherein the image processing program instructs the computer to further execute a Y/C separation step of separating, in a case where the image signal is a color image signal, the color image signal into a luminance signal and a color signal, and
wherein the image signal dealt with by the frequency decomposition step, the frequency separation step, the conversion characteristic calculation step, the gradation processing step, and the frequency synthesis step is the luminance signal separated in the Y/C separation step.

21. The recording medium according to claim 19, wherein the high frequency separation step includes:
a noise estimation step of estimating a noise amount of the high frequency component on the basis of the low frequency component;
a setting step of setting a permissible range on the basis of the noise amount and the high frequency component; and
determination step of determining whether the high frequency component belongs to the invalid component or the valid component on the basis of the permissible range.

22. The recording medium according to claim 19, wherein the image processing program instructs the computer to further execute a noise reducing step of performing a noise reducing processing on the high frequency component.

23. The recording medium according to claim 19, wherein the image processing program instructs the computer to further execute an edge emphasis step of performing an edge emphasis processing on the valid component in the high frequency component.

24. A recording medium recording an image processing program for instructing a computer to perform a gradation conversion on an image signal, the image processing program instructing the computer to execute:
- a separation step of separating the image signal into an invalid component caused by noise and other valid component;
- a conversion step of performing the gradation conversion on the valid component; and
- a synthesis step of synthesizing an image signal on which the gradation conversion has been performed on the basis of the valid component on which the gradation conversion has been performed and the invalid component, wherein the separation step includes:
- a frequency decomposition step of decomposing the image signal into a high frequency component and a low frequency component; and
- a frequency separation step of separating the high frequency component into an invalid component caused by noise and other valid component, wherein the conversion step includes:
- a conversion characteristic calculation step of calculating a conversion characteristic used for the gradation conversion on the basis of the low frequency component; and
- a gradation processing step of performing a gradation processing on the low frequency component and the valid component in the high frequency component by using the conversion characteristic, and wherein the conversion characteristic calculation step includes:
- a division step of dividing the low frequency component into a plurality of regions;
- a correct range extraction step of extracting a correct exposure range on the basis of a signal value of the low frequency component for each region;
- an edge calculation step of calculating an edge amount regarding the correct exposure range for each region;
- a histogram creation step of creating a histogram on the basis of the edge amount for each region; and
- a gradation conversion curve calculation step of calculating a gradation conversion curve as the conversion characteristic on the basis of the histogram for region.

25. The recording medium according to claim 24, wherein the gradation processing step includes:
- a first extraction step of sequentially extracting low frequency component target pixels which are targets of the gradation processing from the low frequency component;
- a second extraction step of sequentially extracting valid component target pixels corresponding to positions of the low frequency component target pixels from the valid component in the high frequency component; and
- a distance calculation step of calculating distance information between the low frequency component target pixel and a center of the region located in a neighborhood of the low frequency component target pixel;
- a gradation conversion equation setting step of setting a gradation conversion equation used for the gradation conversion on the basis of the gradation conversion curve of a predetermined number of regions located in a neighborhood of the low frequency component target pixel and the distance information; and
- a gradation conversion step of performing a gradation conversion on the low frequency component target pixel and the valid component target pixel on the basis of the set gradation conversion equation.

26. The recording medium according to claim 25, wherein the gradation processing step further includes a control step of performing, in a case where the valid component target pixel corresponding to the position of the low frequency component target pixel does not exist, a control to cancel the gradation conversion on the valid component target pixel.

* * * * *